US012663286B2

(12) United States Patent (10) Patent No.: US 12,663,286 B2

Fei et al. (45) Date of Patent: Jun. 23, 2026

(54) MAP GENERATION METHOD AND APPARATUS, AND MAP USING METHOD AND APPARATUS

(71) Applicant: YINWANG INTELLIGENT TECHNOLOGIES CO., LTD., Shenzhen (CN)

(72) Inventors: Wenkai Fei, Beijing (CN); Jianqin Liu, Beijing (CN)

(73) Assignee: Yinwang Intelligent Technologies Co., Ltd.

( * ) Notice: Subject to any disclaimer, the term of this patent is extended or adjusted under 35 U.S.C. 154(b) by 33 days.

(21) Appl. No.: 18/401,118

(22) Filed: Dec. 29, 2023

(65) Prior Publication Data

US 2024/0133709 A1 Apr. 25, 2024
US 2024/0230364 A9 Jul. 11, 2024

Related U.S. Application Data

(63) Continuation of application No. PCT/CN2022/102435, filed on Jun. 29, 2022.

(30) Foreign Application Priority Data

Jul. 2, 2021 (CN) .......................... 202110751000.5

(51) Int. Cl.
G01C 21/00 (2006.01)

(52) U.S. Cl.
CPC ...... G01C 21/3811 (2020.08); G01C 21/3819 (2020.08)

(58) Field of Classification Search
CPC ............ G01C 21/3811; G01C 21/3819; G01C 21/387; G01C 21/3878; G08G 1/0104;
G08G 1/01; G08G 1/137; G06F 16/29;
G09B 29/106; H04W 4/40
See application file for complete search history.

(56) References Cited

U.S. PATENT DOCUMENTS

2005/0222760 A1 10/2005 Cabral et al.
2005/0222764 A1 10/2005 Uyeki et al.
2009/0319188 A1* 12/2009 Otto ........................ G06F 16/29
701/300

(Continued)

FOREIGN PATENT DOCUMENTS

CN 101546481 A 9/2009
CN 102749085 A 10/2012

(Continued)

OTHER PUBLICATIONS

English Translation KR20200058135A (Year: 2025).*

(Continued)

*Primary Examiner* — Rami Khatib
(74) *Attorney, Agent, or Firm* — Fish & Richardson P.C.

(57) ABSTRACT

This application discloses a map generation method and apparatus, and a map using method and apparatus. One example generation method includes: generating a map, where the map includes location information of a first event and location reference information of the first event, the location information indicates a location at which the first event occurs, and the location reference information indicates a location reference manner on which the location information is based; and sending the map.

20 Claims, 20 Drawing Sheets

(56) References Cited

U.S. PATENT DOCUMENTS

| | | | |
|---|---|---|---|
| 2011/0298637 A1 | 12/2011 | Posner et al. | |
| 2013/0208001 A1* | 8/2013 | Lulue | G06F 16/29 |
| | | | 345/629 |
| 2019/0317509 A1* | 10/2019 | Zhang | G05D 1/0088 |
| 2020/0191601 A1* | 6/2020 | Jiang | G01C 21/3859 |

FOREIGN PATENT DOCUMENTS

| | | |
|---|---|---|
| CN | 104535073 A | 4/2015 |
| JP | 2019190831 A | 10/2019 |
| KR | 20200058135 A | 5/2020 |

OTHER PUBLICATIONS

TomTom International, "OpenLR, White Paper, Version 1.0; An open standard for encoding, transmitting and decoding location references in digital maps," Jan. 1, 2009, 47 pages.

Hiestermann, "Map-independent location matching certified by the AGORA-C standard," Science Direct Transportation Research Part C, vol. 16, No. 3, Jun. 1, 2008, 13 pages.

Extended European Search Report in European Appln No. 22832121.2, dated Sep. 3, 2024, 10 pages.

wikipedia.org [online], "Wikipedia—Inertial measurement unit," Jan. 31, 2005, retrieved from URL<https://zh.wikipedia.org/wiki/%E6%83%AF%E6%80%A7%E6%B5%8B%E9%87%8F%E5%8D%95%E5%85%83>, 3 pages.

International Search Report and Written Opinion in International Appln. No. PCT/CN2022/102435, mailed on Sep. 20, 2022, 21 pages (with English translation).

* cited by examiner

Dynamic map
layer n

Dynamic map
layer 2

Dynamic map
layer 1

Geometric expression

Location expression

Map layer association

Static map

Path planning

Congested road section

Vehicle A

Destination

First lane

Second lane

Second location information of a first event

Third lane

Second location information of a first event

First threshold

First lane

A

B

Second threshold

Second lane

C

Third threshold

Third lane

MAP GENERATION METHOD AND APPARATUS, AND MAP USING METHOD AND APPARATUS

CROSS-REFERENCE TO RELATED APPLICATIONS

This application is a continuation of International Application No. PCT/CN2022/102435, filed on Jun. 29, 2022, which claims priority to Chinese Patent Application No. 202110751000.5, filed on Jul. 2, 2021. The disclosures of the aforementioned applications are hereby incorporated by reference in their entireties.

TECHNICAL FIELD

This application relates to the field of intelligent connected vehicle technologies, and in particular, to a map generation method and apparatus, and a map using method and apparatus.

BACKGROUND

Maps play an important role in vehicle positioning, vehicle navigation, and even vehicle self-driving.

Because a requirement for accuracy and real-time performance of a high-definition map is increasingly high, data needs to be frequently collected, and the high-definition map needs to be updated in time based on the collected data. In different scenarios, there are different requirements for location expression of an event on a map, and currently different map providers have different event expression manners. An existing event expression manner cannot meet requirements for flexibility and compatibility.

SUMMARY

According to a first aspect, this application provides a map generation method, which may be applied to a map generation apparatus. The map generation apparatus may be a cloud device, a road end device, or a terminal device. The cloud device is, for example, a map server, or a software module, a hardware module, or a chip in the map server. The road end device is, for example, a roadside unit, or a software module, a hardware module, or a chip in the roadside unit. The terminal device is, for example, a vehicle, or a software module, a hardware module, or a chip in the vehicle. The method includes: generating a map, where the map includes location information of a first event and location reference information of the first event, the location information is used to indicate a location at which the first event occurs, and the location reference information is used to indicate a location reference manner on which the location information is based; and sending the map.

It should be noted that sending in this embodiment of the present application may be performed between devices, for example, may be performed between different cloud devices, may be performed between different terminal devices, or may be performed between different road end devices; or may be performed between the cloud device and the terminal device, may be performed between the cloud device and the road end device, or may be performed between the terminal device and the road end device. For another example, sending may be performed in a device, for example, sending is performed between components, between modular components, between chips, or between modules in the device by using a bus or an interface. For example, the map may be sent in a same cloud device, may be sent in a same terminal device, or may be sent in a same road end device.

The map generation apparatus may send the map to a map using apparatus. The map using apparatus may be a cloud device, a road end device, or a terminal device. The cloud device is, for example, a map server, or a software module, a hardware module, or a chip in the map server. The road end device is, for example, a roadside unit, or a software module, a hardware module, or a chip in the roadside unit. The terminal device is, for example, a vehicle, or a software module, a hardware module, or a chip in the vehicle. The map using apparatus and the map generation apparatus may be deployed on a same device, or may be deployed on different devices. This is not limited in this application.

According to the foregoing method, the location reference information is used to indicate the location reference manner on which the location information is based, so that the location information of the first event can be flexibly expressed in different location reference information. In addition, the location reference information may be used as a basis for exchanging location information between map providers using different location reference manners. Therefore, flexibility and compatibility of expressing location information of an event are improved in this embodiment.

In a possible implementation, the map further includes: the location information includes first location information and second location information, and the location reference information includes first location reference information and second location reference information, where the first location reference information is used to indicate a first location reference manner on which the first location information is based, the second location reference information is used to indicate a second location reference manner on which the second location information is based, the second location information is different from the first location information, and the second location reference manner is different from the first location reference manner.

According to the foregoing method, the map generation apparatus may generate the first location information and the second location information for the first event. The location reference manner of the first location information is different from the location reference manner of the second location information. Therefore, the correspondingly generated first location information and second location information may be applied to different scenarios. For example, the first location reference manner is a road-level location reference manner, and the second location reference manner is a lane-level location reference manner. Therefore, according to the method, the first event can be expressed based on the road-level location reference manner, or may be expressed based on the lane-level location reference manner, thereby improving universality and flexibility of expressing location information of an event.

In a possible implementation, the location reference manner includes at least one of a type of a reference coordinate system, a type of a reference point, and a type of a reference line.

According to the foregoing method, the location reference information may determine the location reference manner by using a plurality of different dimensions. For example, the location reference information is determined by using the type of the reference coordinate system, the location reference information is determined by using the type of the reference point, and the location reference information is determined by using the type of the reference line. Certainly, the type of the reference point and the type of the reference line may alternatively be determined on the premise that the type of the reference coordinate system is determined, so as to determine the location reference information, flexibly define the location reference information in a plurality of dimensions, and flexibly express location information of an event.

In a possible implementation, the reference lines include a lateral reference line and a longitudinal reference line.

According to the foregoing method, the reference line may also be divided into a lateral reference line and a longitudinal reference line, to improve diversity of the type of the reference line.

In a possible implementation, the type of the reference coordinate system includes at least one of an ENU rectangular coordinate system and a coordinate system along a reference line.

According to the foregoing method, location reference line information can be flexibly selected by using the ENU rectangular coordinate system and the coordinate system along a reference line.

In a possible implementation, the type of the reference point includes at least one of the following plurality of types: a start point of a road central line, a start point of a road edge line, a midpoint of a start line of a lane group, a start point of a lane central line, and a start point of a lane edge line.

In a possible implementation, the type of the reference line includes at least one of the following plurality of types: a central line of a road, an edge line of a road, a central line of a lane, and an edge line of a lane.

In a possible implementation, the map further includes: third location information of a second event and event correlation indication information, where the event correlation indication information is used to indicate that the third location information is based on a location reference manner indicated by the location reference information.

According to the foregoing method, when the first event is related to the second event, for example, the first event is an accident event, and the second event is a traffic flow event, in this case, the second event is related to the first event, and location reference information of the second event may be determined based on the location reference information of the first event. Therefore, complexity of expressing the third location information of the second event is reduced. In addition, the third location information of the second event is updated in time based on a change of the location information of the first event, thereby improving timeliness of expressing the third location information of the second event.

In still another possible scenario, the first event and the second event are events that share location reference information. The event correlation indication information is indicated, so that same location reference information does not need to be repeatedly indicated, thereby reducing map overheads, and improving map generation and map use effects.

According to a second aspect, this application provides a map using method, which may be applied to a map using apparatus. The map using apparatus may be a map server, a vehicle, or a map collection device. For example, the map collection device may be a roadside unit, or may be a map server, a vehicle, or a component on a map collection device. The map using method includes: receiving a map, where the map includes location information of a first event and location reference information of the first event, the location information is used to indicate a location at which the first event occurs, and the location reference information is used to indicate a location reference manner on which the location information is based; and performing a map update operation, or displaying the location information, or assisting in driving decision-making based on the map.

A map generation apparatus may be a cloud device, a road end device, or a terminal device. The cloud device is, for example, a map server, or a software module, a hardware module, or a chip in the map server. The road end device is, for example, a roadside unit, or a software module, a hardware module, or a chip in the roadside unit. The terminal device is, for example, a vehicle, or a software module, a hardware module, or a chip in the vehicle. The map using apparatus may also be a cloud device, a road end device, or a terminal device. The cloud device is, for example, a map server, or a software module, a hardware module, or a chip in the map server. The road end device is, for example, a roadside unit, or a software module, a hardware module, or a chip in the roadside unit. The terminal device is, for example, a vehicle, or a software module, a hardware module, or a chip in the vehicle. The map using apparatus and the map generation apparatus may be deployed on a same device or chip, or may be deployed on different devices or chips. This is not limited in this application.

It should be noted that receiving in this embodiment of the present application may be performed between devices, for example, may be performed between different cloud devices, may be performed between different terminal devices, or may be performed between different road end devices; or may be performed between the cloud device and the terminal device, may be performed between the cloud device and the road end device, or may be performed between the terminal device and the road end device. For another example, receiving may be performed in a device, for example, receiving is performed between components, between modular components, between chips, or between modules in the device by using a bus or an interface. For example, the map may be received in a same cloud device, may be received in a same terminal device, or may be received in a same road end device.

According to the foregoing method, after obtaining the map, the map using apparatus may perform a map update operation based on the location information of the first event, display the first information based on the location information of the first event, and assist in driving decision-making based on the location information of the first event, so that the location information of the first event is flexibly used for expression in corresponding location reference information, to meet a plurality of requirements of map use, improve an effect of using the map by a user, and improve driving experience.

In a possible implementation, the map further includes: the location information includes first location information and second location information, and the location reference information includes first location reference information and second location reference information, where the first location reference information is used to indicate a first location reference manner on which the first location information is based, the second location reference information is used to indicate a second location reference manner on which the second location information is based, the second location information is different from the first location information, and the second location reference manner is different from the first location reference manner.

In a possible implementation, the location reference manner includes at least one of a type of a reference coordinate system, a type of a reference point, and a type of a reference line.

In a possible implementation, the reference lines include a lateral reference line and a longitudinal reference line.

In a possible implementation, the type of the reference coordinate system includes at least one of an ENU rectangular coordinate system and a coordinate system along a reference line.

In a possible implementation, the type of the reference point includes at least one of the following plurality of types: a start point of a road central line, a start point of a road edge line, a midpoint of a start line of a lane group, a start point of a lane central line, and a start point of a lane edge line.

In a possible implementation, the type of the reference line includes at least one of the following plurality of types: a central line of a road, an edge line of a road, a central line of a lane, and an edge line of a lane.

In a possible implementation, the map further includes third location information of a second event and event correlation indication information, where the event correlation indication information is used to indicate that the third location information is based on a location reference manner indicated by the location reference information.

In a possible implementation, the displaying the location information includes: in response to a request message, changing displaying the first location information to displaying the second location information; where the displaying the first location information is displaying the first location information based on the first location reference manner indicated by the first location reference information, and the displaying the second location information is displaying the second location information based on the second location reference manner indicated by the second location reference information.

The request message may be generated after the user performs an operation on map information, navigation information, and the like that are displayed on a display interface, or may be initiated by a vehicle to the map using apparatus before the vehicle performs driving decision-making.

According to the foregoing method, the second location information may be displayed based on selection of the user, so that flexibility of displaying the first event is improved, and a plurality of requirements of using the map by the user are met.

In a possible implementation, the displaying the location information based on the map includes:

when a distance between the first event and a vehicle meets a preset condition, changing displaying the first location information to displaying the second location information; where the displaying the first location information is displaying the first location information based on the first location reference manner indicated by the first location reference information, and the displaying the second location information is displaying the second location information based on the second location reference manner indicated by the second location reference information.

According to the foregoing method, the preset condition may be that the second location information is displayed when the distance is less than a preset threshold, or may be that the second location information is displayed when the distance is greater than the preset threshold, so as to adapt to displaying location information in different reference manners in different scenarios.

For example, if the second location information has a larger information amount than the first location information, the second location information may be displayed when the first event is relatively close to the vehicle, so as to provide detailed information about the first event to the vehicle, thereby improving driving experience of the user. For another example, when the vehicle is in a different lane, a different driving policy may be selected when the first event is corresponding to the vehicle being in a different lane. For example, the first event is a lane in which the vehicle is located, and thresholds of the first event and the vehicle in different lanes may be correspondingly set. When the distance between the vehicle and the first event is less than a corresponding threshold, the second location information is displayed, thereby improving flexibility of using the map and improving driving experience of the user.

In a possible implementation, the assisting in driving decision-making based on the map includes: when a distance between the first event and a vehicle meets a preset condition, changing assisting in driving decision-making based on the first location information to assisting in driving decision-making based on the second location information.

According to the foregoing method, the preset condition may be that when the distance is less than the preset threshold, driving decision-making is assisted based on the second location information; or may be that driving decision-making is assisted based on the second location information when the distance is greater than the preset threshold, so that location information in different reference manners is used to assist in driving decision-making in different scenarios, thereby helping improve an effect of assisting in driving decision-making.

In a possible implementation, the first event is on a planned driving route of the vehicle.

According to the foregoing method, when the first event is on the planned driving route of the vehicle, it is determined whether the distance between the first event and the vehicle meets the preset condition, to determine whether to change displaying the first location information to displaying the second location information. A display effect of an event during vehicle driving is improved.

In a possible implementation, the displaying the location information includes:

selecting the first location information from the first location information and the second location information for display based on an attribute of the first event, and time or a location at which the first event occurs, where the displaying is based on the first location reference manner indicated by the first location reference information.

In a possible scenario, for example, the first event is a traffic flow event, and the location information of the traffic flow event may be road-level location information, or may be lane-level location information. In this case, the location information may be divided into a morning and night rush hour and a non-morning and night rush hour based on a congestion degree of a traffic flow, or may be divided based on time such as a working day, a non-working day, or a holiday. Therefore, it is considered that display may be performed based on different location information at different time. For example, in the non-morning and evening rush hour, road-level location information may be displayed, so as to reduce map display complexity. In the morning and night rush hour, lane-level location information may be displayed, so as to improve driving experience of the user driving the vehicle by using the map.

In another possible scenario, the location at which the first event occurs may be located in a sensitive region. In this case, it is determined to display the first location information of the first event based on a display requirement of the sensitive region. For example, the first location information includes location information that is allowed to be displayed in the sensitive region. In some embodiments, the first location information that is of the first event and that can be displayed may be location information with relatively low display definition. After the sensitive region is exited, the first location information of the first event may be updated to high-definition location information.

In still another possible scenario, the location at which the first event occurs may be located in a region with complex terrain. For example, the first event is located near a viaduct. In this case, lane-level location information may be preferentially displayed, to improve user experience of using the map by the user, and avoid a problem that the first event is incorrectly displayed due to inaccurate positioning of the road-level location information. For example, the vehicle is located under the viaduct, and map display is started. In this case, the first event occurs on a lane on the viaduct. If road-level location information is displayed, the first event may be displayed on the map, and consequently, and is considered mistakenly by the user as a first event that occurs on the ground of the viaduct, and the user selects another route for driving. In this case, lane-level location information may be selected for display, that is, a lane in which the first event occurs on the viaduct is displayed, or the first event is not displayed, and the first event is displayed after it is determined that the vehicle travels on the viaduct, thereby improving map use experience of the user.

In a possible implementation, the displaying the location information includes:

selecting the first location information from the first location information and the second location information for display based on a permission of a device performing displaying or a permission of a user who uses the device, where the displaying is based on the first location reference manner indicated by the first location reference information.

For example, the user may be a driver or a passenger of the vehicle. The driver of the vehicle may be a vehicle owner, or may be a non-vehicle owner. Therefore, user permissions may be correspondingly set for different users who use the vehicle. The user permission may be set by the map generation apparatus for the user, or may be set by the map using apparatus for the user, or may be set by a third party such as an operator for the user. This is not limited herein. For another example, a permission may be further set for a device that displays a map. When the device is located in the vehicle, the permission may be a permission of the user, or may be a permission of the vehicle, or may be a permission separately set for the device. Alternatively, the permission may be a permission set for the device. This is not limited herein.

By obtaining the permission of the device for displaying or the permission of the user who uses the device, a personalized manner of displaying the first event is provided for different devices or users, thereby improving universality and flexibility of displaying location information of an event.

In a possible implementation, after the performing a map update operation, the method further includes:

determining, based on the location reference information, that definition of the location information is higher than definition on which currently displaying a location of the first event is based; and displaying the location of the first event based on the location reference manner indicated by the location reference information.

In a possible scenario, when an event changes, for example, the first event may be correspondingly expressed by using respective location reference information based on different moments or different periods.

When a requirement on definition of location information of an accident event is not high, for example, when a congested road is used as an impassable road during vehicle navigation, the vehicle may not determine an event occurrence range of the accident event, provided that a road on which the accident event occurs is determined. In this case, the traffic accident may be expressed by using location information with relatively low definition. When a scenario changes, for example, the first event occurs in a driving process of the vehicle, location information with higher definition needs to be displayed. In this case, it may be determined, based on the location reference information, that definition of the location information is higher than definition on which currently displaying a location of the first event is based; and the location of the first event is displayed based on the location reference manner indicated by the location reference information.

In another possible scenario, in an early stage of occurrence of the accident event, location information with higher definition cannot be obtained. In this case, displayed location information may be location information with low definition. In a development process of the accident event, after more location information may be obtained, the map using apparatus may obtain location information of the first event with higher definition. In this case, when it is determined that definition of obtained updated location information is higher than the definition on which currently displaying the location of the first event is based, the location information with higher definition may be displayed, so as to meet an event display requirement.

According to a third aspect, this application provides a map generation apparatus, including:

a generation module, configured to generate a map, where the map includes location information of a first event and location reference information of the first event, the location information is used to indicate a location at which the first event occurs, and the location reference information is used to indicate a location reference manner on which the location information is based; and
    a sending module, configured to send the map.

In a possible implementation, the map further includes: the location information includes first location information and second location information, and the location reference information includes first location reference information and second location reference information, where the first location reference information is used to indicate a first location reference manner on which the first location information is based, the second location reference information is used to indicate a second location reference manner on which the second location information is based, the second location information is different from the first location information, and the second location reference manner is different from the first location reference manner.

In a possible implementation, the location reference manner includes at least one of a type of a reference coordinate system, a type of a reference point, and a type of a reference line.

In a possible implementation, the reference lines include a lateral reference line and a longitudinal reference line.

In a possible implementation, the type of the reference coordinate system includes at least one of an ENU rectangular coordinate system and a coordinate system along a reference line.

In a possible implementation, the type of the reference point includes at least one of the following plurality of types: a start point of a road central line, a start point of a road edge line, a midpoint of a start line of a lane group, a start point of a lane central line, and a start point of a lane edge line.

In a possible implementation, the type of the reference line includes at least one of the following plurality of types: a central line of a road, an edge line of a road, a central line of a lane, and an edge line of a lane.

In a possible implementation, the map further includes third location information of a second event and event correlation indication information, where the event correlation indication information is used to indicate that the third location information is based on a location reference manner indicated by the location reference information.

According to a fourth aspect, this application provides a map using apparatus, including:

a receiving module, configured to receive a map, where the map includes location information of a first event and location reference information of the first event, the location information is used to indicate a location at which the first event occurs, and the location reference information is used to indicate a location reference manner on which the location information is based; and a map update module, configured to perform a map update operation based on the map; or a display module, configured to display the location information based on the map; or a driving decision-making assistance module, configured to assist in driving decision-making based on the map.

In a possible implementation, the map further includes: the location information includes first location information and second location information, and the location reference information includes first location reference information and second location reference information, where the first location reference information is used to indicate a first location reference manner on which the first location information is based, the second location reference information is used to indicate a second location reference manner on which the second location information is based, the second location information is different from the first location information, and the second location reference manner is different from the first location reference manner.

In a possible implementation, the location reference manner includes at least one of a type of a reference coordinate system, a type of a reference point, and a type of a reference line.

In a possible implementation, the type of the reference coordinate system includes at least one of an ENU rectangular coordinate system and a coordinate system along a reference line.

In a possible implementation, the type of the reference point includes at least one of the following plurality of types: a start point of a road central line, a start point of a road edge line, a midpoint of a start line of a lane group, a start point of a lane central line, and a start point of a lane edge line.

In a possible implementation, the type of the reference line includes at least one of the following plurality of types: a central line of a road, an edge line of a road, a central line of a lane, and an edge line of a lane.

In a possible implementation, the map further includes third location information of a second event and event correlation indication information, where the event correlation indication information is used to indicate that the third location information is based on a location reference manner indicated by the location reference information.

In a possible implementation, the display module is further configured to: in response to a request message, change displaying the first location information to displaying the second location information; where the displaying the first location information is displaying the first location information based on the first location reference manner indicated by the first location reference information, and the displaying the second location information is displaying the second location information based on the second location reference manner indicated by the second location reference information.

In some embodiments, the request message may be generated after the user performs an operation on a map displayed on a display interface, or may be initiated by the vehicle to the map generation apparatus before the vehicle performs driving decision-making. Correspondingly, after determining the location information of the first event and the location reference information of the first event, the map generation apparatus may send the location information of the first event and the location reference information of the first event to the map using apparatus.

In a possible implementation, the display module is further configured to: when a distance between the first event and a vehicle meets a preset condition, change displaying the first location information to displaying the second location information;

where the displaying the first location information is displaying the first location information based on the first location reference manner indicated by the first location reference information, and the displaying the second location information is displaying the second location information based on the second location reference manner indicated by the second location reference information.

In a possible implementation, the first event is on a planned driving route of the vehicle.

In a possible implementation, the driving decision-making assistance module is configured to: when a distance between the first event and a vehicle meets a preset condition, change assisting in driving decision-making based on the first location information to assisting in driving decision-making based on the second location information.

In a possible implementation, the first event is on a planned driving route of the vehicle.

In a possible implementation, the display module is further configured to select the first location information from the first location information and the second location information for display based on an attribute of the first event, and time or a location at which the first event occurs, where the displaying is based on the first location reference manner indicated by the first location reference information.

In a possible implementation, the display module is further configured to select the first location information from the first location information and the second location information for display based on a permission of a device performing displaying or a permission of a user who uses the device, where the displaying is based on the first location reference manner indicated by the first location reference information.

In a possible implementation, after the map update module performs the map update operation, the display module is further configured to: determine, based on the location reference information, that definition of the location information is higher than definition on which currently displaying a location of the first event is based; and display the location of the first event based on the location reference manner indicated by the location reference information.

According to a fifth aspect, this application provides a map, including location information of a first event and location reference information of the first event, where the location information is used to indicate a location at which the first event occurs, and the location reference information is used to indicate a location reference manner on which the location information is based.

In a possible implementation, the map further includes: the location information includes first location information and second location information, and the location reference information includes first location reference information and second location reference information, where the first location reference information is used to indicate a first location reference manner on which the first location information is based, the second location reference information is used to indicate a second location reference manner on which the second location information is based, the second location information is different from the first location information, and the second location reference manner is different from the first location reference manner.

In a possible implementation, the location reference manner includes at least one of a type of a reference coordinate system, a type of a reference point, and a type of a reference line.

In a possible implementation, the reference lines include a lateral reference line and a longitudinal reference line.

In a possible implementation, the type of the reference coordinate system includes at least one of an ENU rectangular coordinate system and a coordinate system along a reference line.

In a possible implementation, the type of the reference point includes at least one of the following plurality of types: a start point of a road central line, a start point of a road edge line, a midpoint of a start line of a lane group, a start point of a lane central line, and a start point of a lane edge line.

In a possible implementation, the type of the reference line includes at least one of the following plurality of types: a central line of a road, an edge line of a road, a central line of a lane, and an edge line of a lane.

In a possible implementation, the map further includes third location information of a second event and event correlation indication information, where the event correlation indication information is used to indicate that the third location information is based on a location reference manner indicated by the location reference information.

According to a sixth aspect, this application provides a map generation apparatus, including a processor and a communication interface. The communication interface is configured to: receive a signal from another communication apparatus other than the map generation apparatus, and transmit the signal to the processor, or send a signal from the processor to the another communication apparatus other than the map generation apparatus. The processor is configured to implement the method according to any design of the first aspect by using a logic circuit or executing a code instruction.

According to a seventh aspect, this application provides a map using apparatus, including a processor and a communication interface. The communication interface is configured to: receive a signal from another communication apparatus other than the map using apparatus, and transmit the signal to the processor, or send a signal from the processor to the another communication apparatus other than the map using apparatus. The processor is configured to implement the method according to any design of the second aspect by using a logic circuit or executing a code instruction.

According to an eighth aspect, this application provides a map generation apparatus, including a processor and a memory, where the memory stores a computer program, and the processor runs the computer program to implement any possible method according to the first aspect.

According to a ninth aspect, a map using apparatus includes a processor and a memory, where the memory stores a computer program, and the processor runs the computer program to implement any possible method according to the second aspect.

According to a tenth aspect, this application provides a map generation apparatus, including a processor and a memory, where the memory stores computer program instructions, and the processor runs the computer program instructions to implement the method according to any design of the first aspect.

According to an eleventh aspect, this application provides a map using apparatus, including a processor and a memory, where the memory stores computer program instructions, and the processor runs the computer program instructions to implement the method according to any design of the second aspect.

According to a twelfth aspect, this application provides a vehicle, where the vehicle generates a map according to the method according to any design of the first aspect, where the map includes location information of a first event and location reference information of the first event, the location information is used to indicate a location at which the first event occurs, and the location reference information is used to indicate a location reference manner on which the location information is based; and sends the map according to the method according to any design of the first aspect.

According to a thirteenth aspect, this application provides a vehicle, where the vehicle uses a map according to the method according to any design of the second aspect.

According to a fourteenth aspect, this application provides a system, including a map generation apparatus and a map using apparatus, where the map generation apparatus may be a map server, a map collection device, a vehicle, or a component in a corresponding device, for example, a chip. The map using apparatus may be a vehicle, a map server, a map collection device, or a component in a corresponding device, for example, a chip. The map generation apparatus generates a map according to the method according to any one of the first aspect, and then sends the map to the map using apparatus. The map using apparatus performs a map update operation, or displays the location information or assists in driving decision-making based on the map according to the method according to any design of the second aspect.

According to a fifteenth aspect, this application provides a chip. The chip may include a processor and an interface. The processor is configured to read instructions by using the interface, to perform the method according to any design of the first aspect, or perform the method according to any design of the second aspect.

According to a sixteenth aspect, this application provides a computer-readable storage medium. The computer-readable storage medium stores a computer program. When the computer program is run, the method according to any design of the first aspect is implemented, the method according to any design of the second aspect is implemented, or the map according to any design of the third aspect is stored.

According to a seventeenth aspect, this application provides a computer program product. When the computer program product runs on a processor, the method according to any design of the first aspect or the method according to any design of the second aspect is implemented.

For specific beneficial effects of the designs in the third aspect to the seventeenth aspect, refer to technical effects that can be achieved by corresponding designs in the first aspect or the second aspect. Details are not described herein again.

In embodiments of this application, descriptions such as "at least one of A, B, and C" should be understood as that A, B, or C may be used alone, or some or all of A, B, and C may be used in any combination.

DESCRIPTION OF EMBODIMENTS

The following explains some terms in embodiments of this application, to facilitate understanding.

(1) Map

A map is an electronic map that exists in a form of electronic data, and the map includes a large amount of interconnected road section information and other related information (such as a level and a type of a road section).

A road-level map provides only road-level navigation information, meeting a navigation requirement of a driving route. For example, the road-level map may provide navigation information such as a quantity of lanes on a current road, speed limit information, turning information, and route planning.

A vector map, such as an open-source vector map, includes road-level information. The road-level information may provide navigation information for a user, to meet a navigation requirement of a driving route. For example, the road-level information may include a quantity of lanes on a current road, speed limit information of the current road, and turning information.

A high-definition map includes road-level information and lane-level information. The lane-level information is used to indicate lane information in a road network environment, for example, information such as a lane curvature, a lane heading direction, a lane central axis, a lane width, a lane marking line, a lane speed limit, lane segmentation, and lane merging. In addition, a lane line status (a dashed line, a solid line, a single line, and double lines) between lanes, a lane line color (white or yellow), a road median, a material of the median, a road arrow, text content, a location, and the like may also be included in the lane-level information.

(2) Map Element

Map elements refer to some elements in a map, including but not limited to a road, a lane line, a sign plate, a ground identifier, a signal light, a drivable region identifier line, and the like. A road may include a guardrail, a road edge, and the like. The sign plate includes various types such as a road sign, an indicative sign, and a height limit sign. The ground identifier includes a traffic diversion identifier, an entrance/exit identifier, a speed limit identifier, a time limit identifier, and the like.

(3) Map Layer

Map data is managed and stored in a file form. Files of different versions represent freshness of high-definition map data. Therefore, it may be determined, based on a version identifier (for example, a version number or version information) of a map, whether there is a to-be-updated map.

Considering diversity of map content, different map layers may be set based on different functions. Elements in each map layer can correspond to functions of the map layer. Map layers are classified based on update frequency of the map layers, and may include a static map layer and a dynamic map layer.

Figure 1A:
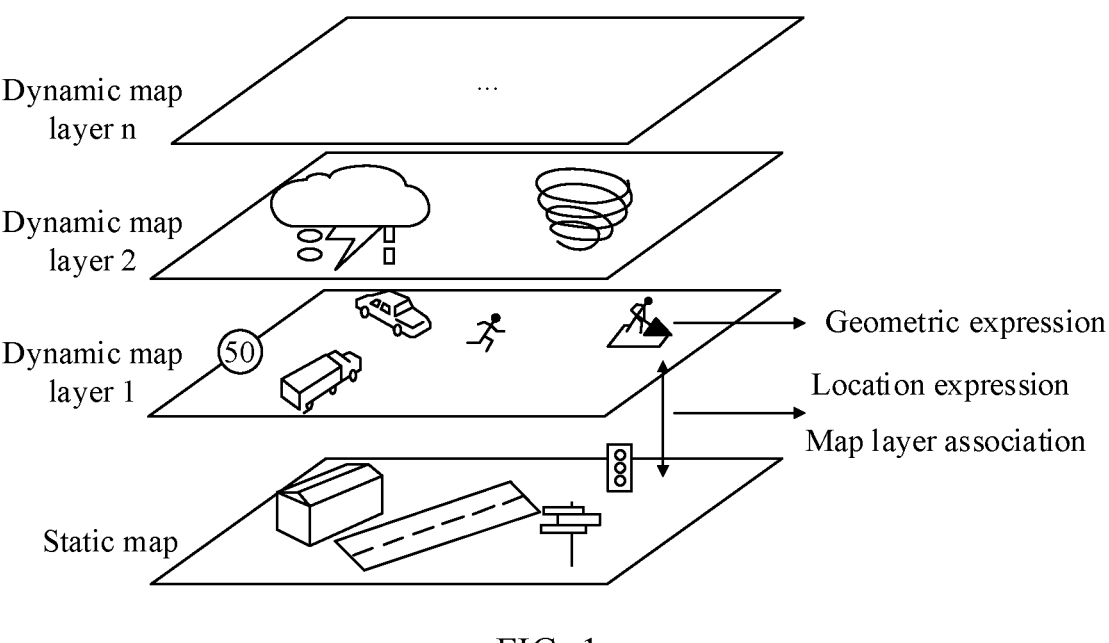
FIG. 1a is a schematic diagram of a structure of a map.

The static map layer mainly refers to some target objects or objects that are not frequently updated and that are relatively low in update frequency in a high-definition map, and may include a road, a lane, an intersection, a road surface identifier, and a road auxiliary facility such as a traffic sign and a traffic light. For another example, information of a road-level static map layer may include information such as road geometry, a road curvature, a road heading direction, a road speed limit, a quantity of lanes, a longitudinal slope, and a lateral slope. In some embodiments, as shown in FIG. 1a, a static map layer part may be a base map part of a map, and the part includes a map layer of a most basic and most commonly used map data element, for example, a map element such as a road, a river, a bridge, a greenfield, a building, or a contour of another ground object. Based on the base map, various map layers may be overlaid to meet application requirements. For example, as shown in FIG. 1a, a lane map layer, a place of interest (POI) map layer (used to set a point of interest, for example, a point of interest such as a restaurant or a gas station), and the like may be included. A vector map layer such as a road direction map layer (used for navigation and route planning), a road traffic jam status map layer, and a satellite map layer may be further included.

The dynamic map layer refers to a map layer that is relatively frequently updated in a high-definition map and is used to express real-time dynamic information. In some embodiments, dynamic information included in the dynamic map layer may be information that may change in a driving process of a vehicle, for example, data that needs to be pushed or updated in real time, such as a changed traffic flow, a real-time road condition, or road repair or road closure. There are various types of dynamic information in the dynamic map layer. The information in the dynamic map layer may further have a time-varying feature, and the information in the dynamic map layer may further have different location expression definition requirements, for example, lane-level location information or road-level location information.

(4) Event

In this application, events may be classified into a static event and a dynamic event. The static event may be an event that does not frequently change, for example, an entity in a static map layer. The dynamic event refers to information that may change with time. The dynamic event may include: a construction event on a lane or a road, a traffic control event, a traffic accident event, bad weather, a natural disaster, or the like. Correspondingly, information about the dynamic event may be traffic control information, traffic accident information, road occupancy construction information, or the like. The dynamic event may be reported to a map generation apparatus by using an Internet of Vehicles message, for example, a vehicle to X (V2X) message, so that the map generation apparatus updates a corresponding dynamic map layer in the map, and a map using apparatus can obtain information about the corresponding event in time subsequently.

It should be noted that the solutions in embodiments of this application may be applied to the Internet of Vehicles, for example, V2X, long term evolution-vehicle (LTE-V), or vehicle to vehicle (V2V). For example, the solutions may be applied to a vehicle having a map generation or map use function, or another apparatus having a map generation or map use function in a vehicle. The another apparatus includes but is not limited to another sensor such as an in-vehicle terminal, an in-vehicle controller, an in-vehicle module, an in-vehicle modular component, an in-vehicle component, an in-vehicle chip, an on board unit, an in-vehicle radar, or an in-vehicle camera. The vehicle may implement the method provided in this application by using the in-vehicle terminal, the in-vehicle controller, the in-vehicle module, the in-vehicle modular component, the in-vehicle component, the in-vehicle chip, the on board unit, the in-vehicle radar, or the in-vehicle camera. For example, the map may be used by an apparatus with a map use function to implement a traffic service. Traffic services in embodiments of this application may be various automatic driving and assisted driving services, for example, route planning and providing a driving risk warning for manual driving. The traffic services are only examples.

Certainly, the solutions in embodiments of this application may be further applied to another device having a map function other than the vehicle, or set in another device having a map function other than the vehicle, or set in a component of the device. The device having a map function may be an intelligent terminal, a server, or the like. The intelligent terminal may be an intelligent transportation device, a smart home device, a robot, or the like, for example, includes but not limited to an intelligent terminal or another sensor such as a controller, a chip, a radar, or a camera in the intelligent terminal, and another component. The server in embodiments of this application may be a local server or a cloud server. The server may be deployed in a plurality of manners. For example, the server may be an independent physical machine. For another example, the server may be a virtual machine (VM) loaded on a physical server. For another example, the server may be a docker loaded on a physical server. In the following embodiments, an example in which the server is a cloud server is used for description, and the cloud server may also be referred to as a cloud.

Figure 1B:
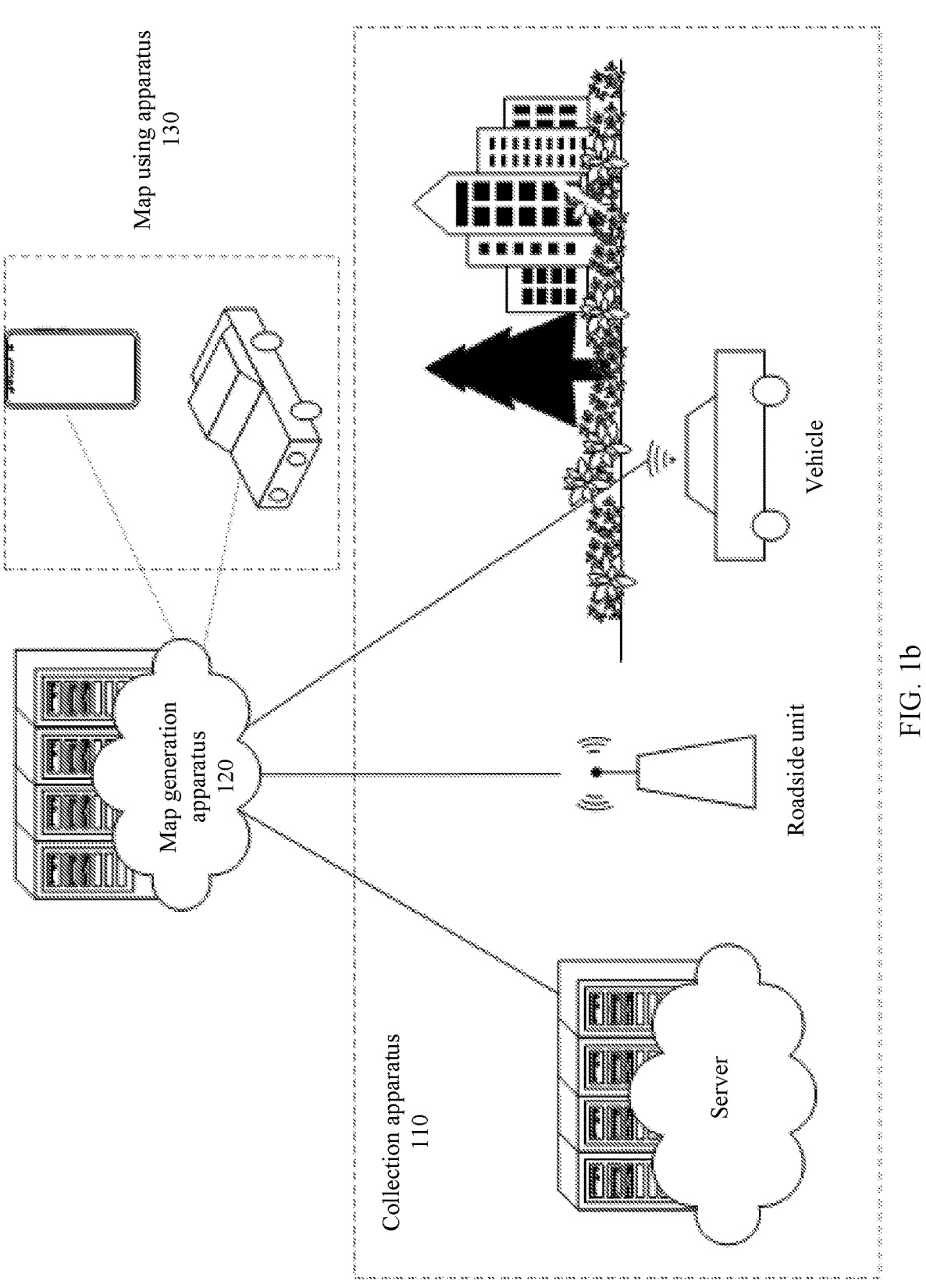
FIG. 1b shows an example of a schematic diagram of a possible system architecture to which an embodiment of this application is applicable.

FIG. 1b is a schematic diagram of a possible system architecture to which an embodiment of this application is applicable. The system architecture shown in FIG. 1b includes a collection apparatus 110 and a map generation apparatus 120. Optionally, the system architecture may further include a map using apparatus 130.

The collection apparatus 110 may be a movable collection apparatus 110, for example, a vehicle, or may be an electronic apparatus (for example, a mobile data center (MDC)) loaded on the vehicle, an in-vehicle chip, or a processor in the vehicle. When the collection apparatus 110 is a vehicle, the vehicle may directly communicate with the map generation apparatus, or may indirectly communicate with the map generation apparatus, for example, forward data by using an intermediate medium such as a roadside unit or a base station.

The vehicle may be a vehicle that is agreed in advance with the map generation apparatus 120 to actively report environment information in a vehicle driving process, for example, a vehicle that joins a passing experience project of the map generation apparatus 120, or a surveying and mapping vehicle that is entrusted by the map generation apparatus 120. For each vehicle that is successfully registered with the map generation apparatus 120, the map generation apparatus 120 may return, to a vehicle owner, a query interface indicating whether the vehicle is allowed to join the passing experience project. If the vehicle owner chooses to join the passing experience project, the vehicle actively reports current environment information to the map generation apparatus 120 in a subsequent driving process. Certainly, the vehicle also receives location information of a target event that is updated by the map generation apparatus 120 based on current environment information reported by each vehicle. In this way, the vehicle can pass through a current road section in a manner that better conforms to a current road environment or lane environment, thereby improving passing experience of the vehicle owner. For another example, the map generation apparatus 120 may further entrust a dedicated surveying and mapping company, and the entrusted surveying and mapping company may dispatch a surveying and mapping vehicle based on a fixed collection period. For example, the surveying and mapping vehicle travels along a city to perform collection and collect environment information on a road in real time in a driving process. Collection may also be performed based on a road section on which or a time period in which traffic congestion frequently occurs.

The collection apparatus 110 may also be a fixed collection apparatus 110, for example, a device such as a roadside unit (RSU). The RSU may be an apparatus that has a communication function and that is installed on one side or two sides of a road. Generally, a roadside unit can establish a connection to an on board unit (OBU) on a vehicle when the vehicle passes by, to implement identity identification of the vehicle. In this embodiment of this application, modules with a collection function, a processing function, and a transceiver function such as a camera, a radar, or a laser transmitter may be further packaged in the roadside unit. The roadside unit can monitor a road in real time by using these function modules, and learn of changed environment information in time when a road environment changes.

Alternatively, the collection apparatus 110 may be a server. For example, the server may be a server disposed in a third-party organization having a sharing function. In the Internet of Vehicles field, a third-party organization may be generally set as a manager of a transportation system, for example, a national transportation management department or a city-level transportation management department or office. The manager of the transportation system has a capability of monitoring each traffic line in the transportation system in real time, and can not only learn of a passing condition of each traffic line in time, but also change a passing manner of the traffic line to some extent, for example, change a speed limit of a traffic line. Road environment information may also be obtained by using the server disposed in the third-party organization.

For another example, the server may be an Internet of Vehicles server. The Internet of Vehicles server may provide a planning and control service for an Internet of Vehicles terminal by maintaining and updating information about a high-definition map (HD MAP), and may further maintain and update information about a map, to provide a navigation service for the Internet of Vehicles terminal. For example, an Internet of Vehicles message including dynamic information in the high-definition map may be sent to the Internet of Vehicles terminal through the roadside unit.

For example, the collection apparatus 110 is located in a vehicle. The collection apparatus 110 may be an apparatus that has a collection function such as a photographing function or a sensing function. The collection function may be implemented by a sensor component such as an in-vehicle camera or an in-vehicle radar disposed on the collection apparatus. A photographing apparatus of the vehicle may be a monocular camera, a binocular camera, or the like. A photographing region of the photographing apparatus may be an external environment of the vehicle. A sensing apparatus of the vehicle may include radars such as a laser radar, a millimeter-wave radar, and an ultrasonic radar that are used to obtain environment information, and may further include an inertial navigation system (for example, a global navigation satellite system (GNSS) or an inertial measurement unit (IMU)) that is used to obtain a vehicle pose. The GNSS may be used to estimate a geographical location of the vehicle. Therefore, the GNSS may include a transceiver and estimate a location of the vehicle relative to the earth based on satellite positioning data. In an example, a computer system in the vehicle may use the GNSS in combination with map data to estimate a road on which the vehicle travels. The IMU may sense a location and orientation change of the vehicle based on an inertial acceleration and any combination thereof. In some examples, a combination of sensors in the IMU may include, for example, an accelerometer and a gyroscope. Positioning information obtained based on the GNSS and information obtained based on another technology (for example, the IMU) are fused, and a fused result is used as a global pose of the vehicle at a current moment. This manner of fusing the information obtained based on the GNSS and information obtained based on another technology (for example, a sensor such as an IMU) to implement positioning may be referred to as combined positioning. Certainly, combined positioning may further be used to perform matching between data collected by another sensor and data of a corresponding sensor that is stored in the map, so as to implement a lane-level positioned location at which the vehicle is currently located. For example, a millimeter-wave radar sensor may use a radio signal to sense a target in a surrounding environment of the vehicle. In some embodiments, in addition to sensing the target, the millimeter-wave radar may be used to sense a speed and/or a heading direction of the target. The laser radar may use laser to sense a target in an environment in which the vehicle is located. The sensor may be used to capture a plurality of images of the surrounding environment of the vehicle. In addition, one or more sensors may be disposed in each vehicle, and there may be one or more sensors of each type. The sensor may be installed at a location such as a top of the vehicle (for example, may be disposed at a middle location of the top of the vehicle), a front end of the vehicle, or the like. In this embodiment of this application, locations and a quantity of sensors installed in each vehicle are not limited.

For example, the collection apparatus is a system formed by a combination of a photographing apparatus and a sensing apparatus, that is, the two apparatuses exist independently, and the two apparatuses are collectively referred to as a collection apparatus; or the collection apparatus may be an apparatus integrating the photographing apparatus and the sensing apparatus; or the collection apparatus may be a sensing apparatus having a photographing function.

The map generation apparatus 120 may be an apparatus, a device, or a chip having an image processing function. For example, the map generation apparatus 120 may include a physical device such as a host or a processor, or may include a virtual device such as a virtual machine or a container, or may include a chip or an integrated circuit.

The map generation apparatus 120 may be a cloud device, a road end device, or a terminal device. The cloud device is, for example, a map server, or a software module, a hardware module, or a chip in the map server. The road end device is, for example, a roadside unit, or a software module, a hardware module, or a chip in the roadside unit. The terminal device is, for example, a vehicle, or a software module, a hardware module, or a chip in the vehicle. The map using apparatus may also be a cloud device, a road end device, or a terminal device. The cloud device is, for example, a map server, or a software module, a hardware module, or a chip in the map server. The road end device is, for example, a roadside unit, or a software module, a hardware module, or a chip in the roadside unit. The terminal device is, for example, a vehicle, or a software module, a hardware module, or a chip in the vehicle.

For example, the map generation apparatus 120 is a server. The server may be a single server, or may be a server cluster including a plurality of servers. In the field of the Internet of Vehicles, the server may be specifically a cloud server, also referred to as a cloud, a cloud end, a cloud server, a cloud controller, an Internet of Vehicles server, or the like. The cloud server is a general term for a device or a component having a data processing capability, for example, may include a physical device such as a host or a processor, or may include a virtual device such as a virtual machine or a container, or may include a chip or an integrated circuit.

The map generation apparatus 120 may also be a vehicle. For example, both the collection apparatus 110 and the map generation apparatus 120 are located in the vehicle, and the vehicle independently completes an entire process of image collection and map generation.

It should be understood that, in this embodiment of this application, types and a quantity of collection apparatuses, a quantity of map generation apparatuses, and a quantity of map using apparatuses in a system architecture are not limited. For example, one map generation apparatus may exchange information with only one type of collection apparatus (for example, a third-party server) and one map using apparatus, or may exchange information with a plurality of types of collection apparatuses (for example, a roadside unit and a crowdsourced vehicle) and one map using apparatus, or may exchange information with a plurality of types of collection apparatuses and a plurality of map using apparatuses. Information exchange between two apparatuses may mean that the two apparatuses directly exchange information in a wired manner or a wireless manner, or may mean that the two apparatuses indirectly exchange information by using one or more other devices. In addition, in addition to the collection apparatus, the map generation apparatus, and the map using apparatus, the system architecture to which this embodiment of this application is applicable may further include another device such as a terminal device, a network device, and a core network device. This is not limited in this embodiment of this application either. In addition, any device in this embodiment of this application may integrate functions into one independent physical unit, or may distribute functions on a plurality of independent physical units. This is not limited in this embodiment of this application either.

The map using apparatus 130 may be a cloud device, a road end device, or a terminal device. The cloud device is, for example, a map server, or a software module, a hardware module, or a chip in the map server. The road end device is, for example, a roadside unit, or a software module, a hardware module, or a chip in the roadside unit. The terminal device is, for example, a vehicle, or a software module, a hardware module, or a chip in the vehicle. The map using apparatus may also be a cloud device, a road end device, or a terminal device. The cloud device is, for example, a map server, or a software module, a hardware module, or a chip in the map server. The road end device is, for example, a roadside unit, or a software module, a hardware module, or a chip in the roadside unit. The terminal device is, for example, a vehicle, or a software module, a hardware module, or a chip in the vehicle.

For example, map use is navigation. When the map using apparatus 130 has a map navigation function, the map using apparatus 130 may obtain a map from the map generation apparatus 120. When the map navigation function is implemented, the user vehicle 130 may first obtain a destination location input by the vehicle owner, then plan, by using a locally stored map, an optimal route from a current location (or a start location input by the vehicle owner) to the destination location, and travel to the destination location based on the optimal route indicated in the map. In addition, when the map generation apparatus 120 determines that a dynamic map layer event in the map changes, the map generation apparatus 120 may send update information of a corresponding updated dynamic map, or may send information about an updated event to the map using apparatus 130. Alternatively, the map using apparatus 130 may actively query, at a preset time, the map generation apparatus 120 for whether an updated event exists, so as to obtain information about the updated event.

For example, the collection apparatus 110 is a vehicle. The sensing apparatus of the vehicle may be used to obtain information about a target event, or the photographing apparatus of the vehicle and the sensing apparatus of the vehicle may be used in combination to collect information about the target event, so as to assist a processing apparatus, a positioning apparatus, and the like in the vehicle in determining location information of the target event.

In a possible solution, when the collection apparatus 110 is a vehicle, after the vehicle is started, the collection apparatus 110 may invoke an in-vehicle camera to photograph a surrounding environment to obtain camera data, invoke a laser radar to sense the surrounding environment to obtain laser radar data, and report the camera data and the laser radar data as the information about the target event to the map generation apparatus 120. In another possible solution, when the collection apparatus 110 is a roadside unit, in a specified time period, the collection apparatus 110 may invoke an in-vehicle camera to photograph a surrounding environment to obtain camera data, invoke a laser radar to sense the surrounding environment to obtain laser radar data, and report the camera data and the laser radar data as the information about the target event to the map generation apparatus 120.

The map generation apparatus 120 projects the camera data onto the laser radar data, constructs a point cloud map by using the laser radar data and the camera data, and marks a traffic entity such as a lane, a traffic sign, a traffic light, and a lane line or information about a traffic event on the point cloud map, to update the map.

Correspondingly, the map using apparatus 130 may obtain information about an event based on the map updated by the map generation apparatus 120, for example, obtain location information of the event, and perform a corresponding operation based on the location information of the event. For example, a road-level congestion degree or a lane-level congestion degree is determined based on the location information of the event, so as to guide vehicle navigation or select lane changing in advance.

Certainly, the foregoing map use is described by using map navigation as an example. The map use may alternatively be a scenario such as map display or map use in combination with another application. This is not limited in this application.

It should be understood that, neither a quantity of collection apparatuses 110 nor a quantity of map generation apparatuses 120 in the system architecture is limited in this embodiment of this application. One map generation apparatus 120 may be simultaneously connected to a plurality of collection apparatuses 110 (for example, simultaneously connected to three collection apparatuses 110 shown in FIG. 1*a*), so that the map generation apparatus 120 makes a map by using different data collected by the plurality of collection apparatuses 110 in parallel. One map generation apparatus 120 may be simultaneously connected to a plurality of map using apparatuses 130. The map using apparatus 130 may obtain in a timely manner information about an event updated by the map generation apparatus, thereby improving accuracy of map use and improving driving experience of the vehicle owner. For another example, the map using apparatus 120 and the map generation apparatus 110 may alternatively be located on a same device or a same chip. This is not limited in this application.

In addition, in addition to the collection apparatus 110 and the map generation apparatus 120, the system architecture to which this embodiment of this application is applicable may further include another device, such as a core network device, a wireless relay device, or a wireless backhaul device. This is not limited in this embodiment of this application either. In addition, the map generation apparatus 120 in this embodiment of this application may integrate all functions into one independent physical device, or may separately deploy different functions on a plurality of independent physical devices. This is not limited in this embodiment of this application either.

In embodiments of this application, "at least one" refers to one or more, and "a plurality of" refers to two or more. In addition, "and/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, "at least one of a, b, or c" may represent {a, b, c, a and b, a and c, b and c, a and b and c}. "at least one of a, b, and c" has a same meaning as "at least one of a, b, or c", that is, may also represent {a, b, c, a and b, a and c, b and c, a and b and c}.

In addition, unless otherwise specified, ordinal numbers such as "first" and "second" mentioned in embodiments of this application are used to distinguish between a plurality of objects, but are not used to limit a sequence, a time sequence, priorities, or importance of the plurality of objects. For example, first location information and second location information are merely used to distinguish between different location information, but do not indicate different priorities, importance levels, or the like of the two pieces of location information.

Based on the system architecture shown in FIG. 1*b*, in a process of using a map, the map using apparatus 130 may obtain the map from the map generation apparatus 120 in advance. The map is usually constructed by the map generation apparatus 120 based on an actually collected traffic environment picture. In consideration that an actual traffic environment in a real world changes in real time, to improve accuracy of map use, the map generation apparatus 120 needs to frequently update the map, especially an event at a dynamic map layer in the map. In consideration of a manner in which an event at a dynamic map layer is expressed based on a geographic coordinate system, a feature of the event at the dynamic map layer may not be well reflected. In addition, because the event at the dynamic map layer changes frequently with time, an excessively large amount of data for updating the map may be caused, and a difficulty of updating the map increases. This is not conducive to updating and using of the dynamic map layer.

Figure 2:
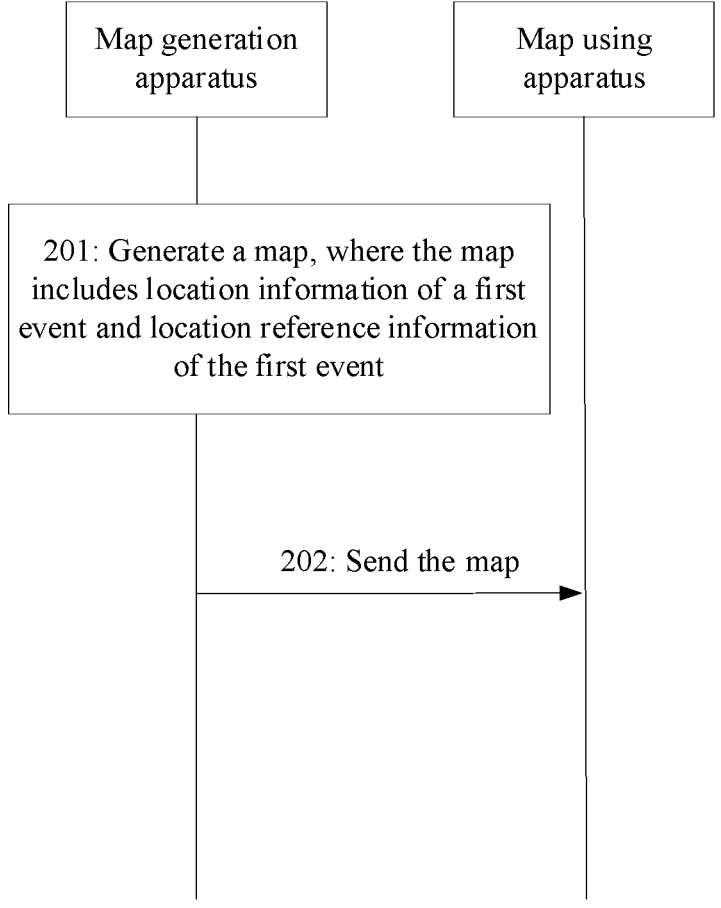
FIG. 2 shows an example of a schematic flowchart of a map generation method according to an embodiment of this application.

Based on the foregoing problem, FIG. 2 shows an example of a schematic flowchart corresponding to a map generation method. The method is applicable to the map generation apparatus 120 shown in FIG. 1*b*. As shown in FIG. 2, the method includes the following steps:

Step 201: Generate a map.

The map includes location information of a first event and location reference information of the first event, the location information is used to indicate a location at which the first event occurs, and the location reference information is used to indicate a location reference manner on which the location information is based.

The location reference manner may include at least one of a type of a reference coordinate system, a type of a reference point, and a type of a reference line. The type of the reference coordinate system includes at least one of an ENU rectangular coordinate system and a coordinate system along a reference line. The type of the reference point includes at least one of the following plurality of types: a start point of a road central line, a start point of a road edge line, a midpoint of a start line of a lane group, a start point of a lane central line, and a start point of a lane edge line. The type of the reference line includes at least one of the following plurality of types: a central line of a road, an edge line of a road, a central line of a lane, and an edge line of a lane. Details are described below.

The location at which the first event occurs may include at least one piece of location information of the first event.

In some embodiments, the first event may be a dynamic event. For example, the first event may be any event that can affect a passing manner of a vehicle, for example, a road condition, a traffic facility, a ground object and topography, a weather condition, or a traffic activity of another traffic participant. For example, the location information of the first event may be location information of a central location of a dynamic event. The location information of the dynamic event may also be location information of a plurality of points, a line segment, and a region corresponding to a range including a plurality of points, a line segment, and a region.

The location, obtained by the map generation apparatus 120, at which the first event occurs may be location information of the first event collected by the collection apparatus 110.

When the collection apparatus 110 performs reporting, the collection apparatus 110 may report a location at which the first event occurs and that is obtained each time to the map generation apparatus 120, or may report only a location at which the first event changes to the map generation apparatus 120. The location at which the first event changes may be a location that changes compared with a location of the first event obtained in a previous collection period, or may be a location that changes compared with the location at which the first event occurs in the map. The location at which the first event occurs may include location information of a collected region. The region may be a dot region, a linear region, or a plane region. The location information of the region may be presented in a form of coordinates. For example, the location information of the dot region is expressed by longitude and latitude coordinates of the dot region in a geographic coordinate system (GCS) or three-dimensional coordinates of the dot region in a projected coordinate system (PCS), the location information of the linear region or the location information of the plane region is expressed by a longitude and latitude coordinate set of the linear region or the plane region in the GCS or a three-dimensional coordinate set thereof in the PCS. Alternatively, the location information of the collected region may be presented in a form of a road section location associated with the region on a map (or a real world). The road section location generally includes a road name, a road section name, and a road section range.

For example, the first event is an accident. The collection apparatus 110 may be a roadside unit. If the roadside unit finds that an accident occurs on the fixed road section during detection, the roadside unit generates, based on location information of the fixed road section and an image of the detected accident, a location at which the first event occurs, and reports the location to the map generation apparatus 120 in real time. After obtaining the location, sent by the roadside unit, at which the first event occurs, the map generation apparatus 120 may determine at least one piece of location information of the first event, for example, use the location information of the fixed road section as one piece of location information of the first event. Alternatively, at least one piece of location information of the first event may be determined after the image of the detected accident is parsed.

For another example, the collection apparatus 110 may be a vehicle. For example, if the vehicle detects, in a driving process, that an accident occurs on a driving road section, the vehicle generates, based on positioning information of the vehicle and an image of the detected accident, a location at which the first event occurs, and reports the location to the map generation apparatus 120 in real time.

After obtaining the location, at which the first event occurs, sent by the collection apparatus 110, the map generation apparatus 120 may determine at least one piece of location information of the first event. For example, based on positioning information of the vehicle and collected image information that are reported by the collection apparatus 110 when being a vehicle, the map generation apparatus 120 may determine, based on an image collected by the vehicle and a positioned location of the vehicle, the location at which the accident occurs, that is, the location information of the first event in the map coordinate system, where the image information includes environment information of the vehicle. Alternatively, the positioned location of the vehicle may be directly used as one piece of location information of the first event.

It should be noted that, the location, obtained by the map generation apparatus 120, at which the first event occurs may also be forwarded to the map generation apparatus 120 after a server other than the map generation apparatus 120 obtains the location at which the first event occurs. This is not limited herein.

The first event may change with time, change with space, be associated with different events, or may be road-level location information or lane-level location information. Therefore, a plurality of types of location reference information may be selected for expressing the first event, so as to meet a requirement of expressing the first event on the map and a requirement of obtaining, by using the map, the first event to execute a map use function, for example, a requirement of guiding vehicle navigation after the first event is obtained by using the map.

The location reference information of the first event may be used to indicate the location reference manner on which the location information is based, for example, a type of a reference coordinate system selected when the location information of the first event is expressed, a type of a reference point or a type of a reference line selected when the location information of the first event is expressed, and geometric topology information such as a point, a line segment, or a region included in the first event. The geometric topology information of the first event may be a range involved by the first event.

The location reference manner may include at least one of the following: a type of a reference coordinate system, a type of a reference point, a type of a reference line, and the like.

In some embodiments, the location reference manner may be one or more of types of reference coordinate systems. For example, the location reference manner may be a rectangular coordinate system. For another example, the location reference manner may be a coordinate system along a reference line. Alternatively, the location reference manner may be a combination of the rectangular coordinate system and the coordinate system along a reference line.

In some embodiments, the location reference manner may be one or more of types of reference points. For example, the location reference manner may be one or more of a start point of a road central line, a start point of a lane central line, a start point of a road central line, a start point of a road edge line, a start point of a lane edge line, and the like.

In some embodiments, the location reference manner may be one or more of types of reference lines. For example, the location reference manner may be one or more of a road central line, a lane central line, a road central line, a road edge line, and a lane edge line.

In some embodiments, the location reference manner may alternatively be one or more of the type of the reference coordinate system and the type of the reference point. For example, the type of the reference coordinate system is a rectangular coordinate system, and the type of the reference point is a start point of a road central line. The location reference manner may be the rectangular coordinate system and the start point of the road central line. For another example, the location reference manner may alternatively be the coordinate system along a reference line and types of one or more reference points, for example, the coordinate system along a reference line, the start point of the road central line, and a start point of a lane central line.

In some embodiments, the location reference manner may alternatively be one or more of the type of the reference coordinate system and the type of the reference line. For example, the type of the reference coordinate system is a coordinate system along a reference line, and the type of the reference line is a road central line. The location reference manner may alternatively be the coordinate system along a reference line and the road central line. For another example, the location reference manner may alternatively be the coordinate system along a reference line and types of one or more reference lines, for example, the coordinate system along a reference line, a road central line, and a lane central line.

In some embodiments, the location reference manner may alternatively be one or more of the type of the reference point and the type of the reference line. For example, the type of the reference point is a start point of a road central line, and the type of the reference line is a lane central line. The location reference manner may be the start point of the road central line and the lane central line.

In some embodiments, the location reference manner may alternatively be one or more of types of reference coordinate systems, one or more of types of reference points, and one or more of types of reference lines.

For example, the location reference manner may be a coordinate system along a reference line, types of one or more reference lines, and types of one or more reference points, for example, the coordinate system along a reference line, a road central line, a lane central line, a start point of a road central line, or a start point of a lane central line.

For another example, the location reference manner may be a coordinate system along a reference line, types of one or more reference lines, and types of one or more reference points, for example, the coordinate system along a reference line, a road central line, a lane central line, a start point of a road central line, a start point of a lane central line, a rectangular coordinate system, a start point of a road central line, and a start point of a lane central line.

After the location reference information of the first event is determined, first location information of at least one piece of location information of the first event relative to the location reference information may be determined, so as to determine an expression manner of the location information of the first event on the map.

Correspondingly, after the first location information that is of the first event and that is expressed in the location reference information is determined, the first event may be stored in a corresponding dynamic map layer, to obtain an updated map. In the updated map, information such as a text or a pattern of "accident" or an accident range may be displayed at a location corresponding to the first event, for example, a road section corresponding to the first event.

For example, the first event at the dynamic map layer of the map may include at least one of the following: first location information, geometric topology information, location reference information, attribute information of a dynamic event, and the like.

The geometric topology information may indicate a range involved in the location information of the first event. Feature information of the dynamic event may include different definition feature information such as feature information of the dynamic event that changes with time, feature information of the dynamic event that changes with space, road-level location information of the dynamic event, and lane-level location information of the dynamic event. The feature information of the dynamic event may alternatively be associated with different events, and association between the different events may also affect expression of the dynamic event in the map. For example, an accident event may be associated with a traffic flow event. In this case, after the accident event is updated, the map generation apparatus 120 may further update the traffic flow event.

Step 202: The map generation apparatus sends the map to the map using apparatus.

Figure 3A:
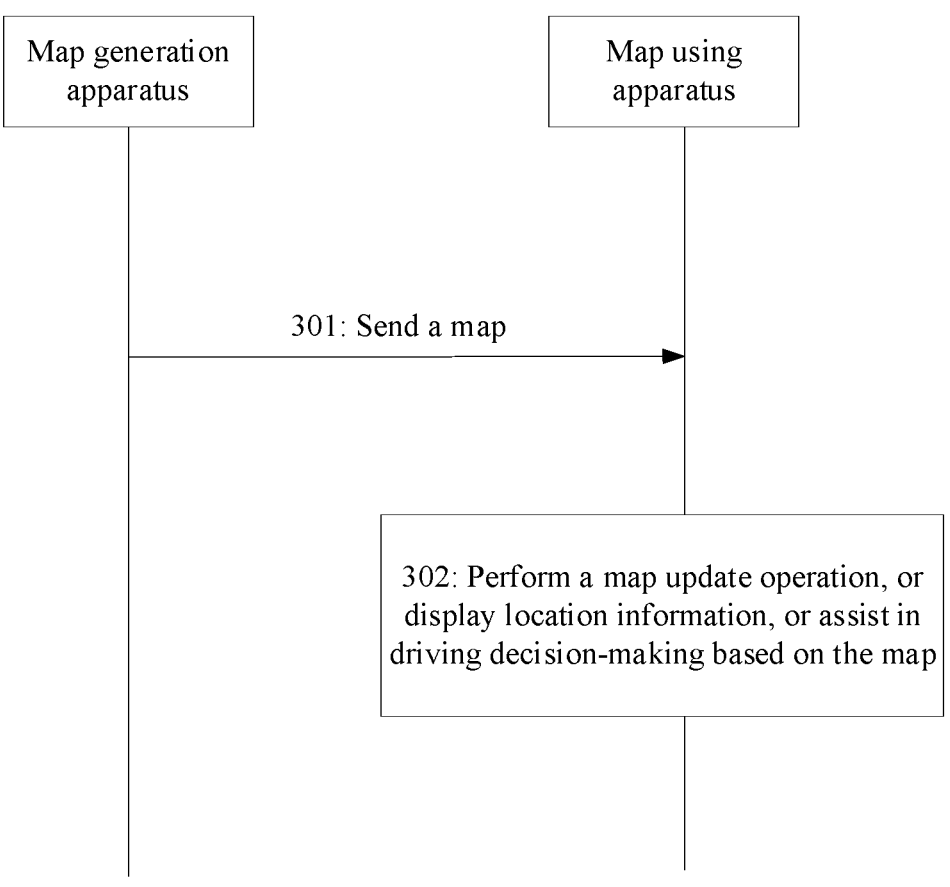
FIG. 3a is a schematic flowchart of a map using method according to an embodiment of this application.

Optionally, FIG. 3*a* shows an example of a schematic flowchart corresponding to a map using method. The method is applicable to the map using apparatus 130 shown in FIG. 1*b*. As shown in FIG. 3*a*, the method includes the following steps:

Step 301: The map using apparatus receives a map.

Specifically, the map using apparatus receives a map sent by a map generation apparatus.

The map includes location information of a first event and location reference information of the first event, the location information is used to indicate a location at which the first event occurs, and the location reference information is used to indicate a location reference manner on which the location information is based.

In a possible implementation, after determining that the first event in the map is updated, the map generation apparatus may send, to the map using apparatus, the location information that is of the first event and that is expressed in the location reference information of the first event.

For example, in a possible scenario, definition of a location at which the first event occurs and that is currently obtained by the map generation apparatus can be used to express only road-level location information of the first event. In this case, the map generation apparatus may determine the location information of the first event based on road-level location reference information. After obtaining more information about the first event, the map generation apparatus may determine lane-level information of the first event, for example, may determine a lane-level range in which the first event is located. In this case, the map generation apparatus may determine the location information of the first event based on the road-level location reference information and/or determine the location information of the first event based on lane-level location reference information.

In another possible implementation, the map generation apparatus determines the location information of the first event and the location reference information of the first event in response to a request message. The request message may be generated after a user performs an operation on map information, navigation information, and the like that are displayed on a display interface, or may be initiated by a vehicle to the map generation apparatus before the vehicle performs driving decision-making.

Driving decision-making may be decision-making on vehicle speed control, acceleration, deceleration, emergency braking, a vehicle driving direction, a vehicle driving lane, avoidance, lane changing, or the like. This is not limited in this application.

Correspondingly, after determining the location information of the first event and the location reference information of the first event, the map generation apparatus may send the location information of the first event and the location reference information of the first event to the map using apparatus.

In a possible implementation, the map generation apparatus may determine, based on a selection or driving decision-making requirement of the user, whether the location reference information corresponding to the first event is road-level location reference information or lane-level location reference information based on the selection or driving decision-making requirement of the user (for example, the map generation apparatus may determine the selection or driving decision-making requirement of the user after receiving a request message sent by the map using apparatus) after the map generation apparatus obtains the location at which the first event occurs; and thereby determine the location information of the first event, and send the location information to the map using apparatus. Correspondingly, the map using apparatus may display the location information of the first event.

In another possible implementation, after obtaining the location at which the first event occurs, the map generation apparatus may determine that the location reference information corresponding to the first event is road-level location reference information and lane-level location reference information, and the map generation apparatus generates location information of the first event in the road-level location reference information and location information of the first event in the lane-level location reference information. In addition, the location information of the first event in the road-level location reference information and the location information of the first event in the lane-level location reference information are stored on the map.

Step 302: Perform a map update operation, or display the location information, or assist in driving decision-making based on the map.

In an optional implementation, update information for the first event at a first map layer (for example, a road map layer or a lane map layer) of the map may include: an update identifier, used to indicate an update of the first event; the location information of the first event, used to indicate a range of a location to which the updated first event is applicable; and an attribute of the first event, which may be a passing attribute or a congestion attribute of a road or a lane, and may be expressed in a manner of being displayed as connected or green at the first map layer when the attribute is passable, or may be expressed in a manner of being displayed as disconnected or red at the first map layer when the attribute is impassable. Optionally, a congestion degree of a location corresponding to a road or a lane may be further distinguished by using a color. This is not limited herein.

The map using apparatus may update the first map layer in the map using apparatus based on the update information of the first event. Therefore, after the update, a road or a lane that can be passed by the vehicle is determined by using a corresponding road congestion status, to notify the user vehicle to preferentially complete passing by referring to passable location information.

In another possible implementation, the map using apparatus displays the first event by using the updated map based on the first location information that is of the first event and that is expressed in the location reference information of the first event. In this way, the map using apparatus may guide vehicle navigation based on the first event.

In some embodiments, the map using apparatus determines, based on the location reference information, that definition of the location information is higher than definition on which currently displaying a location of the first event is based; and displays the location of the first event based on the location reference manner indicated by the location reference information. Correspondingly, the map using apparatus may further guide vehicle navigation based on the updated first event, to improve a vehicle navigation effect.

In some embodiments, the map using apparatus changes displaying the first location information to displaying the second location information in response to a request message.

The request message may be generated after the user performs an operation on map information displayed on a display interface, or may be initiated by the vehicle to the map generation apparatus before the vehicle performs driving decision-making.

In a possible implementation, the map using apparatus generates an obtaining request message of the first event in response to the request message, and sends the obtaining request message of the first event to the map generation apparatus. Correspondingly, the map using apparatus receives the response message of the first event from the map generation apparatus. The response message of the first event includes the location information of the first event and the location reference information of the first event, and the location reference information is determined by the server based on at least one piece of location information of the first event.

In another possible implementation, after the map using apparatus obtains, based on a selection or driving decision-making requirement of the user, information about the location at which the first event occurs, the map using apparatus may determine, based on a selection of the user, whether the location reference information corresponding to the first event is road-level location reference information or lane-level location reference information, so as to determine the location information of the first event expressed by the location reference information, and display the location information of the first event.

In consideration of a need for map use, the first event may be expressed based on different location reference manners. For example, the location information includes first location information and second location information, and the location reference information includes first location reference information and second location reference information, where the first location reference information is used to indicate a first location reference manner on which the first location information is based, the second location reference information is used to indicate a second location reference manner on which the second location information is based, the second location information is different from the first location information, and the second location reference manner is different from the first location reference manner.

Figure 3B:
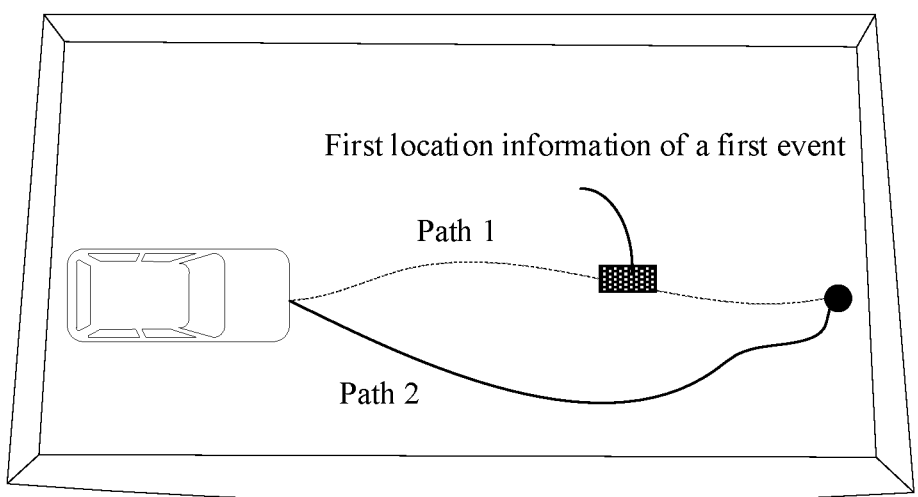
FIG. 3b to FIG. 3e are schematic diagrams of using a map according to an embodiment of this application.

For example, the first location reference manner is a road-level reference manner, and the second location reference manner is a lane-level reference manner. In other words, the first location information is road-level location information, and the second location information is lane-level location information. For example, when the vehicle does not start to travel, but uses the map to view a road condition and select a navigation path, the vehicle or the user may care about only a congestion status at a road level. In this case, for example, the first location information of the first event is road-level location information. As shown in FIG. 3*b*, a first event exists on a path 1. In this case, when the path 1 is displayed, first location information of the first event may be displayed.

For another example, in a process in which the user or the vehicle has started to travel, the map using apparatus obtains, by using the map generation apparatus, that congestion occurs ahead on the road, and when selecting to pass through the congested road, the user may more need to obtain lane-level location information of the first event, so as to better avoid a congested location and improve vehicle passing experience.

Correspondingly, the map using apparatus may determine, based on the selection of the user, whether the location reference information corresponding to the first event is road-level location reference information or lane-level location reference information. For example, when it is determined that road-level location reference information is used to express the location of the first event, the location information of the first event in the road-level location reference information may be invoked from the map.

Figures 3C, 3D:
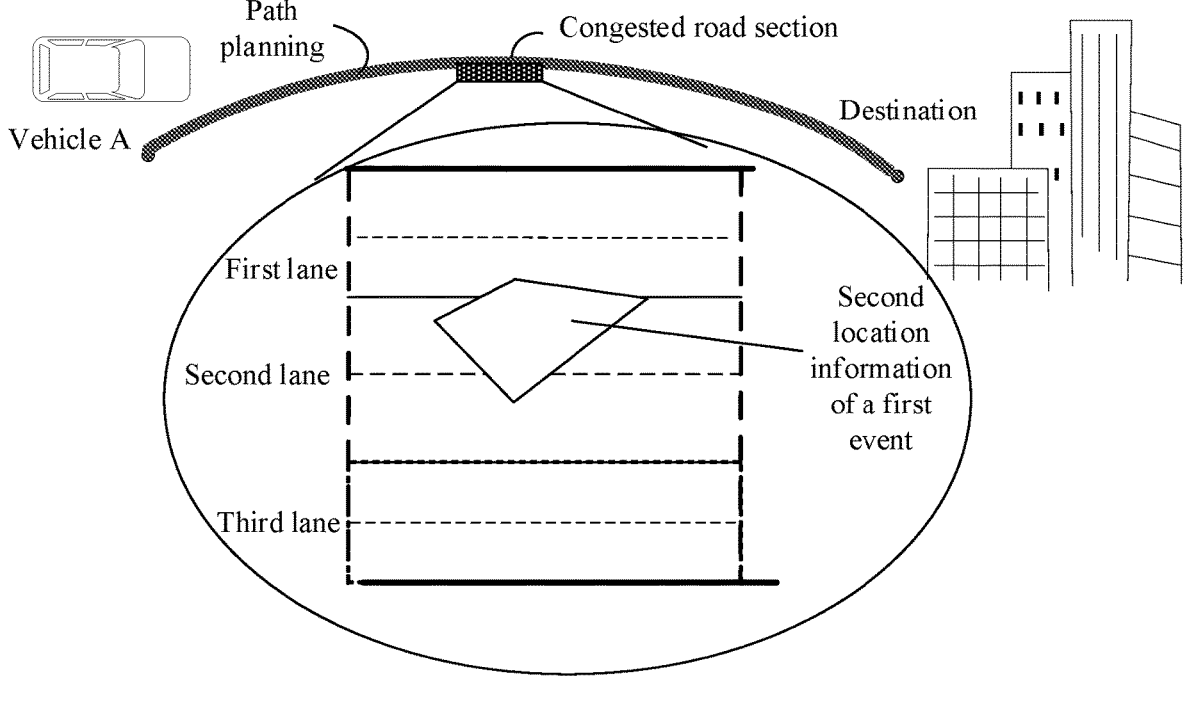

For example, the first location information of the first event is road-level location information, and the second location information of the first event is lane-level location information. For example, as shown in FIG. 3*c*, in response to the request message, where the request message may be triggered by the user, for example, the user may tap a location corresponding to a congested road section. In response to the tap operation, the map using apparatus may change displaying the first location information (for example, FIG. 3*b*) of the first event to displaying the second location information of the first event.

In some other embodiments, when a distance between the first event and the vehicle meets a preset condition, displaying the first location information is changed to displaying the second location information, where the distance between the first event and the vehicle is determined based on the location of the vehicle and the location information of the first event, and the first event is in route planning of the vehicle. The displaying the first location information is displaying the first location information in the first location reference manner indicated by the first location reference information, and the displaying the second location information is displaying the second location information based on the second location reference manner indicated by the second location reference information.

That the distance between the first event and the vehicle meets the preset condition may be determined based on whether the distance is less than a preset threshold or greater than the threshold. Optionally, for example, whether the distance is greater than the threshold is whether the preset condition is met. A different threshold may be set for each lane. For example, as shown in FIG. 3*d*, when the vehicle is on a first lane, the vehicle needs to change to a third lane earlier to ensure smooth communication. When the vehicle is on a second lane, the vehicle may change the lane later than the first lane, and the third lane may display the second location information later than the first lane and the second lane. Therefore, as shown in FIG. 3*d*, when the vehicle is on the first lane, the second location information may be displayed when a distance between a location point A of the first event on the first lane and the vehicle is greater than or equal to a first threshold. When the vehicle is on the second lane, the second location information may be displayed when a distance between a location point B of the first event on the second lane and the vehicle is greater than or equal to a second threshold. When the vehicle is on the third lane, the second location information may be displayed when a distance between a location point C of the first event on the third lane and the vehicle is greater than or equal to a third threshold. In this way, driving experience of the user is improved, and passing efficiency of the vehicle is improved.

In some other embodiments, when the distance between the first event and the vehicle meets the preset condition, driving decision-making is performed based on the second location information.

The distance between the first event and the vehicle is determined based on the location of the vehicle and the location information of the first event, and the first event is in route planning of the vehicle. The displaying the first location information is displaying the first location information in the first location reference manner indicated by the first location reference information, and the displaying the second location information is displaying the second location information based on the second location reference manner indicated by the second location reference information.

For example, that the distance between the first event and the vehicle meets the preset condition may be determined based on whether the distance is less than a preset threshold or greater than the threshold. Optionally, for example, whether the distance is greater than the threshold is whether the preset condition is met. A different threshold may be set for each lane. For example, with reference to FIG. 3*d*, when the vehicle is on the first lane, the vehicle may be controlled to change the lane when the distance between the location point A of the first event on the first lane and the vehicle is greater than or equal to the first threshold. When the vehicle is on the second lane, the vehicle may be controlled to change the lane when the distance between the location point B of the first event on the second lane and the vehicle is greater than or equal to the second threshold. When the vehicle is on the third lane, the vehicle may be controlled to slow down when the distance between the location point C of the first event on the third lane and the vehicle is greater than or equal to the third threshold. In this way, driving experience of the user is improved, and passing efficiency of the vehicle is improved.

In yet another possible implementation, the first location information is selected from the first location information and the second location information for display based on an attribute of the first event, and the displaying is based on the first location reference manner indicated by the first location reference information.

The attribute of the event may include an accident event, a traffic flow event, a weather type, and the like; and may further include a road-level event or a lane-level event. For another example, the attribute of the event may be determined based on time change frequency. For example, the determined attribute of the event is a fast-updated event or a slow-updated event based on a speed at which the event changes with time. Location information corresponding to the event may also be correspondingly determined based on the attribute of the event that changes with different time, and the location information is corresponding to one type of location reference information for expression. For example, the weather event may be displayed based on road-level location information.

In still another possible implementation, the first location information is selected from the first location information and the second location information for display based on time at which the first event occurs, and the displaying is based on the first location reference manner indicated by the first location reference information.

In a possible scenario, for example, the first event is a traffic flow event, and the location information of the traffic flow event may be road-level location information, or may be lane-level location information. In this case, a morning and night rush hour and a non-morning and night rush hour may be divided based on a congestion degree of a traffic flow, or may be divided based on time such as a working day, a non-working day, or a holiday.

In a possible embodiment, it is considered that displaying may be performed based on different location information at different time. For example, in a non-morning and evening rush hour, road-level location information may be displayed, so as to reduce map display complexity. In a morning and night rush hour, lane-level location information may be displayed, so as to improve driving experience of the user driving the vehicle by using the map.

In another possible embodiment, in the morning and night rush hour, the user may be further reminded, in a reminder manner, whether to view lane-level location information, and the lane-level location information is displayed after the user confirms to view the lane-level location information. In the non-morning and night rush hour, road-level location information is displayed by default, and the user is not reminded whether to view lane-level location information.

In still another possible implementation, the first location information is selected from the first location information and the second location information for display based on the location at which the first event occurs, and the displaying is based on the first location reference manner indicated by the first location reference information.

Figure 3E:
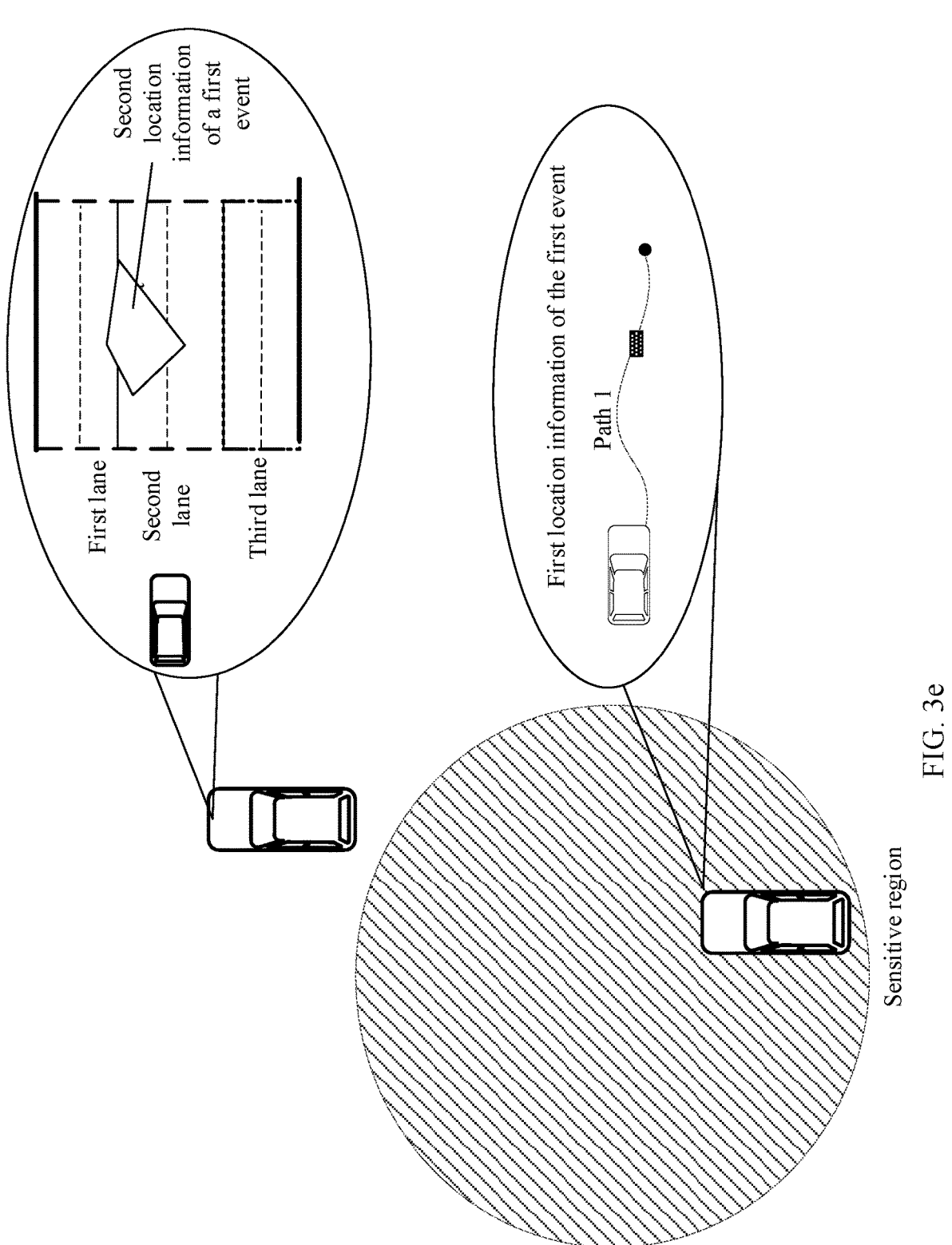

In another possible scenario, the location at which the first event occurs may be located in a sensitive region. For example, it is determined to display the first location information of the first event based on a display requirement of the sensitive region. For example, the first location information includes location information that is allowed to be displayed in the sensitive region. In some embodiments, as shown in FIG. 3*e*, the first location information that is of the first event and that can be displayed may be location information with relatively low display definition. After the sensitive region is exited, the first location information of the first event may be updated to high-definition location information.

In still another possible scenario, the location at which the first event occurs may be located in a region with complex terrain. For example, the first event is located near a viaduct. In this case, lane-level location information may be preferentially displayed, to improve user experience of using the map by the user, and avoid a problem that the first event is incorrectly displayed due to inaccurate positioning of the road-level location information. For example, the vehicle is located under the viaduct, and map display is started. In this case, the first event occurs on a lane on the viaduct. If road-level location information is displayed, the first event may be displayed on the map, and consequently, and is considered mistakenly by the user as a first event that occurs on the ground of the viaduct, and the user selects another route for driving. In this case, lane-level location information may be selected for display, that is, a lane in which the first event occurs on the viaduct is displayed, or the first event is not displayed, and the first event is displayed after it is determined that the vehicle travels on the viaduct, thereby improving map use experience of the user.

In still another possible implementation, the first location information is selected from the first location information and the second location information for display based on a permission of a device performing displaying or a permission of a user who uses the device, where the displaying is based on the first location reference manner indicated by the first location reference information.

For example, the user may be a driver or a passenger of the vehicle. The driver of the vehicle may be a vehicle owner, or may be a non-vehicle owner. Therefore, user permissions may be correspondingly set for different users who use the vehicle. The user permission may be set by the map generation apparatus for the user, or may be set by the map using apparatus for the user, or may be set by a third party such as an operator for the user. This is not limited herein.

For another example, a permission may be further set for a device that displays a map. When the device is located in the vehicle, the permission may be a permission of the user, or may be a permission of the vehicle, or may be a permission separately set for the device. Alternatively, the permission may be a permission set for the device. This is not limited herein.

In a possible implementation, the map using apparatus may determine, after verifying the user and obtaining a permission of the user, location information of the first event that can be displayed, and display the location information. Alternatively, the map using apparatus may determine, after verifying the vehicle and obtaining a permission of the vehicle, location information of the first event that can be displayed, and display the location information. A verification manner is not limited in this application.

In a possible implementation, after the map update operation is performed, the method further includes: determining, based on the location reference information, that definition of the location information is higher than definition on which currently displaying a location of the first event is based; and displaying the location of the first event based on the location reference manner indicated by the location reference information.

The following uses Manner 1 and Manner 2 and Scenario 2 to Scenario 5 as examples to describe the location reference information of the first event and the location information of the first event that is expressed based on the reference manner of the location reference information.

To improve flexibility and universality of an expression of a dynamic event and expression in different definition, in the map using apparatus 120 and the map generation apparatus 130, the location information of the first event may be expressed in a plurality of implementations. The following uses an example in which the location reference information includes the type of the coordinate system, the type of the reference point, and the type of the reference line to describe optional location reference information of location information of an event (for example, the first location information of the first event or the third location information of the second event).

Location reference information of an event expression may include location reference information, geometric topology information, and the like. The location reference manner may include the type of the reference coordinate system, the type of the reference point, the type of the reference line, and the like. The geometric topology information may include at least one piece of geometric location information. A data structure corresponding to the location reference information used for event expression may include a field name, a field type, a data type, and the like. A data format of a proto buffer is used as an example. For example, as shown in Table 1, the type of the reference coordinate system may be a rectangular coordinate system in Manner 1. In this case, 1 carried in a field RefCoordType may be used to indicate that the type of the reference coordinate system may be the rectangular coordinate system. The type of the reference coordinate system may be a coordinate system along a reference line in Manner 2. In this case, 2 carried in the field RefCoordType may be used to indicate that the type of the reference coordinate system may be the coordinate system along a reference line. The type of the reference point and the type of the reference line (for example, a type of a lateral reference line and a type of a longitudinal reference line) may be indicated in an exhaustive manner shown in Table 1, and more types may further be included. For a specific manner, refer to descriptions in Table 2 and Table 3 below.

It should be noted that the field type may include a Required field, an Optional field, a Repeated field, and the like. The repeated field indicates that the field is used to represent that the type is an array or a list. For example, when the geometric topology information of the event is described, a plurality of geometric locations may be used at the same time, or the repeated field may be empty. This is not limited herein.

TABLE 1

| Event location information EventLocation | | | | |
|---|---|---|---|---|
| Location reference information | Field | Field type | Data type | Description |
| Type of a reference coordinate system | RefCoordType | Optional | Integer | 1. Rectangular coordinate system ($\Delta x$, $\Delta y$); 2. Coordinates along a reference line, that is, a longitudinal distance x and a lateral distance y along the reference line |

TABLE 1-continued

| Event location information EventLocation | | | | |
|---|---|---|---|---|
| Location reference information | Field | Field type | Data type | Description |
| Type of a reference point | RefPointType | Optional | Integer | 1. Start point of a road central line;<br>2. Start point of a left edge line of a road along a vehicle traveling direction;<br>3. Start point of a right edge line of a road along a vehicle traveling direction;<br>4. Midpoint of a start line of a lane group;<br>5. Start point of a lane central line;<br>6. Start point of a left edge line of a lane along a vehicle traveling direction;<br>7. Start point of a right edge line of a lane along a vehicle traveling direction;<br>. . . |
| Type of a longitudinal reference line | LongitudinalRefLineType | Optional | Integer | 1. Road central line;<br>2. Left edge line of a road along a vehicle traveling direction; |
| Type of a lateral reference line | LateralRefLineType | Optional | Integer | 3. Right edge line of a road along a vehicle traveling direction;<br>4. Lane central line;<br>5. Left edge line of a lane;<br>6. Right edge line of a lane;<br>. . . |
| Geometric location | GeoPoint | Optional | GeometryPoint | |
| Geometric location | GeoPolygon | Optional | GeometryPolygon | |
| Geometric location | GeoCircle | Optional | GeometryCircle | |
| Geometric location | GeoLine | Optional | GeometryLine | |
| . . . | | | | |

Figure 4A:
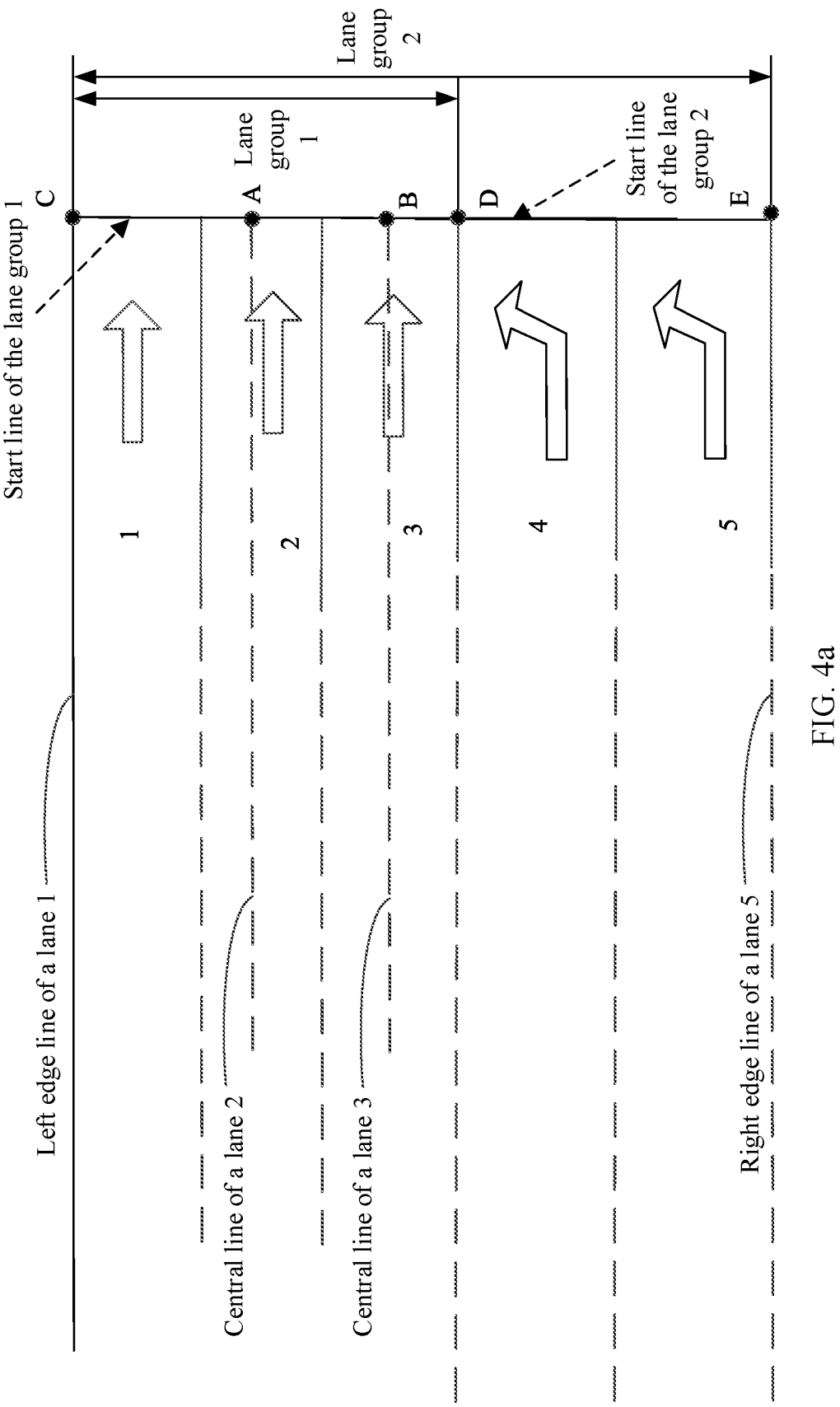
FIG. 4a is a schematic diagram of a midpoint of a start line of a lane group according to an embodiment of this application.

It should be noted that the lane group may be a lane group including a plurality of lanes in a same vehicle traveling direction, or may be a lane group including a plurality of lanes with a same driving identifier. As shown in FIG. 4a, a lane group 1 is a lane group of straight ahead lanes including a lane 1 to a lane 3, and a lane group 2 is a lane group of all same-direction lanes including the lane 1 to a lane 5. The midpoint of the start line of the lane group may be defined in two manners. In the first manner, an intersection point of a lane central line of a middlemost lane in the lane group and the start line of the lane group is determined as the midpoint of the start line of the lane group. In this case, a midpoint of a start line of the lane group 1 is a point A in FIG. 4a, and a midpoint of a start line of the lane group 2 is a point B in FIG. 4a. Alternatively, in the second manner, a midpoint of a connection line between two intersection points of two edge lines of the lane group and the start line of the lane group is determined as the midpoint of the start line of the lane group. In this case, the midpoint of the start line of the lane group 1 is a midpoint of a connection line between a point C and a point D in FIG. 4a, and the midpoint of the start line of the lane group 2 is a midpoint of a connection line between the point C and a point E in FIG. 4a. Widths of a plurality of lanes in the lane group are generally the same. Therefore, when a quantity of lanes included in the lane group is an odd number, the midpoints of the start lines of the lane group determined in the foregoing two manners may overlap. To be specific, in FIG. 4a, the point A is the midpoint of the connection line between the point C and the point D, and the point B is the midpoint of the connection line between the point C and the point E.

In some embodiments, the location reference information may further include at least one of the following: road-level location reference information or lane-level location reference information.

The attribute of the event may include an accident event, a traffic flow event, a weather type, and the like; and may further include a road-level event or a lane-level event. For another example, the attribute of the event may be determined based on time change frequency. For example, the determined attribute of the event is a fast-updated event or a slow-updated event based on a speed at which the event changes with time. The location information corresponding to the event may also be correspondingly set based on the attribute of the event that changes with different time.

For example, the location reference information may be set based on a requirement of event expression. In addition, a suitable expression manner of geometric topology information may be selected. For example, a plurality of geometric locations are selected to express the geometric topology information of the event. For an expression manner of the geometric location, references may be made to expression manners of the reference point and the reference line. This is not limited herein. The type of the reference point and the type of the reference line may be extended, including but not limited to specific examples in the table.

The following specifically describes the expression manner of the type of the reference point.

A reference point is a node used to describe information about a road or an event, or may be a location used to describe a lane attribute change. The reference point may be the start point of the road central line, the start point of the lane central line, or the like, or may be a reference point determined based on an expression of an event or a map. For example, the reference point may be set at a lane start point, a lane end point, an intersection, or a lane change location. The type of the reference point may include but is not limited to any one or more of the following: lane start and end points, a lane change point, or start and end points of an exclusive right-turn lane. The lane start and end points include a lane start point and a lane end point. The lane start and end points include start points and end points of several lane lines on a road. The lane start point is a point on a lane start line, and the lane end point is a point on a lane stop line. Usually, in actual application, the lane start line and a reverse lane stop line are in a same straight line. The lane change point may be a fork point generated by adding a turning lane when some roads are close to an intersection, may be a convergence point generated by reducing one lane when a new road is entered through the intersection, or may be a fork junction of an exit lane of a highway/viaduct or a convergence point of an entrance lane of the highway/ nected to the exclusive right-turn lane. It should be noted that a meaning of the reference point may be extended to a lane information change point in any working condition. Examples of the type of the reference point are merely illustrative. The type of the reference point may further include another type, or may be another type. This is not limited in this application.

A location of the reference point may be a point coordinate value of the reference point in a rectangular coordinate system, that is, a geographical coordinate of the reference point. There are many methods for determining the location of the reference point. For example, a manual labeling method may be used to collect a location of each reference point. Optionally, locations of exclusive right-turn lane start and end points and lane start and end points may be determined in this method. Alternatively, the location of the reference point may be determined by using data collected by a sensor and data collected by a GNSS. This is not limited herein.

The type of the reference point may include one or more of the following: an identifier ID of the reference point (node), a mesh mesh_ID, on a map, to which the reference point is mapped, a type ID (for example, a road ID or a lane ID), on the map, to which the reference point is mapped, or the type of the reference point. The type of the reference point is used to describe a relationship between the reference point and the map. For example, the type of the reference point (or a type of a dynamic map layer corresponding to an event related to the reference point) may be expressed by using Table 2.

TABLE 2

| Type of a reference point | Data type | Meaning |
|---|---|---|
| node_ID | int | Globally unique ID of a reference point |
| mesh_ID | int | Mesh ID associated with a reference point |
| road_ID | int | Road ID associated with a reference point |
| lane_ID | int | Bidirectional road: [−n, . . . , −1] an nth reverse lane to the 1st reverse lane<br>[0] central lane line<br>[1, . . . , n] the 1st forward lane to an nth forward lane<br>Unidirectional road: [0, . . . , n] the 0th forward lane to an nth forward lane |
| node_type | int | 0: Lane change point;<br>1: Lane start and end points;<br>2: Exclusive right-turn lane start and end points;<br>3: Start point of a road central line;<br>4: Start point of a road edge line;<br>5: Midpoint of a start line of a lane group;<br>6: Start point of a lane central line;<br>7: Start point of a lane edge line |
| node_type_2 | int | Lane change point: −1 quantity of lanes decreases<br>1 quantity of lanes increases<br>Lane start and end points: −1 start point<br>1 end point<br>Exclusive right-turn lane start and end points: −1 start point<br>1 end point | viaduct. In conclusion, the lane change point may include but is not limited to any one or more of the following: the fork point generated when a quantity of lanes increases, the convergence point generated when the quantity of lanes decreases, the fork junction of the exit lane of the highway (and/or the viaduct), and the convergence point of the entrance lane of the highway (and/or the viaduct). The exclusive right-turn lane start and end points include a start intersection point and an end intersection point that are of a lane line (or an extension line of the lane line) of the exclusive right-turn lane and two lane lines that are con- As shown in Table 2, the identifier (node_ID) of the reference point is used to indicate a globally unique ID of the reference point, and is used to distinguish between different reference points. The ID may also be denoted as an id. node_ID is an automatically generated identifier. The mesh identifier (mesh_ID) is used to indicate a mesh ID, on the map, to which the reference point is mapped, to distinguish between different meshes, and to establish a mapping relationship between the reference point and the mesh of the map. mesh_ID is derived from the attribute of the road line on the map. The mesh is an attribute in the map, and is used to quickly determine a location in the map. There may be a plurality of type IDs. For example, when the type is a road, the type ID is a road identifier (road_ID) used to indicate a road ID, on the map, to which the reference point is mapped, used to distinguish between different roads, and used to establish a mapping relationship between the reference point and the road in the map. When the type is a lane, the type ID is a lane identifier (lane_ID) is used to indicate a lane ID, on the map, to which the reference point is mapped, is used to distinguish between different lanes, and is used to establish a mapping relationship between the reference point and the lane in the map.

road_ID is derived from the attribute of the road line on the map. The lane ID or a lane line ID (lane_ID) is used to indicate a sequence number of a lane in which the reference point is located, and is used to distinguish between different lane lines. For example, a bidirectional road includes a forward lane and a reverse lane. Sequence numbers [−n . . . -1] may be used to indicate an nth reverse lane to the first reverse lane. [0] indicates a central lane line. Sequence numbers [1 . . . n] indicate the first forward lane to an nth forward lane. For a unidirectional road, the sequence numbers [0, . . . , n] may be used to indicate a 0th forward lane to an nth forward lane. The type of the reference point includes a type 1 (node type) of the reference point and a type 2 (node_type_2) of the reference point. The type 1 of the reference point includes a lane change point, lane start and end points, and exclusive right-turn lane start and end points. Different types are indicated by different sequence numbers, index numbers, or IDs. For example, 0 may be used to indicate the lane change point. 1 may be used to indicate the lane start and end points. 2 may be used to indicate the exclusive right-turn lane start and end points. The type 2 of the reference point is a further refinement of the type 1 of the reference point. Different sequence numbers, index numbers, or IDs may be used to further indicate the type 1 of the reference point. For example, −1 is used to indicate that a subtype of the lane change point is: The quantity of lanes decreases. 1 is used to indicate that the subtype of the lane change point is: The quantity of lanes increases. −1 is used to indicate that a subtype of the lane start and end points is the lane start point. 1 is used to indicate that the subtype of the lane start and end points is the lane end point. −1 is used to indicate that a subtype of the exclusive right-turn lane start and end points is an exclusive right-turn lane start point. 1 is used to indicate that the subtype of the exclusive right-turn lane start and end points is an exclusive right-turn lane end point. The type of the reference point may further include at least one of the following plurality of types: a start point of a road central line, a start point of a road edge line, a midpoint of a start line of a lane group, a start point of a lane central line, and a start point of a lane edge line. For details, refer to descriptions in Table 1.

lane_ID, node type, and node_type_2 are obtained when the location of the reference point is determined. A type of each attribute of the reference point is int, where int is a function for rounding down a value to a closest integer.

The ID of the reference point is packaged based on the location of the reference point and the attribute of the reference point, and the attribute of the reference point and a mapping relationship or association information between the reference point and a map layer are stored in the map. In a possible implementation, the map may correspondingly generate a reference point map layer based on information about the reference point. In this case, the event obtains, based on the type of the reference point, a type ID corresponding to the event from the reference point map layer.

The following specifically describes the expression manner of the type of the reference line.

The reference line may be a road central line, a road edge line, a lane central line, another type of reference line, or the like. A manner of storing the reference line in the map may include one or more of the following types: an identifier ID of a reference line, a mesh ID, on the map, to which reference line is mapped, a type ID (for example, a road ID or a lane ID), on the map, to which the reference line is mapped, or the type of the reference line. An attribute of the reference line is used to describe a relationship between the reference line and the map. For example, the type of the reference line (or a type of a dynamic map layer corresponding to an event related to the reference line) may be expressed by using Table 3.

TABLE 3

| Type of a reference line | Data type | Meaning |
|---|---|---|
| line_ID | int | Globally unique ID of a reference line |
| mesh_ID | int | Mesh ID associated with a reference line |
| road_ID | int | Road ID associated with a reference line |
| road_type | int | 0: Left edge line of a road along a vehicle traveling direction; |
| | | 1: Right edge line of a road along a vehicle traveling direction; |
| | | 3: Central line of a road; |
| | | 4: Edge line of a road; |
| | | 5: Central line of a lane; |
| | | 6: Edge line of a lane; |
| | | 7: Vehicle stop line |
| lane_ID | int | Lane ID associated with a reference line |
| | | Bidirectional road: [−n, . . . , −1] an nth reverse lane to the 1st reverse lane |
| | | [0] central lane line |
| | | [1, . . . , n] the 1st forward lane to an nth forward lane |
| | | Unidirectional road: [0, . . . , n] the 0th forward lane to an nth forward lane |
| line_type | int | 0: Left edge line of a lane along a vehicle traveling direction; |
| | | 1: Right edge line of a lane along a vehicle traveling direction; |
| | | 2: Lane central line |

TABLE 3-continued

| Type of a reference line | Data type | Meaning |
| --- | --- | --- |
| line_type_2 | int | Lateral reference line (reference line parallel to a lane line) Longitudinal reference line (reference line perpendicular to the lateral reference line) |

As shown in Table 3, the identifier (node_ID) of the reference line is used to indicate a globally unique ID of the reference line, and is used to distinguish between different reference lines. The ID may also be denoted as an id. node_ID is an automatically generated identifier. The mesh identifier (mesh_ID) is used to indicate a mesh ID, on the map, to which the reference line is mapped, to distinguish between different meshes, and to establish a mapping relationship between the reference line and the mesh of the map. mesh_ID is derived from the attribute of the road line on the map. The mesh is an attribute in the map, and is used to quickly determine a location in the map. There may be a plurality of type IDs. For example, when the type is a road, the type ID is a road identifier (road_ID) used to indicate a road ID, on the map, to which the reference line is mapped, used to distinguish between different roads, and used to establish a mapping relationship between the reference line and the road in the map. When the type is a lane, the type ID is a lane identifier (lane_ID) is used to indicate a lane ID, on the map, to which the reference line is mapped, is used to distinguish between different lanes, and is used to establish a mapping relationship between the reference line and the lane in the map.

road_ID is used to identify a road line on the map. When the reference line is a road line, the type of the reference line may be determined based on road_type. For example, road type may include a road central line, a road left edge line, a road right edge line, a vehicle stop line, and the like. Certainly, the reference line may alternatively be a reference line corresponding to a corresponding proportion determined based on a width of a road, for example, may be a reference line of a preset proportion of an event relative to the width of the road. For example, the reference line may be a road shoulder or another road line near the event. Different types are indicated by different sequence numbers, index numbers, or IDs.

The lane ID or a lane line ID (lane_ID) is used to indicate a sequence number of a lane in which the reference line is located, and is used to distinguish between different lane lines. For example, a bidirectional road includes a forward lane and a reverse lane. Sequence numbers [−n . . . -1] may be used to indicate an nth reverse lane to the first reverse lane. [0] indicates a central lane line. Sequence numbers [1 . . . n] indicate the first forward lane to an nth forward lane. For a unidirectional road, the sequence numbers [0, . . . , n] may be used to indicate a 0th forward lane to an nth forward lane. The type of the reference line includes a type 1 (line_type) of the reference line and a type 2 (line type_2) of the reference line. The type 1 of the reference line includes at least one of a lane central line, a lane left edge line, a lane right edge line, a road central line, a road edge line, a lane central line, a lane edge line, and the like.

Location information of an event relative to a reference lane is determined with reference to a lane. For example, the reference line may be a reference line determined based on a location of the event relative to the lane. For example, the reference line may be a lane on a left side of the event, a lane on a right side of the event, or a road shoulder near the event.

Alternatively, the reference line may be determined based on a total quantity of lanes on the road and a lane on which the event is located. Different types are indicated by different sequence numbers, index numbers, or IDs. For example, 0 may be used to indicate a lane left edge line, 1 may be used to indicate a lane right edge line, and 2 may be used to indicate a lane central line. The type 2 of the reference line is another division manner of the type of the reference line, for example, a lateral reference line and a longitudinal reference line. The type of the reference line may be further indicated by using different sequence numbers, index numbers, or IDs. For example, −1 is used to indicate that the type of the reference line is a lateral reference line, that is, a reference line parallel to a lane line. −2 is used to indicate that the reference line is a longitudinal reference line, that is, a reference line perpendicular to the lane line.

In still another possible scenario, the longitudinal reference line may be determined based on the location of the reference point and the lateral reference line. That is, the longitudinal reference line is perpendicular to the lateral reference line, and the longitudinal reference line includes the reference point.

It should be noted that road_ID, road_type, line_ID, line type, and line_type_2 are obtained when the location of the reference line is determined. The data type of each type of the reference line is int, where int is a function for rounding down a value to a closest integer.

The ID of the reference line is packaged based on the location information of the reference line and the type of the reference line, and the type of the reference line and a mapping relationship or association information between the reference line and a map layer are stored in the map. In a possible implementation, the map may correspondingly generate a reference line map layer based on information about the reference line (for example, the location information of the reference line and the type of the reference line). In this case, the event obtains, based on the type of the reference line, a type ID corresponding to the event from the reference line map layer in the map, and obtains coordinates of the reference line based on the type ID. There may be a plurality of manners of obtaining the type ID of the map. For example, when the type of the reference line is a point under a road element, for example, a road central line, an ID of a road on which the event is located is obtained, and coordinates of a central line under the road ID are obtained; or when the type of the reference line is a point under a lane element, for example, a lane central line, an ID of a lane on which the event is located is obtained, and coordinates of a central line under the lane ID are obtained.

In consideration that the dynamic event may require lane-level location information, and the dynamic event is associated with an element of a static map, in this application, location information of an event may be expressed in a relative location manner. That is, the location information of the event is expressed by using a relative location of the event relative to the reference point and/or the reference line.

In a possible implementation, for each of the at least one piece of location information, location reference information corresponding to the location information is determined based on the location information of the first event; and the location information corresponding to the location information is determined based on the location reference information corresponding to the location information.

It should be noted that the location information of the event may be expressed by using at least one point, for example, a central point at which the event is located. When the location information of the event is a specific range, at least one point for describing the event and/or at least one line segment for describing the event may be determined based on geometric topology information described by the event.

The following separately describes, by using Manner 1 and Manner 2, possible implementations in which the location reference manner includes types of different reference coordinate systems. Certainly, Manner 1 and Manner 2 may alternatively be used in combination. This is not limited in this application.

Manner 1: Location information of an event in a rectangular coordinate system.

In some embodiments, location information of the event relative to coordinates of a reference point may be determined based on location information of the reference point, for example, coordinates (x, y) of the reference point in the rectangular coordinate system.

The rectangular coordinate system may be a geographic coordinate system, for example, an ENU east north up coordinate system or a global positioning system (GNSS) coordinate system.

In a possible implementation, a map may correspondingly generate a reference point map layer based on information about the reference point. In this case, a location reference manner of the event may include a type of the reference point. Specifically, a type ID corresponding to the event may be obtained from the reference point map layer on the map based on the type of the reference point. According to the type ID, there may be a plurality of manners of obtaining a type ID of the map. For example, when the type of the reference point is a point under a road element, for example, a start point of a road central line, an ID of a road on which the event is located is obtained, and geographical coordinates of a start point of a central line under the road ID are obtained; or when the type of the reference point is a point under a lane element, for example, a start point of a lane central line, an ID of a lane on which the event is located is obtained, and coordinates of a start point of a central line under the lane ID are obtained. After coordinates of the reference point are obtained based on the type ID, the location information of the event may be calculated based on the coordinates of the reference point. Certainly, a type of another reference point may alternatively be selected as the location reference information, and details are not described herein.

Figure 4B:
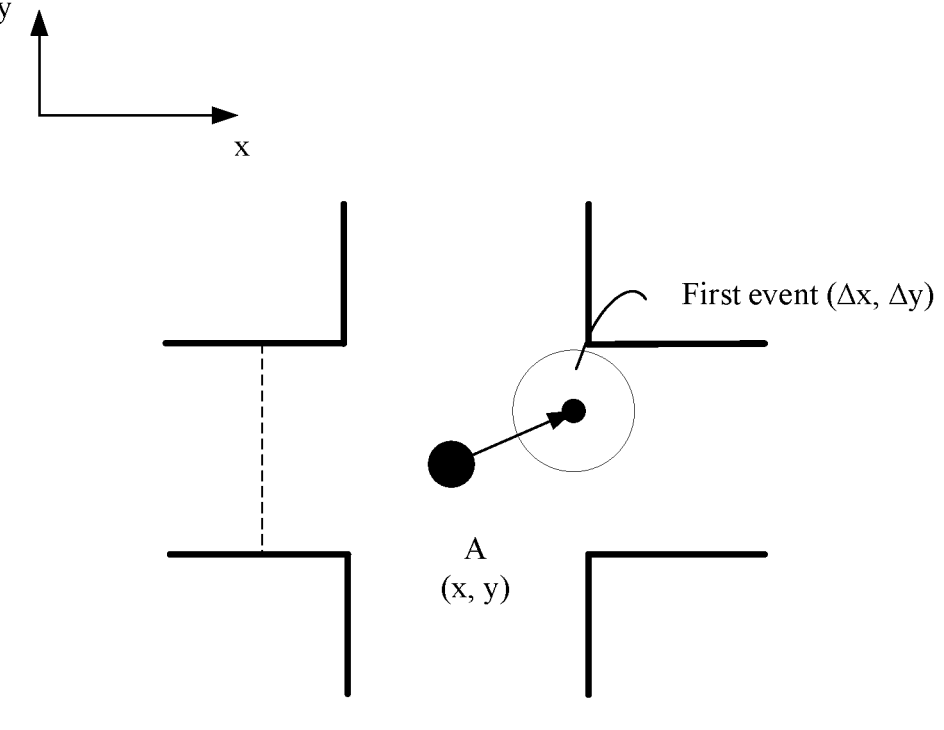
FIG. 4b and FIG. 4c are schematic diagrams of expressing a first event in location reference information according to an embodiment of this application.

For example, as shown in FIG. 4b, when an event is expressed by using location information of a point in the event, location information of the point of the event relative to the coordinates of the reference point may be determined based on the coordinates of the reference point A. For example, an accident is the first event. A central point at which the accident occurs may be used as a point in the first event. In this case, location information ($\Delta x$, $\Delta y$) of the event may be determined based on location information of the central point at which the accident occurs. Certainly, the reference point A may be any one of types of reference points. This is not limited herein.

In another possible implementation, the location reference manner of the event may include types of a plurality of reference points. For example, types of a plurality of reference points may be selected as the reference location manner of the event. For example, types of two reference points are selected, and a start point of a road central line and a start point of a road edge line are selected as the reference location information of the event, to determine location information of the event relative to the start point of the road central line and the start point of the road edge line. For example, $\Delta x$ of the event may be determined based on the start point of the road central line, and $\Delta y$ of the event may be determined based on the start point of the road edge line. Certainly, another manner may be selected for determining, and this is not limited herein.

Figure 4C:
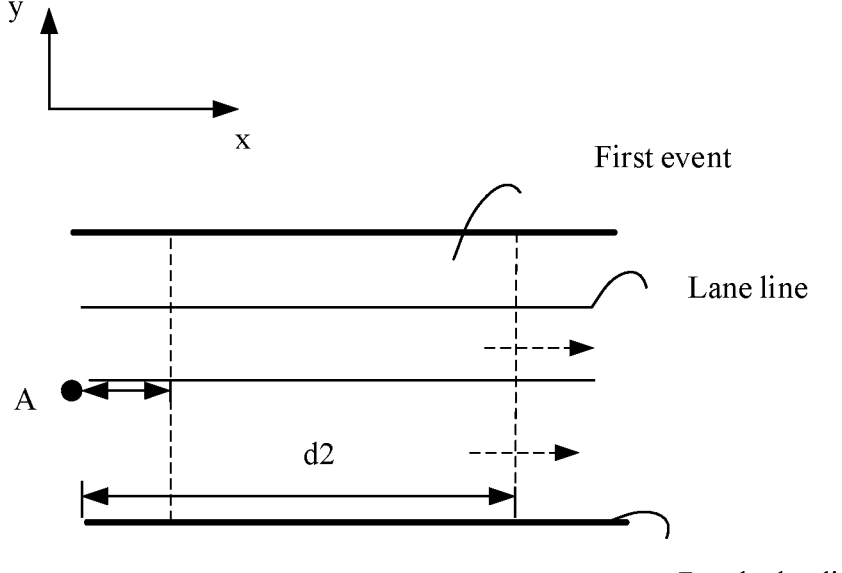

For another example, as shown in FIG. 4c, when the event is expressed by using location information of a region in the event, location information d1 of a start location of the event relative to coordinates of the reference point and location information d2 of an end location of the event relative to coordinates of the reference point A may be determined based on the coordinates of the reference point A, so as to indicate a region formed by the start location and the end location of the event.

For example, a traffic flow is a target event. A possible region is a road-level region. In this case, a start location corresponding to the target event may be a start point of vehicle congestion, and an end location corresponding to the target event may be an end point of vehicle congestion. A road-level congestion region may be determined based on location information d1 of the start point of the vehicle congestion relative to the coordinates of the reference point, location information d2 of the end point of the vehicle congestion relative to the coordinates of the reference point, and a traveling direction along the road. The road-level congestion region may be a region corresponding to the target event.

Another possible region is a lane-level region. In this case, the start location corresponding to the target event may be a start point of a lane of vehicle congestion, and the end location corresponding to the target event may be an end point of the lane of vehicle congestion. A lane-level congestion region may be determined based on location information d1 of the start point of the lane of vehicle congestion relative to the reference point, location information d2 of the end point of the lane of vehicle congestion relative to the reference point, and a traveling direction along the lane. The lane-level congestion region may be a region corresponding to the target event.

In yet another possible implementation, the location reference manner may further include types of a plurality of reference points. For example, a start point of a road central line and a start point of a road edge line are selected as reference points. In an example in which an event is expressed by using location information of a region in the event, the start point of the road central line may be used as a reference point of an event start point, to determine location information d1 of the start location of the event relative to the start point of the road central line, and the start point of the road edge line may be used as a reference point of event ending, to determine location information d2 of the end location of the event relative to the start point of the road edge line, so as to indicate a region formed by the start location and the end location of the event.

Manner 2: Location information of an event is expressed by a coordinate system along a reference line established by using a reference point and/or a reference line.

Scenario 2-1: Location information of an event is expressed by a coordinate system along a reference line established by using a reference line. In this case, a location reference manner includes types of a plurality of reference lines.

Geographical coordinates of the reference line may be obtained based on a type (a road, a lane group, or a lane) of the reference line corresponding to the event and a type ID (for example, a road ID, a lane group ID, or a lane ID) corresponding to the reference line.

In a possible implementation, a coordinate system along a reference line is established by using types of a plurality of reference lines.

For example, a coordinate axis x of the coordinate system along a reference line is a lane central line, and a coordinate axis y of the coordinate system along a reference line is a vehicle stop line.

A reference point and a reference line are used as references to express a location of a location point on a map in the coordinate system along a reference line. In the coordinate system, an origin is a projected point from the reference point to the reference line, and a coordinate axis is a straight line, a curve, or a fold line that starts from the origin and extends along the reference line. Specifically, location coordinates of a location point in the coordinate system along a reference line are (dx, dy), where dy is a distance (which may be a positive value or a negative value) from the location point to a projected point of the location point on a coordinate axis, and dx is a length (which may be a positive value or a negative value) of a path from the origin to the projected point along the coordinate axis. Generally, a point-shaped map element is selected as a reference point, or an intersection point of two linear map elements is selected as a reference point; or a linear map element is selected as a reference point.

Figure 5A:
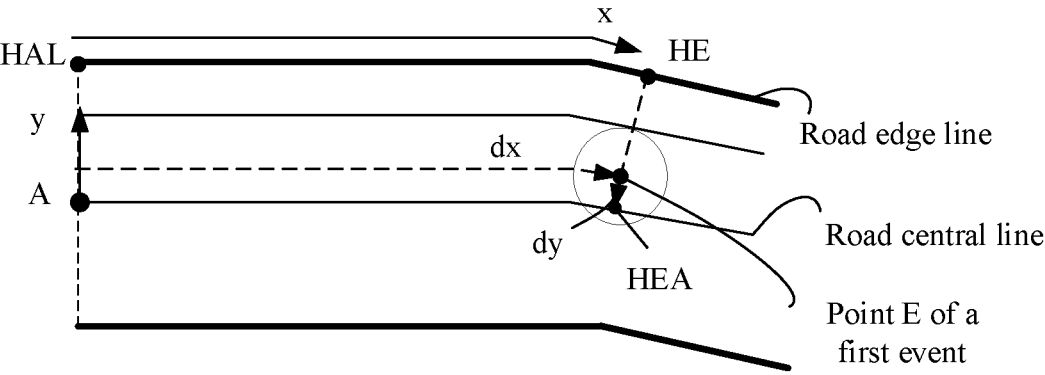
FIG. 5a and FIG. 5b are schematic diagrams of expressing a point E of a first event in location reference information according to an embodiment of this application.

For example, as shown in FIG. 5a, the type of the reference line is a road edge line, and the type of the reference point is a start point (a reference point A in the figure) on a road central line. In this case, in the coordinate system along a reference line, the coordinate axis x is the reference line, that is, the road edge line, the origin is the reference point A, and the coordinate axis y is a perpendicular line from the reference point to the reference line. In this case, a first event is located on the left side of the road central line, and a central point of the first event may be expressed as (dx, dy) in the coordinate system along a reference line, where dx is a distance between a projected point HE of the central point E of the first event on the road edge line and a projected point HAL of the origin A on the road edge line, that is, a distance of a road between HE and HAL. dy is a relative distance between the point E and the perpendicular foot HEA of the road central point A relative to the road central line, that is, a distance between E and HEA. HEA is a vertical projected point from E to the road central line. It should be noted that a positive and negative symbol of dx or dy may be set as required. For example, a positive or negative symbol of dx or dy may be determined based on a road traffic direction. For example, when the point E of the first event is in front of the relative reference point along the road traffic direction, dx is positive; when the point E of the first event is in rear of the relative reference point along the road traffic direction, dx is negative; when the point E of the first event is on the left side of the reference point along the road traffic direction, dy is positive; and when the point E of the first event is on the right side of the reference point along the road traffic direction, dy is negative. Certainly, this may be determined in another manner, which is not limited herein.

Figure 5B:
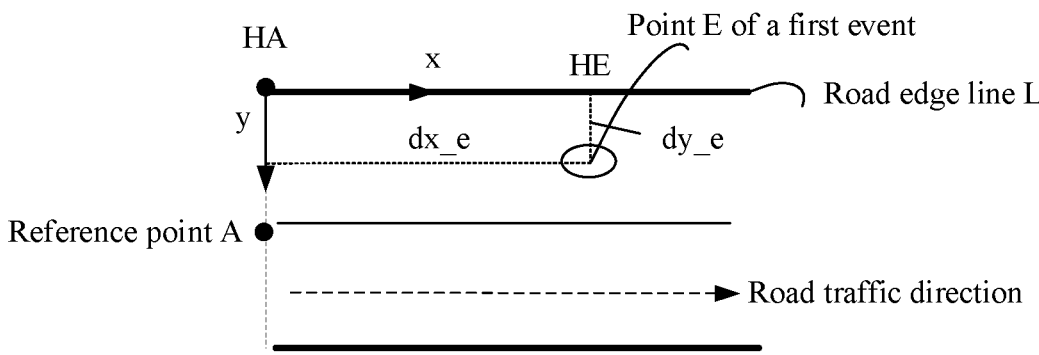

In another possible expression manner, as shown in FIG. 5b, the type of the reference line is a road edge line L, and the type of the reference point A is a start point A on a road central line. Reference coordinates of the point E of the first event may be expressed as (dx_e, dy_e), that is, the location information of the point E of the first event may be expressed as (dx_e, dy_e), where dy_e is a relative distance of E relative to the road edge line L, that is, a distance between E and HE. HE is a vertical projected point from the event point E to the reference line L. dx_e is a relative distance between E and a perpendicular line formed by the road central point A and a perpendicular foot HA of the road edge line L, that is, a distance between HE and HA. HA is a vertical projected point from the reference point A to the reference line L. In consideration that dx_e may be positive or negative, dx_e may alternatively be dx_e, that is, a distance from HAL to HE along the reference line L.

Figure 5C:
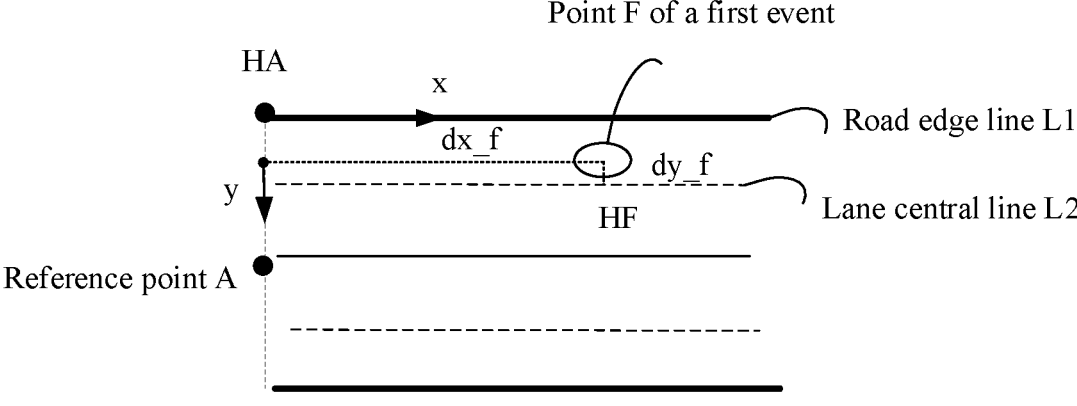
FIG. 5c is a schematic diagram of expressing a point F of a first event in location reference information according to an embodiment of this application.

In still another possible implementation, the type of the reference line may include a longitudinal reference line and a lateral reference line. The longitudinal reference line is used to determine a longitudinal distance between an event and the longitudinal reference line. The lateral reference line is used to determine a lateral distance between an event and a lateral reference line. As shown in FIG. 5c, for example, the longitudinal reference line is a road edge line L1, and the lateral reference line is a lane central line L2.

Reference coordinates of a point F in an event may be expressed as (dx_f, dy_f), that is, location information of the point E in the first event may be expressed as (dx_f, dy_f), where dy_f is a relative distance of the point F relative to the lateral reference line (the lane central line L2), that is, a distance between F and HF. HF is a vertical projected point from the event point F to the lateral reference line (the lane central line L2). dx_f is a relative distance between F and a perpendicular line formed by the road central point A and a perpendicular foot HA of the longitudinal reference line (the road edge line L1), that is, a distance between HF1 and HA. HA is a vertical projected point from the reference point A to the reference line L. It should be noted that a positive and negative symbol of dx_f or dy_f may be set as required. For example, a positive or negative symbol of dx_f or dy_f may be determined based on a road traffic direction. For example, when dx_f is in front of the relative reference point along the road traffic direction, dx_f is positive; when dx_f is in rear of the relative reference point along the road traffic direction, dx_f is negative; when dy_f is on the left side of the reference line along the road traffic direction, dy_f is negative; and when dy_f is on the right side of the reference line along the road traffic direction, dy_f is positive. Certainly, this may be determined in another manner, which is not limited herein.

In another possible implementation, a reference line may be determined by using a reference point. In this case, the location reference manner may include a type of a reference point and a type of a reference line.

Coordinates of the reference point may be obtained from a map based on a type (a road, a lane group, or a lane) of the reference line corresponding to the event and a type ID (for example, a road ID, a lane group ID, or a lane ID) corresponding to the reference point. Therefore, coordinates of the reference line determined by using the reference point may be determined based on coordinates of the reference point.

For example, a coordinate axis x of a coordinate system along a reference line is a lane central line, and an origin of the coordinate system along a reference line is a start point of the lane central line. In this case, a coordinate axis y of the coordinate system along a reference line may be determined by using the reference point (the start point of the lane central line). For example, the coordinate axis y of the coordinate system along a reference line is a perpendicular line, passing through the origin, of the lane central line. In this case, coordinates of the perpendicular line, passing through the start point of the lane central line, of the lane central line may be determined based on coordinates of the start point of the lane central line and coordinates of the lane central line, that is, the coordinate axis y of the coordinate system along a reference line.

For example, location information of an event may be a longitudinal distance dx and a lateral distance dy that are determined based on the coordinate system along a reference line, and the origin of the coordinate system along a reference line may be a reference point.

Figure 5D:
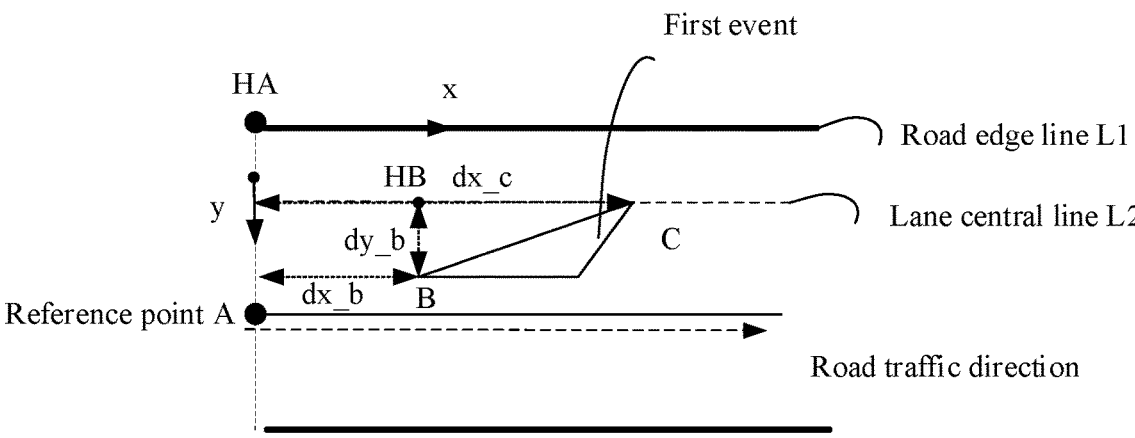
FIG. 5d and FIG. 5e are schematic diagrams of expressing a first event in location reference information according to an embodiment of this application.

As shown in FIG. 5d, reference coordinates of a point C in an event may be expressed as (dx_c, dy_c), where a longitudinal distance of the point C along the reference line is dx_c, and a lateral distance of the event C along the reference line is a perpendicular line distance dy_c from the event to the reference line. Because the event C is located on the reference line, dy_c is 0.

Reference coordinates of a point B in the event may be expressed as (dx_b, dy_b), where a lateral distance of the point A along the reference line is a perpendicular line distance dy_b from the event B to the reference line. Correspondingly, a lateral distance dx_b of the point B in the event along the reference line may be determined based on a location of a perpendicular foot HB from the event B to the reference line.

Scenario 2-2: Location information of an event is expressed by a coordinate system along a reference line established by using at least one type of reference point and at least one type of reference line.

For example, the reference point may be an origin of the coordinate system along a reference line, and the reference point and the reference line may jointly determine a coordinate axis of the coordinate system along a reference line. Therefore, the location information of the event may be a longitudinal distance dx of the event and a lateral distance dy of the event determined based on each coordinate axis of the coordinate system along a reference line.

In Scenario 2-2, the type of the reference line may be a longitudinal reference line, or may be a lateral reference line, or the longitudinal reference line and the lateral reference line may not be distinguished. For example, when the reference line is a longitudinal reference line, the longitudinal distance dx of the event may be determined based on the reference line. The lateral distance dy of the event is determined based on the reference line and reference point. For another example, when the reference line is a lateral reference line, the lateral distance dy of the event may be determined based on the reference line. The longitudinal distance dx of the event is determined based on the reference line and the reference point.

Figure 5E:
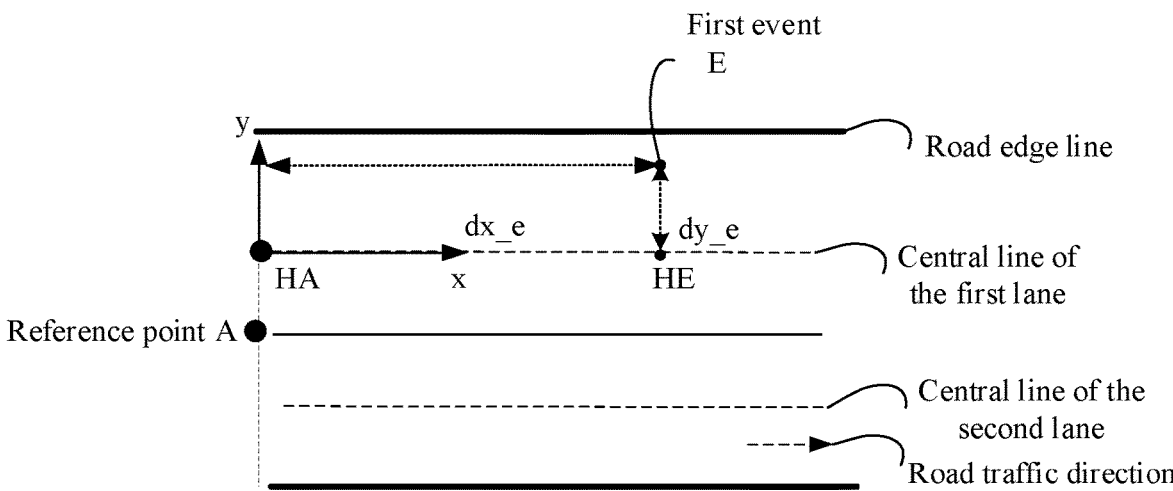

For example, the reference point is a start point of a lane line, and the reference line is a lane central line. The origin of the coordinate system along a reference line may be a reference point, and the coordinate axis of the coordinate system along a reference line may be determined based on the lane central line and the start point of the lane line. As shown in FIG. 5e, in consideration that a point E of a first event is located on a first lane, the reference point may be a start point A on the first lane line, and the reference line may be a central line L of the first lane. In this case, the coordinate axis x of the coordinate system along a reference line may be the central line L of the first lane. The coordinate axis y of the coordinate system along a reference line may be a perpendicular line, passing through the start point A on the first lane line, of the central line L of the first lane.

Reference coordinates of the point E of the first event may be expressed as (dx_e, dy_e), where dy_e is a relative distance of E relative to the central line L of the first lane, that is, a distance between E and HE. HE is a vertical projected point from the event point E to the central line L of the first lane. dx_e is a relative distance of E relative to the start point A of the central line of the first lane along the central line L of the first lane, that is, dx_e is a distance between HE and HA. In consideration that dx_e may be positive or negative, dx_e may also be a distance from HA to HE along the central line L of the first lane. HA may be a vertical projected point of the reference point on the reference line.

Scenario 3: Location information of an event is determined by using a type of a road-level or lane-level reference point and/or a type of a road-level or lane-level reference line.

In a possible manner, in consideration that the event includes at least one piece of location information, boundary location information of the first event may be determined based on the at least one piece of location information; location reference information corresponding to the boundary location information is determined based on the boundary location information of the first event; and first location information corresponding to the boundary location information is determined based on the location reference information corresponding to the boundary location information.

In some embodiments, the boundary location information of the first event may include location information of at least one point. In some other embodiments, the boundary location information of the first event may include location information of at least one line segment.

The following uses location information of at least one point as an example to describe the first location information corresponding to the boundary location information of the first event.

Scenario 3-1: Location information of an event is determined by using a type of a road-level reference point and/or a type of a road-level reference line.

In a possible manner, a type of a reference point and/or a type of a reference line corresponding to location information of a point in the event are/is a type of a road-level reference point and/or a type of a road-level reference line. For a specific implementation, refer to Manner 1 and Manner 2, and implementations of the type of the road-level reference point and/or the type of the road-level reference line in Scenario 2-1 and Scenario 2-2. Details are not described herein again.

In consideration that location information of a plurality of points included in the boundary location information of the first event may be on a plurality of different lanes of a same road, reference lines and/or reference points used by the plurality of points of the event during location expression may be determined based on definition of event expression. In this case, the location information of the plurality of points in the event may use a same reference point and/or reference line.

Figure 6A:
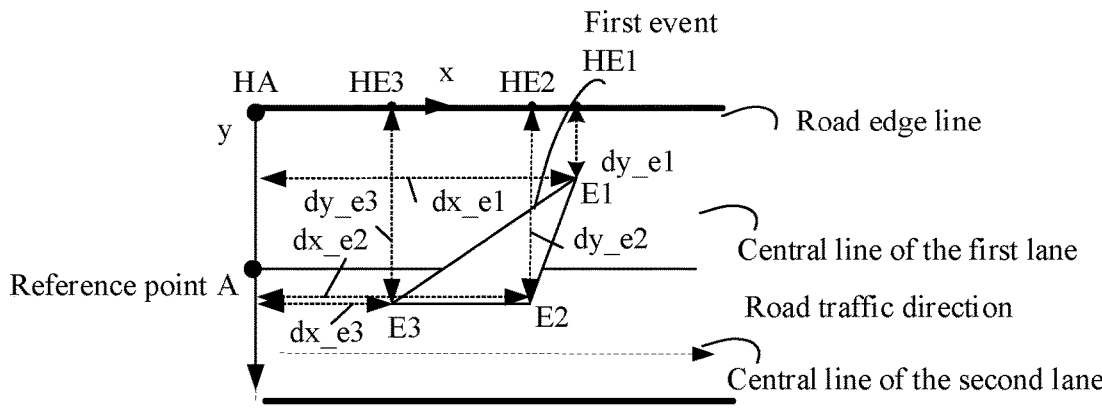
FIG. 6a to FIG. 6d are schematic diagrams of expressing a first event in location reference information according to an embodiment of this application.

For example, as shown in FIG. 6a, a range in which the first event is located is a triangle, and when the location of the first event is described, the location of the first event may be expressed by using three vertices corresponding to the range of the first event. That is, three points are included: E1, E2, and E3. E1 is located in the first lane, and E2 and E3 are located in the second lane. When location information of E1, E2, and E3 of the event is determined by using a road-level reference point and/or a road-level reference line, reference points respectively corresponding to E1, E2, and E3 may be a road central point A on a lane start line, and reference points respectively corresponding to E1, E2, and E3 may be a road edge line L1.

The location information of E1 may be expressed as (dx_e1, dy_e1), where dy_e1 is a relative distance of E1 relative to the road edge line L1, that is, a distance between E1 and HE1. dx1 is a relative distance between E1 and a perpendicular line formed by the road central point A and a perpendicular foot HA of the road edge line L1, that is, a distance between HE1 and HA.

The location information of E2 may be expressed as (dx_e2, dy_e2), where dy_e2 is a relative distance of E2 relative to the road edge line L1, that is, a distance between E2 and HE2. dx_e2 is a relative distance between E2 and the perpendicular line formed by the road central point A and the perpendicular foot HA of the road edge line L1, that is, a distance between HE2 and HA.

The location information of E3 may be expressed as (dx_e3, dy_e3), where dy_e3 is a relative distance of E3 relative to the road edge line L1, that is, a distance between E3 and HE3. dx_e3 is a relative distance between E3 and the perpendicular line formed by the road central point A and the perpendicular foot HA of the road edge line L1, that is, a distance between HE3 and HA.

Scenario 3-2: Location information of an event is determined by using a type of a lane-level reference point and/or a type of a lane-level reference line.

Figure 6B:
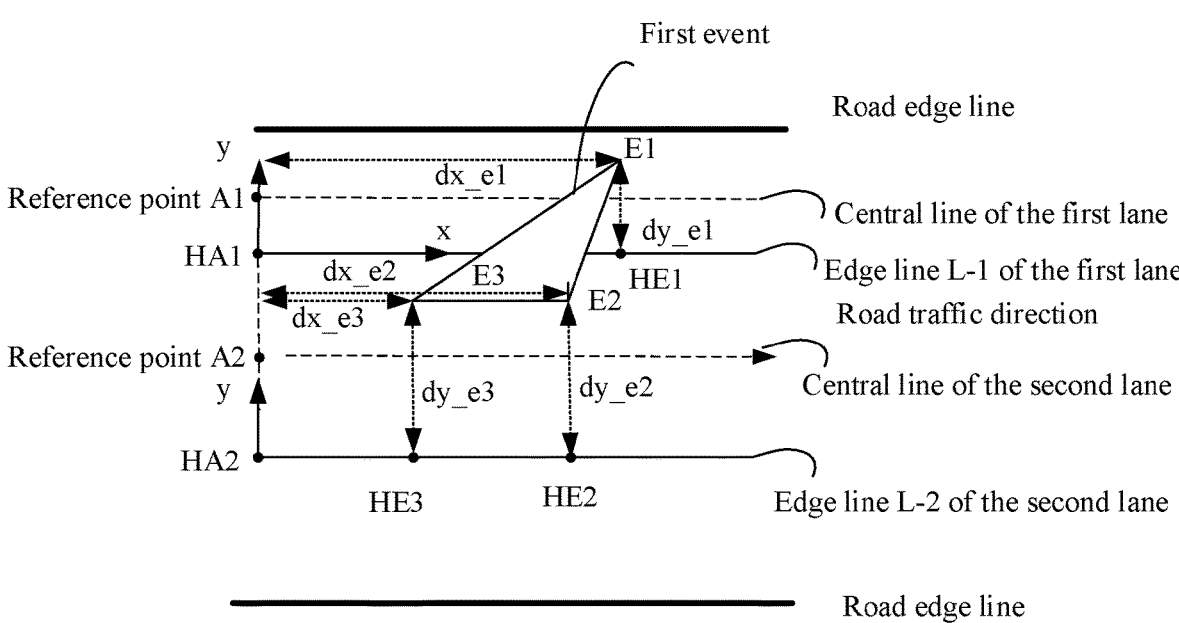

In this case, location information of a plurality of points in the event may use a reference point and/or a reference line corresponding to each lane. For example, as shown in FIG. 6b, when the location information of E1, E2, and E3 of the event is determined by using a lane-level reference point and/or a lane-level reference line, a reference point corresponding to E1 may be a central point A1 of the first lane on a lane start line, and a reference line corresponding to E1 may be a first lane edge line L-1. A reference point corresponding to E2 and E3 may be a central point A2 of the second lane on the lane start line, and a reference line corresponding to E2 and E3 may be a second lane edge line L-2.

The location information of E1 may be expressed as (dx_e1, dy_e1), where dy_e1 is a relative distance of E1 relative to the first lane edge line L-1, that is, a distance between E1 and HE1. dx_e1 is a relative distance between E1 and a perpendicular line formed by the first lane central point A1 and a perpendicular foot HA1 of the first lane edge line L-1, that is, a distance between HE1 and HA1.

The location information of E2 may be expressed as (dx_e2, dy_e2), where dy_e2 is a relative distance of E2 relative to the second lane edge line L-2, that is, a distance between E2 and HE2. dx2 is a relative distance between E2 and a perpendicular line formed by the second lane central point A2 and a perpendicular foot HA2 of the second lane edge line L-2, that is, a distance between HE2 and HA2.

The location information of E3 may be expressed as (dx_e3, dy_e3), where dy_e3 is a relative distance of E3 relative to the second lane edge line L-2, that is, a distance between E3 and HE3. dx_e3 is a relative distance between E3 and the perpendicular line formed by the second lane central point A2 and the perpendicular foot HA2 of the second lane edge line L-2, that is, a distance between HE3 and HA2.

Scenario 3-3: Location information of an event is determined by using a type of a lane-level reference point and/or a type of a road-level reference line.

Figure 6C:
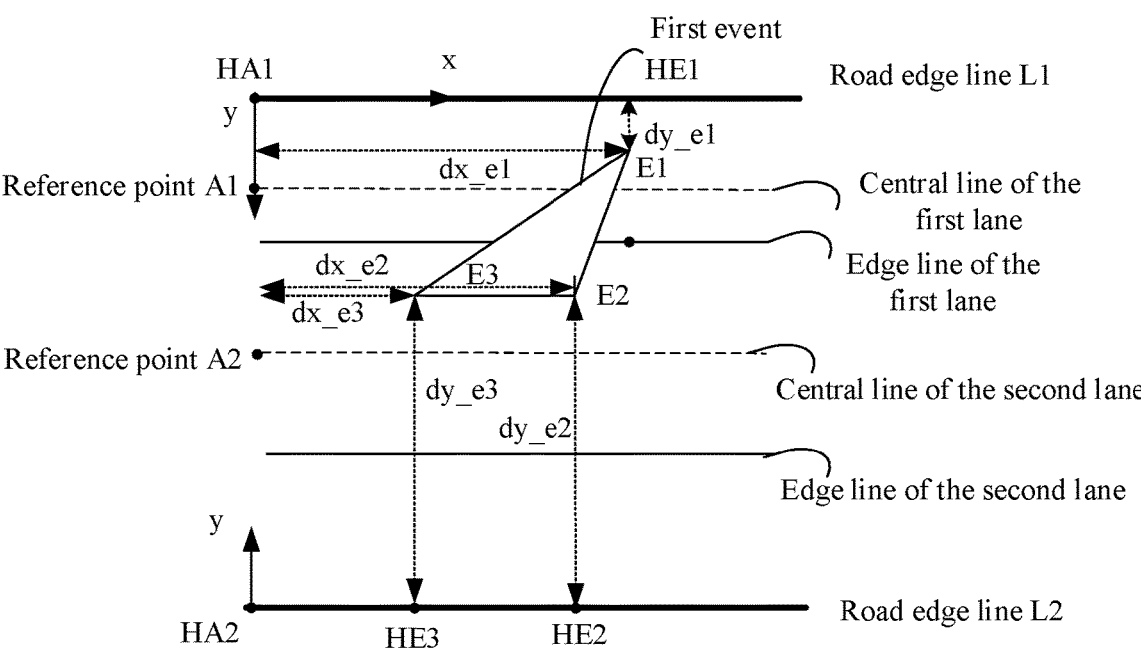

In a possible scenario, in an event range, a quantity of lanes at locations of different points may change. In this case, selecting a reference road-level reference line of each point may increase complexity of expression of different points. In this case, location information of a plurality of points in the event may use reference points corresponding to respective lanes and/or road-level reference lines. For example, as shown in FIG. 6c, when location information of E1, E2, and E3 of an event is determined by using a lane-level reference point and/or a road-level reference line, a reference point corresponding to E1 may be a first lane central point A1 on a lane start line. A reference point corresponding to E2 and E3 may be a second lane central point A2 on the lane start line, a reference line corresponding to E1 may be a road edge line L1, and a reference line corresponding to E2 and E3 may be a road edge line L2.

The location information of E1 may be expressed as (dx_e1, dy_e1), where dy_e1 is a relative distance of E1 relative to the road edge line L1, that is, a distance between E1 and HE1. dx_e1 is a relative distance between E1 and a perpendicular line formed by the first lane central point A1 and a perpendicular foot HA1 of the road edge line L, that is, a distance between HE1 and HA1.

The location information of E2 may be expressed as (dx_e2, dy_e2), where dy_e2 is a relative distance of E2 relative to the road edge line L2, that is, a distance between E2 and HE2. dx2 is a relative distance between E2 and a perpendicular line formed by the second lane central point A2 and a perpendicular foot HA2 of the road edge line L2, that is, a distance between HE2 and HA2.

The location information of E3 may be expressed as (dx_e3, dy_e3), where dy_e3 is a relative distance of E3 relative to the road edge line L2, that is, a distance between E3 and HE3. dx_e3 is a relative distance between E3 and the perpendicular line formed by the second lane central point A2 and the perpendicular foot HA2 of the road edge line L2, that is, a distance between HE3 and HA2.

Scenario 3-4: Location information of an event is determined by using a type of a road-level reference point and/or a type of a lane-level reference line.

Figure 6D:
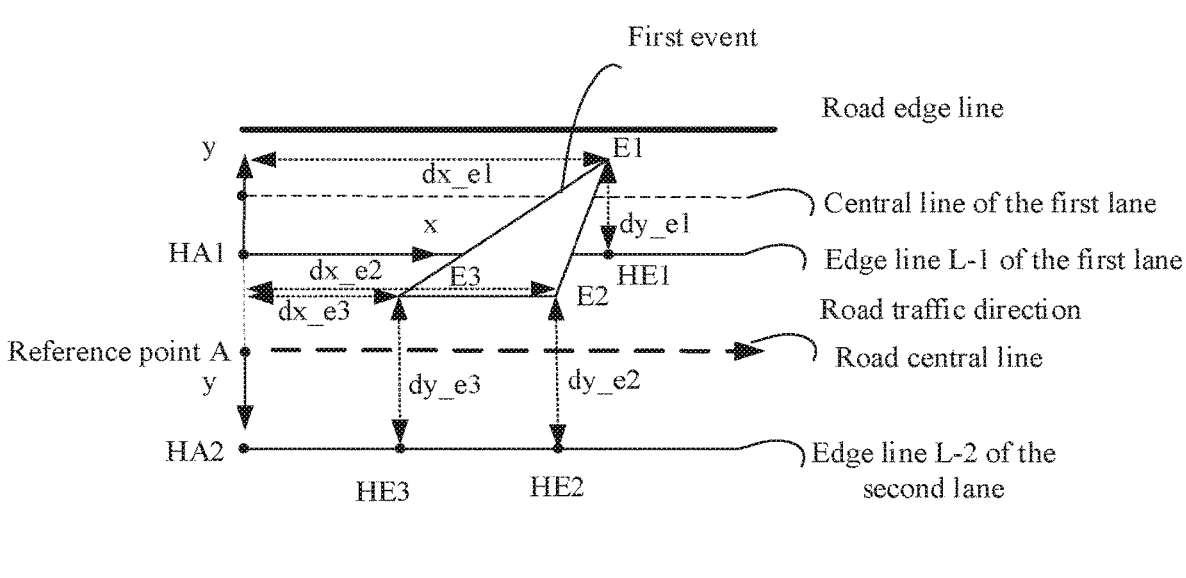

In a possible manner, location information of a plurality of points in the event may use a reference point and/or a reference line corresponding to each lane. For example, as shown in FIG. 6d, when location information of E1, E2, and E3 of an event is determined by using a road-level reference point and/or a lane-level reference line, a reference point corresponding to E1, E2, and E3 may be a road edge point A0 on a lane start line. A reference line corresponding to E1 may be a first lane edge line L-1. A reference line corresponding to E2 and E3 may be a second lane edge line L-2.

The location information of E1 may be expressed as (dx_e1, dy_e1), where dy_e1 is a relative distance of E1 relative to the first lane edge line L-1, that is, a distance between E1 and HE1. dx1 is a relative distance between E1 and a perpendicular line formed by the first lane central point A1 and a perpendicular foot HA1 of the first lane edge line L-1, that is, a distance between HE1 and HA1.

The location information of E2 may be expressed as (dx_e2, dy_e2), where dy_e2 is a relative distance of E2 relative to the second lane edge line L-2, that is, a distance between E2 and HE2. dx2 is a relative distance between E2 and a perpendicular line formed by the road edge point HE2 and a perpendicular foot HA2 of the second lane edge line L-2, that is, a distance between HE2 and HA2.

The location information of E3 may be expressed as (dx_e3, dy_e3), where dy_e3 is a relative distance of E3 relative to the second lane edge line L-2, that is, a distance between E3 and HE3. dx_e3 is a relative distance between E3 and the perpendicular line formed by the road edge point HE3 and the perpendicular foot HA2 of the second lane edge line L-2, that is, a distance between HE3 and HA2.

It should be noted that, in Manner 1 and Manner 2, when a reference point and/or a reference line of an event are/is determined, it may be further considered that the reference point is a lane-level reference point or a road-level reference point, and the reference line is a lane-level reference line or a road-level reference line. When the reference point and the reference line are used at the same time, or when a plurality of reference points or reference lines are used, it may be considered that a priority of a lane-level reference point or a road-level reference point is set for the reference point, and a priority of a lane-level reference line or a road-level reference line is set for the reference line.

For example, all reference points or reference lines selected for location information of an event are all at a lane level, or all reference points or reference lines selected for location information of an event are all at a road level. In this case, data of location reference information of the event may be simplified, that is, a type ID corresponding to the reference point and a type ID corresponding to the reference line may be shared. For example, both the reference point and the reference line are at a road level. Coordinates of the reference point may be obtained by using a road ID corresponding to the reference point, and coordinates of the reference line may be obtained by using a road ID corresponding to the reference point. In a possible implementation, the coordinates of the reference point and the coordinates of the reference line may be obtained based on a same road ID. In this manner, a manner of obtaining the coordinates of the reference point and the reference line can be simplified, and overheads of the data of the location reference information in the event can also be simplified. That is, in a data structure of the location reference information of the event, the type IDs corresponding to the reference point and the reference line may be shared. It should be noted that the type ID in this application may also be an element ID. This is not limited in this application. In a scenario in which parameter information corresponding to a point of an event includes a reference point and a reference line is optional, a data structure of a point E of the event may be shown in Table 4.

In a possible scenario, the type ID of the reference line may be the same as the type ID of the reference line. In this case, the location information of the point of the event may not include a field of the type ID of the reference line. For example, in the location information of the point E of the event, both the type ID of the reference line and the type ID of the reference line are a type ID of a road edge line. For another example, in the location information of the point E of the event, the type ID of the reference line is a type ID of a first lane central line.

In still another possible scenario, when the longitudinal reference line and the lateral reference line are not distinguished, the location information of the point of the event may include a field of an original ID of the reference line, that is, the field of the type ID of the longitudinal reference line and the field of the type ID of the lateral reference line in Table 4 may be one field.

In another scenario, a scenario in which a reference point is on a reference line is considered. For example, a start point of a road central line is a reference point, and a road central line is a reference line. In this case, one field may be used to indicate a type ID in a data structure of a point of an event. For example, a field of a type ID of a reference line is used, and a reference line corresponding to the type ID of the reference line is selected by default for the type ID of the reference line.

In consideration of another scenario, in expression of location information of points of an event, a type of a road-level reference line and/or a type of a road-level reference point may be shared. For example, in location information of the point E and a point F of the event, the type ID of the reference line is a type ID of a road edge line. When respective lane reference lines and/or respective lane reference points are used in expression of the location information of the event, a lane-level reference point or a lane-level reference line may not be shared, or may be partially shared. For example, in the location information of the point E and the point F of the event, the type ID of the reference line is a type ID of a start point of a road central line. In the data structure of the location information of the point of the event, a corresponding field may be used to describe a sharing status between reference lines or a sharing status between reference points. For example, a field may be added to location information of each point to indicate a point of a shared reference point or reference line, or a field may be added to a reference point or a reference line to indicate a point of a shared event, or a field may be added to an event to indicate a point of a shared event and a shared reference point or reference line. Certainly, a sharing manner of the reference point and the reference line may be alter-

TABLE 4

Location information of the point E of the event GeometryPoint

| Event type name | Field | Field type | Data type | Description |
|---|---|---|---|---|
| Type ID of a reference line | RefPointID | Required | Integer | When the type ID of the location reference |
| Type ID of a longitudinal reference line | LonRefLineID | Optional | Integer | information is omitted, it indicates that the type ID of the location reference |
| Type ID of a lateral reference line | LatRefLineID | Optional | Integer | information is the same as a type ID of another piece of location reference information. |
| Point E of the event | Points | Repeated | (dx_e, dy_e) | | natively indicated in another manner. This is not limited herein. For example, the point E and the point F of the event may share a reference point and a reference line. In this case, the data structures of the point E and the point F of the event may be shown in Table 5.

TABLE 5

| | | | | |
|---|---|---|---|---|
| Location information of a point of an event GeometryPoint | | | | |
| Event type name | Field | Field type | Data type/Type | Description |
| Type ID of a reference line | RefPointID | Required | Integer | When the type ID of the location reference |
| Type ID of a longitudinal reference line | LonRefLineID | Optional | Integer | information is omitted, it indicates that the type ID of the location reference |
| Type ID of a lateral reference line | LatRefLineID | Optional | Integer | information is the same as a type ID of another piece of location reference information. |
| Point E of the event | Points | Repeated | (dx_e, dy_e) | Coordinate location information |
| Point F of the event | Points | Repeated | (dx_f, dy_f) | Coordinate location information |
| Shared type ID | Share | Optional | Integer | Indicates a point of a shared event and a shared reference point or reference line |

Similarly, the boundary location information of the first event may include location information of at least one line segment. The following uses location information of at least one line segment as an example to describe the first location information corresponding to the boundary location information of the first event.

In a scenario in which parameter information corresponding to a line segment of an event includes a reference point and a reference line is optional, a data structure of a line segment of the event may be shown in Table 6.

TABLE 6

| | | | | |
|---|---|---|---|---|
| Location information of a line segment of an event GeometryLine | | | | |
| Event type name | Field | Field type | Data type/Type | Description |
| Type ID of a reference point | RefPointID | Required | Integer | When the type ID of the location reference |
| Type ID of a longitudinal reference line | LonRefLineID | Optional | Integer | information is omitted, it indicates that the type ID of the location reference |
| Type ID of a lateral reference line | LatRefLineID | Optional | Integer | information is the same as a type ID of another piece of location reference information. |
| Start line segment | Lines | Repeated | d1 | Coordinate location information |
| End line segment | Lines | Repeated | d2 | Coordinate location information |

It should be noted that, in Table 6, the line segment of the event is expressed based on a start line and an end line, or may be expressed based on a line segment formed by a start point of the event and an end point of the event. In this case, a data structure of the line segment of the event may be shown in Table 7.

TABLE 7

Location information of a line segment of an event GeometryLine

| Event type name | Field | Field type | Data type/Type | Description |
|---|---|---|---|---|
| Type ID of a reference point | RefPointID | Required | Integer | When the type ID of the location reference |
| Type ID of a longitudinal reference line | LonRefLineID | Optional | Integer | information is omitted, it indicates that the type ID of the location reference |
| Type ID of a lateral reference line | LatRefLineID | Optional | Integer | information is the same as a type ID of another piece of location reference information. |
| Line segment | Lines | Repeated | (d1, d2) | Line segment location information |

Scenario 4: In consideration that a geometric topology structure related to a first event is relatively complex, the first event may be divided into a plurality of sub-regions, each sub-region may correspond to one sub-event, and each sub-event may be expressed by using respective location reference information. Alternatively, the first event may be divided into a plurality of sub-regions, and each sub-region may be expressed by using respective location reference information.

Figure 7A:
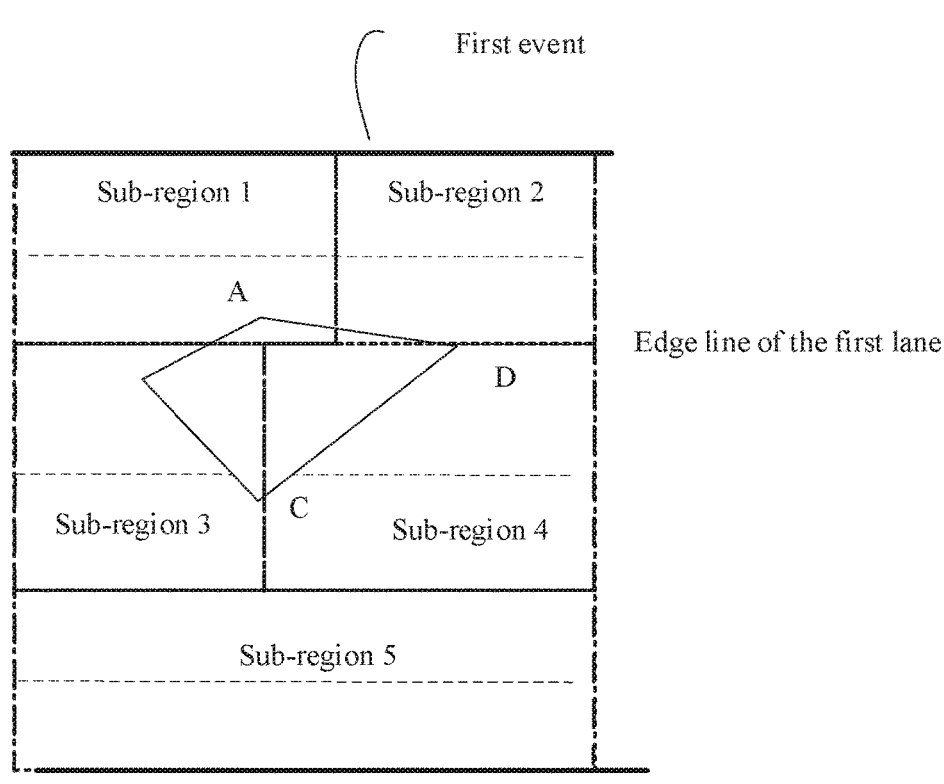
FIG. 7a and FIG. 7b are schematic diagrams of expressing a first event in location reference information according to an embodiment of this application.

For example, the first event is a traffic flow event in a target road section. In consideration that another event such as an accident or road maintenance exists in the target road section, which affects the traffic flow event of the current road section, as shown in FIG. 7a, for example, an accident event exists in the target road section. A range of the accident event involves three lanes, including a first lane and a second lane. The accident event includes four points to describe location information of the accident event. For example, the accident event includes a point A1, a point B, a point C, and a point D. The point A1 is located on the first lane, and the point B, the point C, and the point D are located on the second lane.

Correspondingly, the traffic flow event may be divided into five sub-regions, including a sub-region 1, a sub-region 2, a sub-region 3, a sub-region 4, and a sub-region 5, corresponding to a sub-event 1, a sub-event 2, a sub-event 3, a sub-event 4, and a sub-event 5 respectively.

A lane corresponding to the sub-region 1 is the first lane, a start point location of the sub-region 1 is a start point location of the road section corresponding to the traffic flow event, and an end point location of the sub-region 1 is determined based on a location (for example, the point A1) of the accident event on the first lane.

A lane corresponding to the sub-region 2 is the first lane, an end point location of the sub-region 2 is an end point location of the road section corresponding to the traffic flow event, and a start point location of the sub-region 2 is determined based on the location (for example, the point A1) of the accident event on the first lane.

A lane corresponding to the sub-region 3 is the second lane, a start point location of the sub-region 3 is the start point location of the road section corresponding to the traffic flow event, and an end point location of the sub-region 3 is determined based on locations (for example, the point B and the point C) of the accident event on the second lane.

A lane corresponding to the sub-region 4 is the second lane, an end point location of the sub-region 2 is the end point location of the road section corresponding to the traffic flow event, and a start point location of the sub-region 4 is determined based on locations (for example, the point C and the point D) of the accident event on the second lane.

A lane corresponding to the sub-region 5 is a third lane. In consideration that the accident event does not affect a traffic flow of the third lane, a start point location of the sub-region 5 may be the start point location of the road section corresponding to the traffic flow event, and an end point location of the sub-region 5 is the end point location of the road section corresponding to the traffic flow event.

In a possible implementation, location information of each sub-region in the traffic flow event may be expressed by using a lane-level reference point and/or reference line corresponding to each sub-region. In a possible example, a coordinate along a reference line may be selected, a reference point is a start point of each lane central line, and the reference line may be a lane central line. Correspondingly, location information corresponding to each point in the accident event may also use a lane-level reference point and/or reference line. That is, the accident event and the traffic flow event share a reference point and/or a reference line.

Figure 7B:
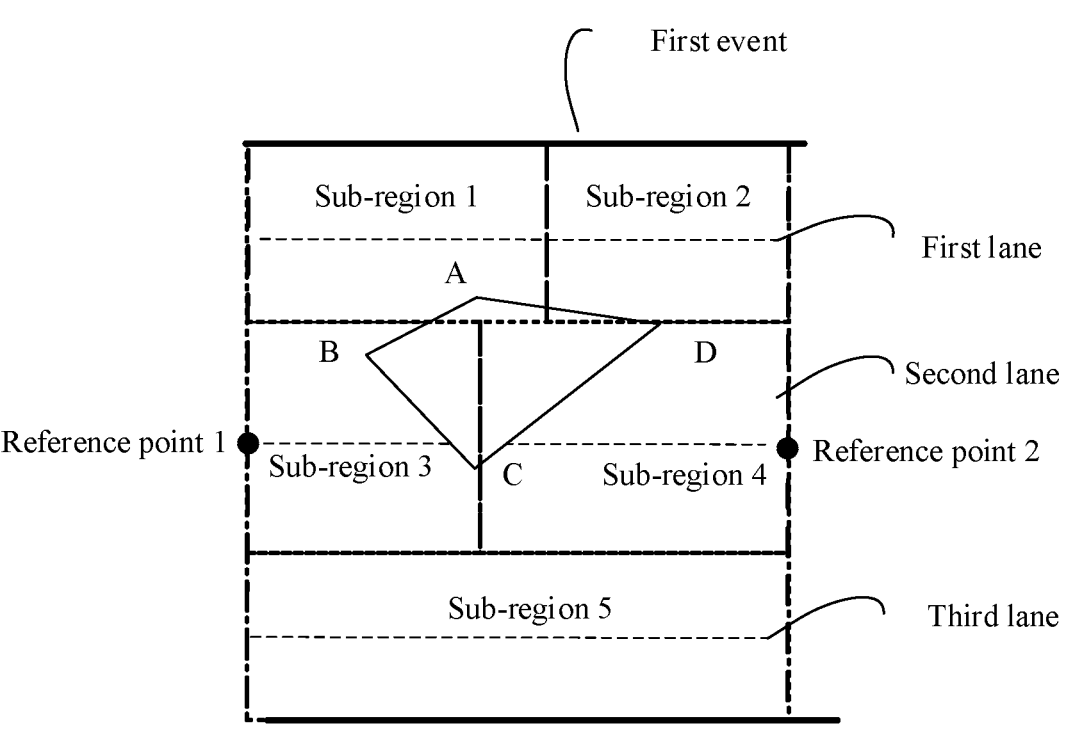

For example, as shown in FIG. 7b, a reference point 1 may be the start point of the road section corresponding to the traffic flow event, a reference point 2 may be the end point of the road section corresponding to the traffic flow event, and reference lines may include a central line of the first lane, a central line of the second lane, and a central line of the third lane.

In this case, the location information of the sub-region 1 may be expressed as (first lane ID, ID of the reference point 1, dx1_1, dx1_2). dx1_1 indicates location information (which is 0 herein) of a start point location of the sub-region 1 relative to the reference point 1, and dx1_2 indicates location information of an end point location of the sub-region 1 relative to the reference point 1. The location may be determined based on the location (for example, the point A1) of the accident event on the first lane.

The location information of the sub-region 2 may be expressed as (first lane ID, ID of the reference point 2, dx2_1, dx2_2).

dx2_1 indicates location information of a start point location of the sub-region 2 relative to the reference point 2, and the location is determined based on the location (for example, the point A1) of the accident event on the first lane relative to the reference point 2. dx2_2 indicates location information (which is 0 herein) of an end point location of the sub-region 2 relative to the reference point 2.

The location information of the sub-region 3 may be expressed as (second lane ID, ID of the reference point 1, dx3_1, dx3_2).

dx3_1 indicates that a start point location of the sub-region 3 is location information (which is 0 herein) relative to the reference point 1, and dx3_2 indicates location information of an end point location of the sub-region 3 relative to the reference point 1. The location is determined based on location information of locations (for example, the point B and the point C) of the accident event on the second lane relative to the reference point 1.

The location information of the sub-region 4 may be expressed as (second lane ID, ID of the reference point 2, dx4_1, dx4_2).

dx4_1 indicates location information of a start point location of the sub-region 4 relative to the reference point 2, and the location is determined based on location information of locations (for example, the point C and the point D) of the accident event on the second lane relative to the reference point 2. dx4_2 indicates location information (which is 0 herein) of an end point location of the sub-region 4 relative to the reference point 2.

The location information of the sub-region 5 may be expressed as (third lane ID, ID of the reference point 1, ID of the reference point 2, dx5_1, and dx5_2).

dx5_1 indicates location information (which is 0 herein) of a start point location of the sub-region 5 relative to the reference point 1, and dx5_2 indicates location information (which is 0 herein) of an end point location of the sub-region 5 relative to the reference point 2.

Scenario 5: When an event changes, for example, the first event may be correspondingly expressed by using respective location reference information based on different moments or different periods.

For example, the first event is an accident event, and a point at which a traffic accident occurs is obtained in a time phase 1, but an accident range involved in the accident is not obtained. In this case, location information of the event may be expressed by using the point of the event.

Location reference information selected for the location information of the event may be a type of a road-level reference point and/or a type of a road-level reference line, or may be a type of a lane-level reference point and/or a type of a lane-level reference line.

Using the type of the road-level reference point and/or the type of the road-level reference line as an example, a coordinate along a reference line may be selected, a reference point is a start point of a road central line, and the reference line may be the road central line.

Figure 8A:
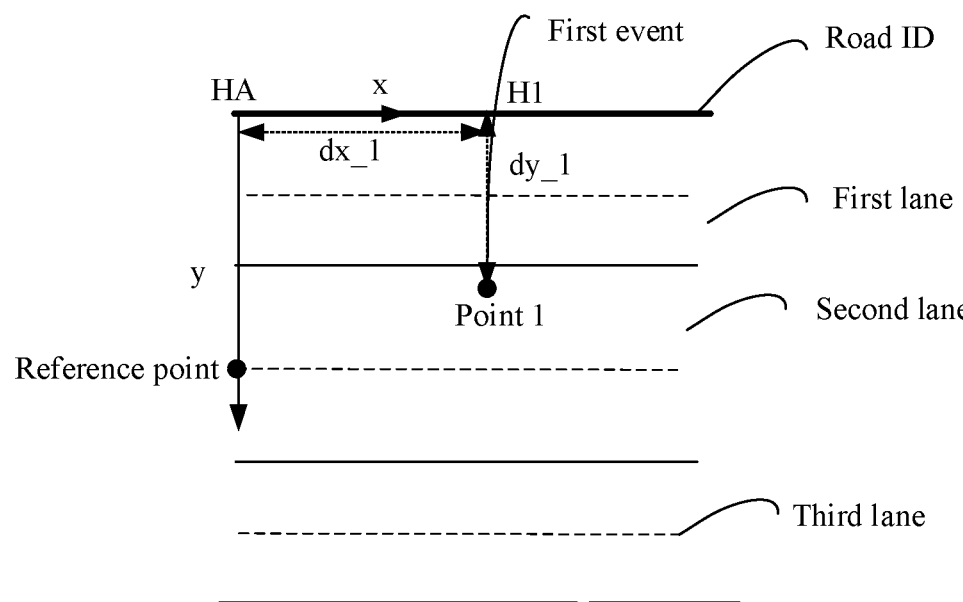
FIG. 8a and FIG. 8b are schematic diagrams of expressing a first event in location reference information according to an embodiment of this application.

As shown in FIG. 8a, the location information of the accident event in the time phase 1 may be expressed as (road ID, reference point ID, dx1_1, dy1_1). dx1_1 indicates location information of a point 1 of the accident event relative to a road start line on which the reference point is located in the time phase 1, and dy1_1 indicates location information of the point 1 of the accident event relative to the road central line in the time phase 1. It should be noted that when the reference point may be determined based on the road ID, the reference point ID may not be carried.

Figure 8B:
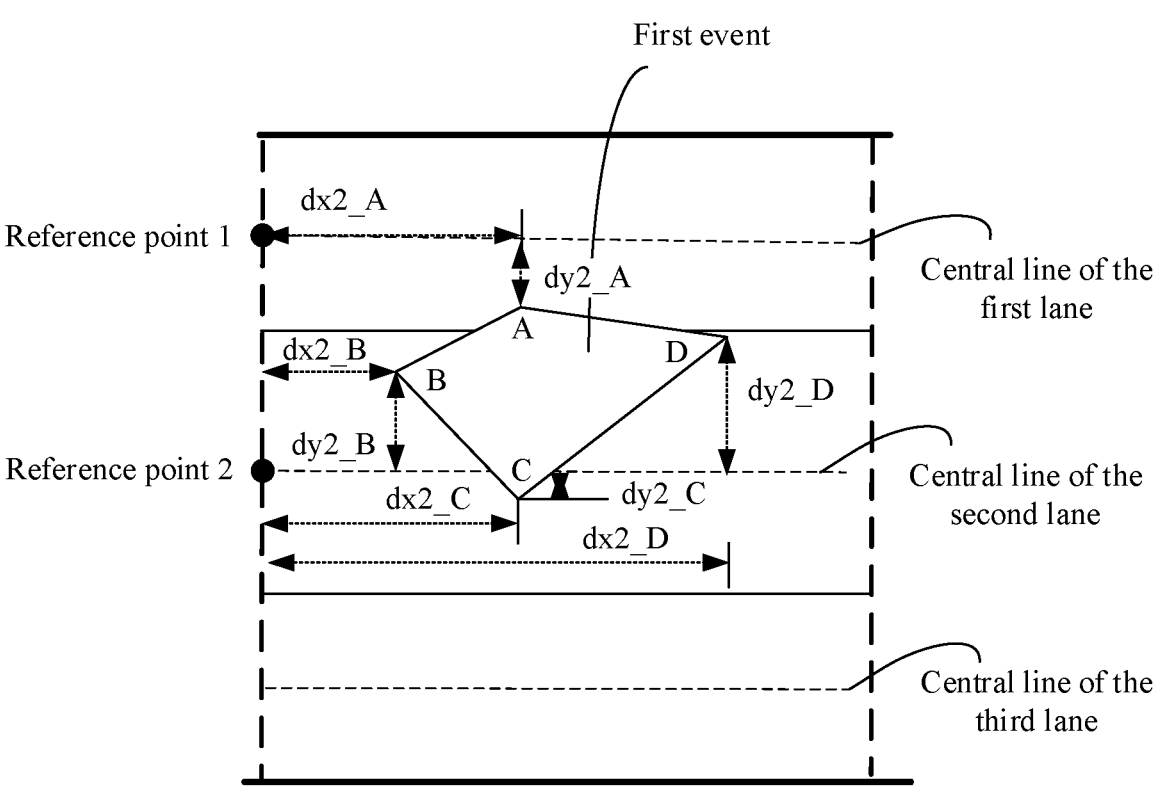

As shown in FIG. 8b, in a time phase 2, a range in which the traffic accident occurs is obtained. The range may form a quadrilateral region. In this case, the location information of the accident event may be determined by using four vertices (A, B, C, and D) of the quadrilateral region. Using a lane-level reference point and/or reference line as an example, a coordinate along a reference line may be selected. The reference point is a start point of a respective lane central line, and the reference line may be the respective lane central line.

Location information of the point A of the accident event in the time phase 2 may be expressed as (first lane ID, ID of the reference point 1, dx2_A, dy2_A). dx2_A indicates location information of the point A of the accident event relative to a first lane start line on which the reference point 1 is located in the time phase 2, and dy2_A indicates location information of the point B of the accident event relative to a first lane central line in the time phase 2. For expression manners of the points B, C, and D, refer to the expression manner of the point A, and details are not described herein. It should be noted that when the reference point 1 may be determined based on the first lane ID, the ID of the reference point 1 may not be carried.

In another possible implementation, when a requirement on definition of the location information of the accident event is not high, for example, when a congested road is used as an impassable road during navigation of a vehicle, the vehicle may not determine a range of the accident event, provided that the road on which the accident event occurs is determined. In this case, the location information may be expressed by a point of the range of the traffic accident, for example, a central point of the traffic accident.

For example, the central point of the accident event is a point 2. Location information of the accident at the point 2 in the time phase 2 may be expressed as (road ID, ID of the reference point 2, dx2_2, dx2_2). dx2_2 indicates location information of a point 2 of the accident event relative to a road start line on which the reference point is located in the time phase 2, and dy2_2 indicates location information of the point 2 of the accident event relative to the road central line in the time phase 2. It should be noted that when the reference point 2 may be determined based on the second road ID, the ID of the reference point 2 may not be carried.

Scenario 6: Different events may share a same data structure. When location information of an event is determined, location reference information of each event may be determined based on a specific requirement, and the location information of the event is determined based on the location reference information. The following uses a first event and a second event as an example for description.

Figure 9:
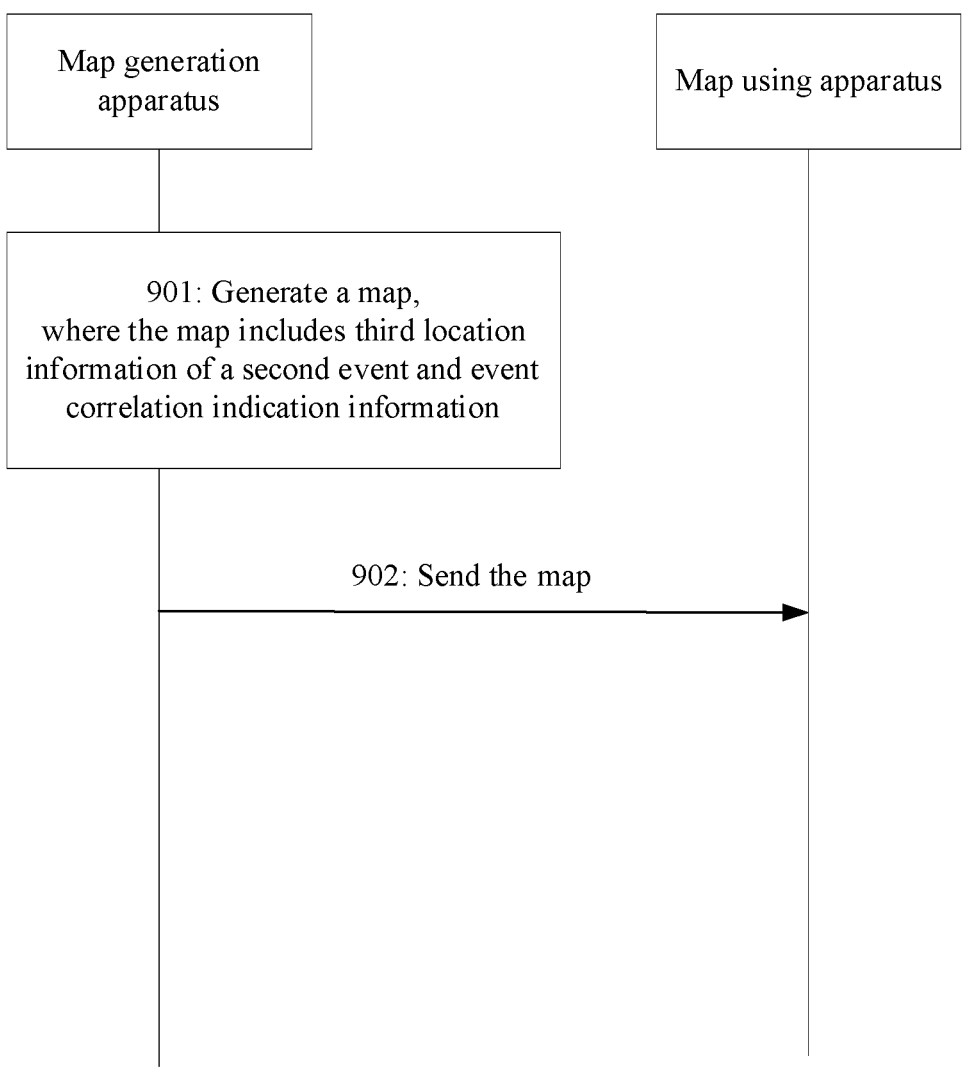
FIG. 9 shows an example of a schematic flowchart of a map generation method according to an embodiment of this application.

As shown in FIG. 9, this application provides a map generation method. The method may be performed based on the map generation apparatus 120 shown in FIG. 1b, and includes the following steps.

Step 901: Generate a map.

The map includes third location information of a second event and event correlation indication information, where the event correlation indication information is used to indicate that the third location information is based on a location reference manner indicated by the location reference information.

In a possible scenario, the first event and the second event are irrelevant, and the first event and the second event share a same location reference manner. In this case, the event correlation indication information may alternatively be used to indicate the location reference manner shared by the first event and the second event. Specifically, a corresponding field may be added to a data structure to carry the event correlation indication information, or the event correlation indication information may be carried with reference to another field in the data structure, which is not limited herein.

In a possible implementation, the map generation apparatus may determine the second event based on information about the second event. For example, the information about the second event may be sent by a collection apparatus to the map generation apparatus, so that the map generation apparatus determines the second event based on the information about the second event reported by the collection apparatus. For a manner in which the collection apparatus collects the information about the second event and sends the information to the map generation apparatus, references may be made to the manner in which the collection apparatus collects the location reference information of the first event and sends the location reference information to the map generation apparatus in step 201, and details are not described herein again.

In another possible scenario, the second event is related to the first event, that is, the second event may be determined based on the location reference manner indicated by the location reference information of the first event. The following uses Scenario 6-1 and Scenario 6-2 as examples for description.

Scenario 6-1: In consideration of a need for map use, different events may be expressed by using road-level or lane-level location information. For example, first location information of the first event is road-level location information. For example, when a vehicle does not start to travel, but uses a map to view a road condition and select a navigation path, the vehicle or a user may care about only a congestion status at a road level.

For another example, in a process in which the user or the vehicle has started to travel, the map using apparatus obtains, by using the map generation apparatus, that congestion occurs ahead on the road, and when selecting to pass through the congested road, the user may more need to obtain lane-level location information of the event, so as to better avoid a congested location and improve vehicle passing experience.

Therefore, in a possible implementation, the map generation apparatus may determine, based on a selection of the user, whether location reference information corresponding to different events is road-level location reference information or lane-level location reference information after the map generation apparatus obtains information about the different events, so as to determine location information of the different events, and send the location information to a map using apparatus. Correspondingly, the map using apparatus may display the location information of the different events.

In another possible implementation, after obtaining information about different events, the map generation apparatus may determine that location reference information corresponding to the different events is road-level location reference information and lane-level location reference information. The map generation apparatus generates location information of the events in the road-level location reference information and location information of the different events in the lane-level location reference information. In addition, the location information of the different events in the road-level location reference information and the location information of the different events in the lane-level location reference information are stored on the map.

Correspondingly, the map using apparatus may determine, based on the selection of the user, whether the location reference information corresponding to the different events is road-level location reference information or lane-level location reference information. For example, when it is determined that the road-level location reference information is used to express the location information of the first event or the second event, the location information of the first event or the second event in the road-level location reference information may be invoked from the map.

For another example, in a possible scenario, definition of the information about the first event or the second event that is currently obtained by the map generation apparatus can be used to express only road-level location information of the first event or the second event. In this case, the map generation apparatus may determine the location information of the first event or the second event based on the road-level location reference information. After obtaining more information about the first event or the second event, the map generation apparatus may determine lane-level information of the first event or the second event, for example, may determine a lane-level range in which the first event or the second event is located. In this case, the map generation apparatus may determine the location information of the first event or the second event based on the road-level location reference information, and/or determine the location information of the first event or the second event based on the lane-level location reference information.

Scenario 6-2: When there is an association relationship between events, for example, the second event is a traffic flow event in a target road section, in consideration that the first event such as an accident or road maintenance exists in the target road section and affects the traffic flow event in the current road section, a location information expression manner of the traffic flow event may depend on a location information expression manner of the accident event. For example, when the accident event is expressed as a single-point location expression, the traffic flow event may be expressed in a road-level expression manner. For another example, when the accident event is expressed as a multi-point location expression, the traffic flow event may be expressed in an expression manner of a plurality of lane-level traffic flow sub-regions. A more accurate expression range of the accident event may be used to express a more detailed traffic flow, so that congestion information that can be displayed by using the location information of the traffic flow event and the location information of the accident event is more accurate. Certainly, the map generation apparatus or the map using apparatus may select a corresponding location information expression manner based on a requirement of the user or the vehicle. For example, when the accident event is expressed as a multi-point location expression, the traffic flow event may be expressed in a road-level expression manner, or may be expressed in an expression manner of a plurality of lane-level traffic flow sub-regions.

Step 902: Send the map to a map using apparatus.

The map includes third location information of a second event and event correlation indication information, where the event correlation indication information is used to indicate that the third location information is based on a location reference manner indicated by the location reference information.

Scenario 6-1 is used as an example. For example, the second event is a traffic flow event in the target road section, and the first event is an accident event in the target road section. Based on a requirement for map use in different scenarios and a requirement for definition of location information of each event, expression manners of the location information of the traffic flow event and the location information of the accident event may be different or may be the same.

For example, the expression manners of the location information of the traffic flow event and the location information of the accident event are both road-level expression manners. In this case, location reference information selected for the traffic flow event and location reference information selected for the accident event may be shared.

For the location information of the accident event, refer to the time phase 1 in Scenario 5. Details are not described herein again. Correspondingly, the location information of the traffic flow event may be expressed as (road ID, reference point ID, dx_1, dx_2). The reference point may be a reference point corresponding to the road_ID. For example, the reference point may be a central point on a stop line. dx_1 indicates location information of a start point of the traffic flow event relative to the reference point, and dx_2 indicates location information of an end point of the traffic flow event relative to the reference point.

For another example, the expression manners of the location information of the traffic flow event and the location information of the accident event are road-level expression manners. In this case, the location reference information selected for the traffic flow event and the location reference information selected for the accident event may be separately set. With reference to the time phase 1 in Scenario 5, a coordinate along a reference line may be selected for the accident event, the reference point is a start point of a road central line, and the reference line may be the road central line. The location information of the accident event may be expressed as (road ID, reference point ID, dx1_1, dy1_1). dx1_1 indicates location information of a point 1 of the accident event relative to a road start line on which the reference point is located, and dy1_1 indicates location information of the point 1 of the accident event relative to the road central line.

For the traffic flow event, a coordinate along a reference line may be selected, and the reference points are a start point of the target road section and an end point of the target road section.

The location information of the traffic flow event may be expressed as (road ID, ID of a reference point 1, ID of a reference point 2, dx_1, dx_1). The reference point 1 may be the start point of the target road section, the reference point 2 may be the end point of the target road section, dx_1 indicates location information of the start point of the traffic flow event relative to the reference point 1, and dx_2 indicates location information of the end point of the event relative to the reference point 2.

Scenario 6-2 is used as an example. When there is an association relationship between events, for example, the second event is a traffic flow event in a target road section, in consideration that the first event such as an accident or road maintenance exists in the target road section and affects the traffic flow event in the current road section, a location information expression manner of the traffic flow event may depend on a location information expression manner of the first event. For example, when the accident event is expressed as a single-point location expression, the traffic flow event may be expressed in a road-level expression manner.

For another example, when the accident event is expressed as a multi-point location expression, the traffic flow event may be expressed in an expression manner of a plurality of lane-level traffic flow sub-regions. In this case, for example, the traffic flow event is a second event, and the accident event is a first event. The second event may include N sub-events, and the N sub-events of the second event may be determined based on first location information that is of the first event and that is expressed in the location reference information.

In a possible implementation, for each of the N sub-events of the second event, first location information that is in the first event and that is related to the sub-event is determined based on a relationship between the first event and the sub-event; and third location information that is of the sub-event and that is expressed in the location reference information is determined based on the first location information that is in the first event and that is related to the sub-event.

A more accurate expression range of the accident event may be used to express a more detailed traffic flow, so that congestion information that can be displayed by using the location information of the traffic flow event and the location information of the accident event is more accurate. Certainly, the map generation apparatus or the map using apparatus may select a corresponding location information expression manner based on a requirement of the user or the vehicle. For example, when the accident event is expressed as a multi-point location expression, the traffic flow event may be expressed in a road-level expression manner, or may be expressed in an expression manner of a plurality of lane-level traffic flow sub-regions.

With reference to FIG. 7b, an example in which a first event (an accident event) exists in the target road section is used. A range of the accident event involves three lanes, including a first lane and a second lane. The accident event includes four points to describe location information of the accident event. For example, the accident event includes a point A, a point B, a point C, and a point D. The point A is located on the first lane, and the point B, the point C, and the point D are located on the second lane.

For an expression manner of the location information of the accident event, refer to the expression manner in the time phase 2 in Scenario 5, or refer to the expression manner in Scenario 6-1 or Scenario 6-2. Details are not described herein again.

Correspondingly, an expression manner of the location information of the second event (traffic flow event) may be determined based on the location information of the accident event, or may be an expression manner of road-level location information. For example, the location information of the traffic flow may be determined based on location information of a central point of the accident event. For another example, an expression manner of the location information of the traffic flow may be determined based on the location information of the accident event, or may be an expression manner of lane-level location information. For example, the location information of the traffic flow may be determined based on location information of the four points of the accident event. For a specific manner, refer to the expression manner of the first event in Scenario 4. Details are not described herein again.

Figure 10A:
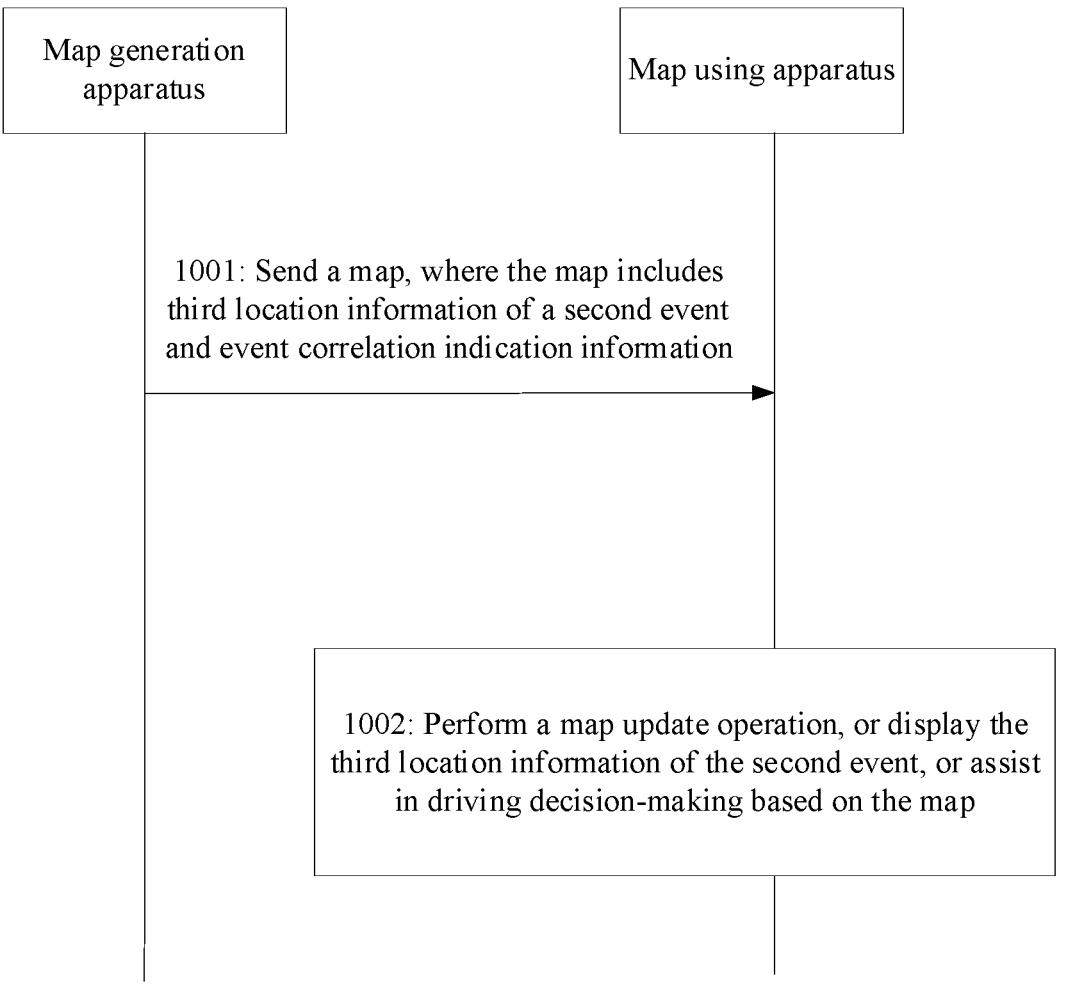
FIG. 10a is a schematic flowchart of a map using method according to an embodiment of this application.

As shown in FIG. 10a, this application provides a map using method. The method may be performed based on the map using apparatus 130 shown in FIG. 1b, and includes:

Step 1001: The map using apparatus receives a map.

Specifically, the map using apparatus receives a map sent by a map generation apparatus.

The map includes third location information of a second event and event correlation indication information, where the event correlation indication information is used to indicate that the third location information is based on a location reference manner indicated by the location reference information.

In a possible implementation, the map using apparatus may send an obtaining request message of the second event to the map generation apparatus. Correspondingly, the map using apparatus receives a response message of the second event from the map generation apparatus.

For details about sending the obtaining request message of the second event, refer to the implementation of sending the obtaining request message of the first event to the map generation apparatus, and details are not described herein. It should be noted that when the first event is related to the second event, the obtaining request message of the first event and the obtaining request message of the second event may be a same message, or may be different messages, which is not limited herein.

In a possible implementation, the response message of the second event includes third location information that is of the second event and that is expressed in location reference information of the first event.

In another possible implementation, the response message of the second event includes third location information that is of each of N sub-events of the second event and that is expressed in the location reference information, and N is a positive integer greater than 1.

For a specific implementation, refer to Scenario 6-1 and Scenario 6-2. Details are not described herein again.

Step 1002: The map using apparatus performs a map update operation, or displays the location information, or assists in driving decision-making based on the map.

In a possible implementation, the map using apparatus may update the map based on the third location information that is of the second event and that is expressed in location reference information of the second event.

Figure 10B:
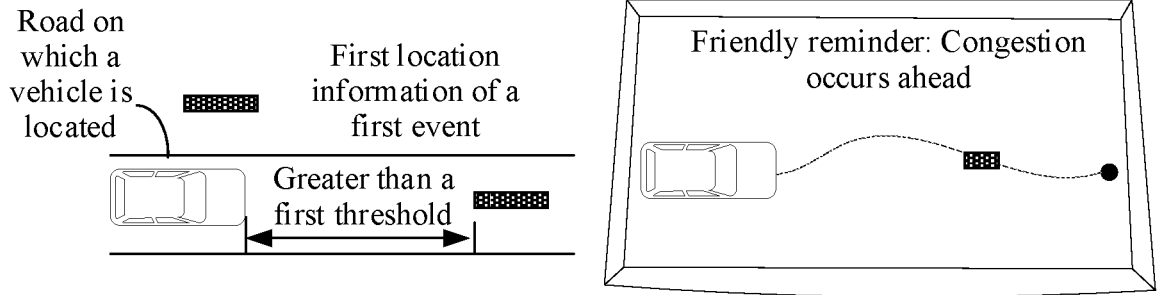
FIG. 10b to FIG. 10d are schematic diagrams of using a map according to an embodiment of this application.

Optionally, the map using apparatus uses an updated map to execute a corresponding map function. For example, the map using apparatus may display the first event with reference to the first location information that is of the first event and that is expressed in the location reference information of the first event, to guide vehicle navigation. As shown in FIG. 10*b*, in this case, the first location information of the first event may be displayed. Alternatively, when a distance between the vehicle and the first event is greater than or equal to a first threshold, the first location information of the first event is displayed, and a reminder indicating that congestion occurs ahead is displayed.

For another example, the map using apparatus displays, by using the updated map, the second event based on the third location information that is of the second event and that is expressed in the location reference information of the second event, and guides vehicle navigation based on the second event.

For another example, the map using apparatus may display the first event while displaying the second event with reference to the first location information that is of the first event and that is expressed in the location reference information of the first event, and guide vehicle navigation based on the first event and the second event.

Figure 10C:
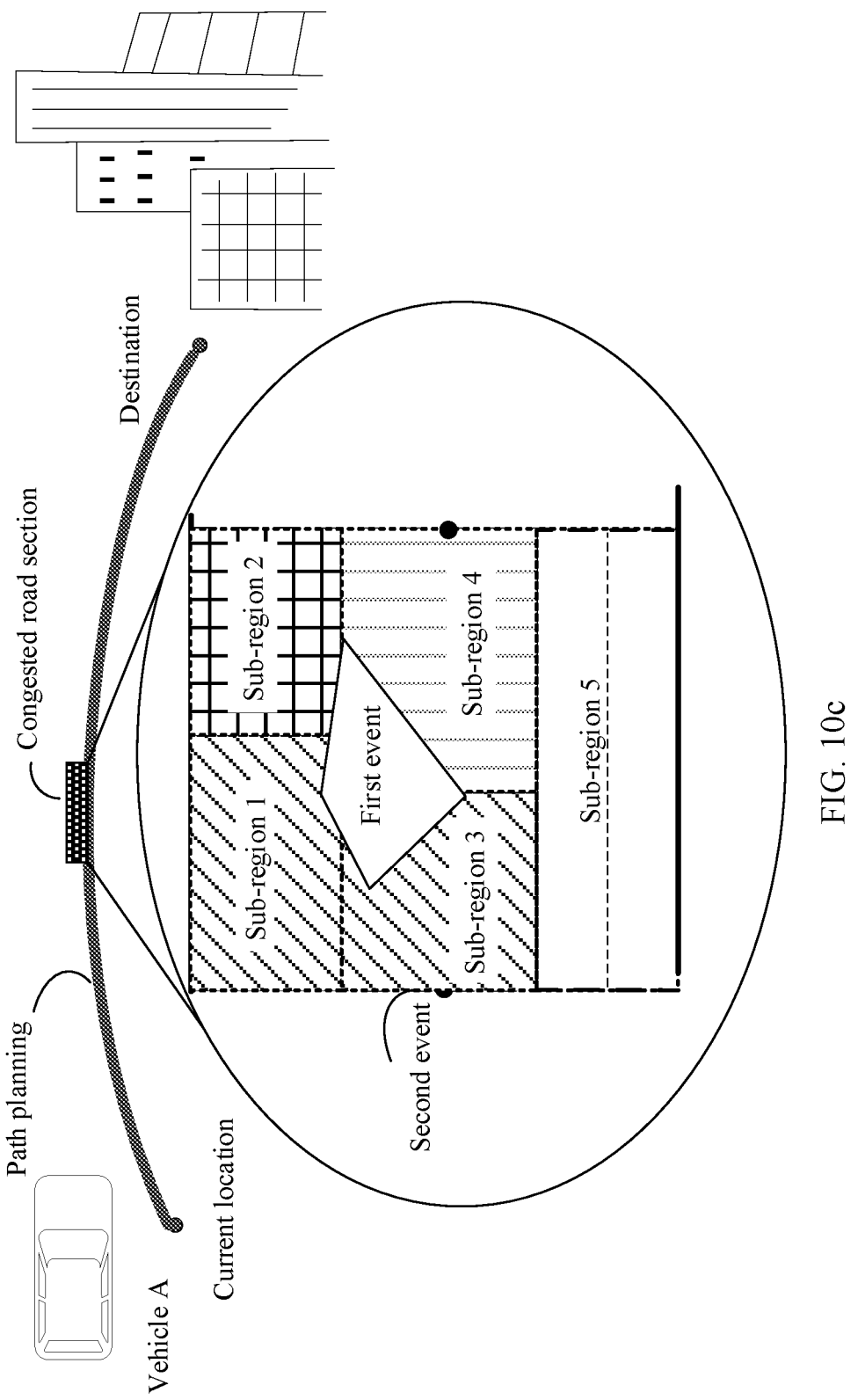

With reference to the example shown in FIG. 7*b*, as shown in FIG. 10*c*, the first event may be a traffic accident event, and the second event may be a traffic flow event. It may be determined that the second event includes five sub-events, where a sub-event 1 is corresponding to a sub-region 1 of a first congestion degree, a sub-event 2 is corresponding to a sub-region 2 of a second congestion degree, a sub-event 3 is corresponding to a sub-region 3 of a third congestion degree, a sub-event 4 is corresponding to a sub-region 4 of a fourth congestion degree, and a sub-event 5 is corresponding to a sub-region 5 of a fifth congestion degree. The first congestion degree is close to the third congestion degree, the second congestion degree and the fourth congestion degree are the highest, and the fifth congestion degree is the lowest. The map using apparatus may display, in a corresponding region by using a color, a congestion degree corresponding to each sub-event, and update navigation information based on each sub-event. For example, when the vehicle is located on a first lane, and the vehicle is at a first preset distance from the sub-event 1, the vehicle may be reminded that congestion occurs ahead of the first lane, and the vehicle is advised to change the lane to a third lane for passing. When the vehicle is located on a second lane, and the vehicle is at a second preset distance from the sub-event 3, the vehicle may be reminded that congestion occurs ahead of the second lane, and the vehicle is advised to change the lane to the third lane for passing. The first preset distance and the second preset distance may be determined based on a congestion degree of a sub-event, or may be determined based on a lane change difficulty of the vehicle. This is not limited herein. When the vehicle is located on the third lane, the vehicle may be reminded that congestion occurs on the first lane and the second lane, and the vehicle is advised to slow down, switch to another road, or the like. This helps improve driving safety of the vehicle and reduce road congestion.

Figure 10D:
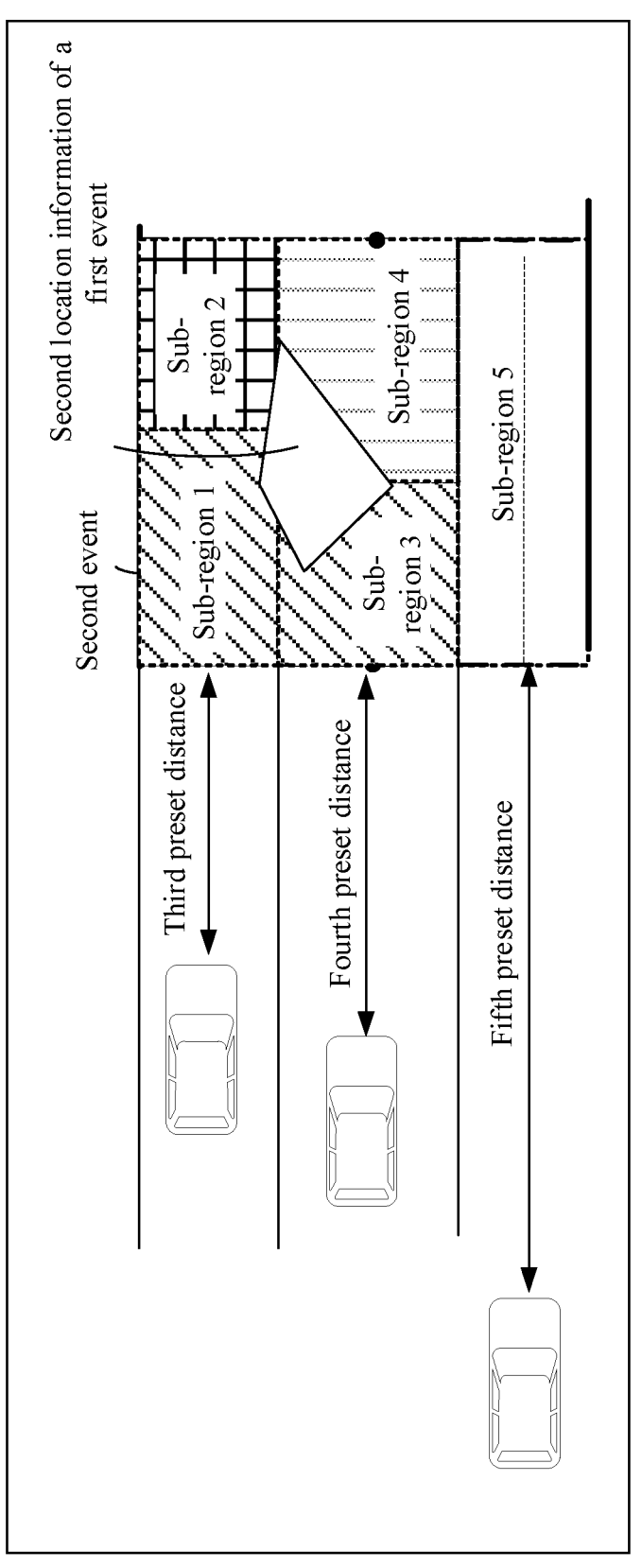

In another possible scenario, as shown in FIG. 10*d*, the map using apparatus may further display the first event and the second event based on the first location information of the first event and the third location information of the second event that are expressed in the location reference information of the first event, and guide vehicle navigation based on the first event and the second event. For example, when the vehicle is located on the first lane, and the distance between the vehicle and the sub-region 1 of the second event is less than or equal to a third preset distance, the vehicle may be reminded that congestion occurs ahead of the first lane, and the vehicle is advised to change the lane to the third lane for passing. When the vehicle is located on the second lane, and the distance between the vehicle and the sub-region 3 of the second event is less than or equal to a fourth preset distance, the vehicle may be reminded that congestion occurs ahead of the second lane, and the vehicle is advised to change the lane to the third lane for passing. When the vehicle is located on the third lane, and the distance between the vehicle and the sub-region 5 of the second event is less than or equal to a fifth preset distance, the vehicle may be reminded that congestion occurs ahead of the vehicle, and the vehicle is reminded to avoid a vehicle that may change a lane.

Certainly, the first event may alternatively be determined based on a distance between the vehicle and a lane on which the first event is located. Refer to FIG. 3*d*. Details are not described herein again.

The third preset distance, the fourth preset distance, and the fifth preset distance may be determined based on an area and a location of each sub-region of the second event, or may be determined based on an area of a corresponding lane occupied by the first event. For example, when the first event involves a larger range, a larger third preset distance, a larger fourth preset distance, and a larger fifth preset distance may be set. The third preset distance, the fourth preset distance, and the fifth preset distance may alternatively be determined by using the type of the first event or the type of the second event. For example, when the first event is an accident, a longer distance may be set compared with a case in which the first event is a rainwater accumulation event, so as to prevent the vehicle from changing a lane in advance at a location farther away from the accident. Alternatively, the distance may be determined based on a lane change difficulty of the vehicle, and this is not limited herein.

Scenario 7: When an event changes, or an expression manner of location information of another event associated with the event is different from an expression manner of the event, in this case, switching between reference manners may be performed based on different reference manners of location information of the event. The following uses Scenario 7-1 and Scenario 7-2 as examples for description.

Scenario 7-1: A reference manner of location information of an event is converted between a rectangular coordinate and a coordinate along a reference line.

In a possible example, when the location information of the event is converted from the rectangular coordinate to the coordinate along a reference line, location information of the event relative to a reference line and a reference point may be determined after location information of the reference line and location information of the reference point are obtained from a static map, that is, the location information of the event is converted to location information that is of the event and that is expressed in a coordinate 1 along a reference line.

In another possible example, when the location information of the event is converted from the coordinate along a reference line to the rectangular coordinate, location information of the location information of the event relative to the rectangular coordinates may be determined by obtaining, from the static map, location information of rectangular coordinates of the reference line and location information of rectangular coordinates of the reference point, and location information that is of the event and that is expressed in the coordinate 1 along a reference line (that is, location information of the location information of the event relative to the reference line and the reference point).

Scenario 7-2: A reference manner of location information of an event is converted from a coordinate 1 along a reference line to a coordinate 2 along a reference line.

For example, a reference manner of the location information of the event determined at a moment 1 is corresponding to the coordinate 1 along a reference line. A reference manner of the event at a moment 2 is corresponding to the coordinate 2 along a reference line.

In a possible implementation, when conversion is performed from the coordinate 1 along a reference line to the coordinate 2 along a reference line, a rectangular coordinate may be used as a transit. To be specific, location information of the location information of the event in the coordinate 1 along a reference line is first converted into location information of the location information of the event in the rectangular coordinate, and then the location information of the location information of the event in the rectangular coordinate is converted into the location information of the location information of the event in the coordinate 2 along a reference line. In this way, the location information of the event is converted from the coordinate 1 along a reference line to the coordinate 2 along a reference line.

In a manner of selecting the location reference information for the location of the event for expression, compatibility and universality may be implemented in four dimensions: inter-event, spatial, time, and definition, data structure compatibility and universality in the foregoing different application manners are supported, reference location methods of a plurality of dynamic events are compatible, a plurality of different geometric expression methods are compatible, and location reference information is dynamically selected and combined, for example, location reference information such as a type of a reference coordinate system, a type of a reference line, and a type of a reference point. Therefore, universality and flexibility of a dynamic information data structure are improved, and a requirement of a time-varying feature of a single dynamic event on a reference location method is compatible. Based on different location expression definition requirements of dynamic information, location information that is of different dynamic events and that is expressed in corresponding location reference information is implemented, compatibility of different definition is implemented, and switching between a high-definition requirement and a low-definition requirement can be further implemented.

It should be noted that, names of the foregoing information are merely examples. With evolution of communication technologies, the name of any foregoing information may be changed. However, regardless of how the names of the information change, provided that meanings of the information are the same as those of the information in this application, the information falls within the protection scope of this application.

The foregoing mainly describes the solutions provided in this application from a perspective of interaction between the network elements. It may be understood that, to implement the foregoing functions, each network element includes a corresponding hardware structure and/or software module for implementing each function. A person skilled in the art should easily be aware that, in combination with the examples described in the embodiments disclosed in this specification, units and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present application.

Figure 11:
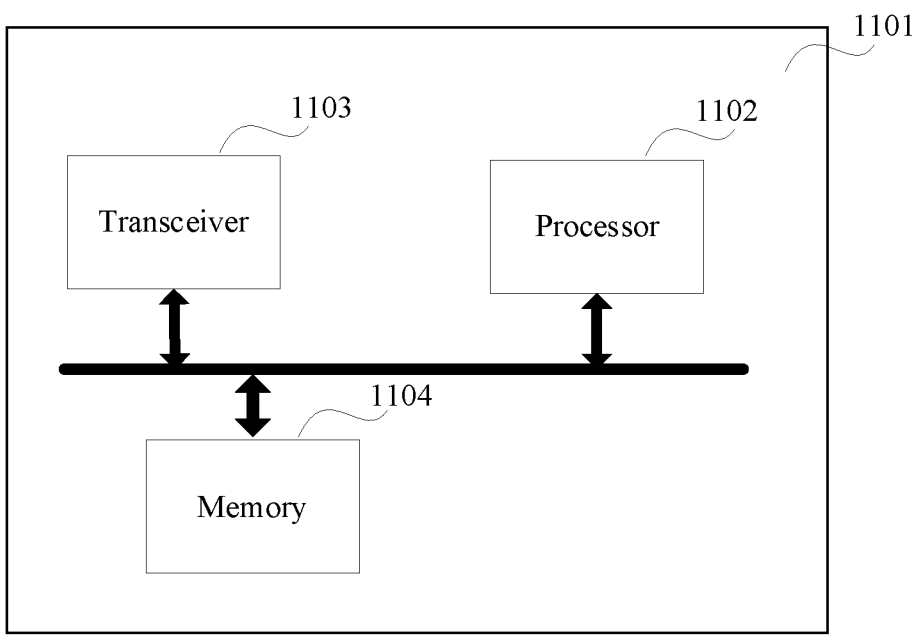
FIG. 11 is a schematic diagram of a structure of a map generation apparatus according to an embodiment of this application.

According to the foregoing method, FIG. 11 shows an example of a schematic diagram of a structure of a map generation apparatus according to an embodiment of this application. As shown in FIG. 11, the apparatus may be a map server, a collection apparatus, or a vehicle, or may be a chip or a circuit, for example, a chip or a circuit that may be disposed in a map server, a collection apparatus, or a vehicle. For example, the apparatus may be the map server, the collection apparatus, or the vehicle according to any one of this application.

As shown in FIG. 11, the map generation apparatus 1101 may include a processor 1102, a memory 1104, and a transceiver 1103, and may further include a bus system. The processor 1102, the memory 1104, and the transceiver 1103 may be connected by using the bus system.

It should be understood that the processor 1102 may be a chip. For example, the processor 1102 may be a field programmable gate array (FPGA), an application-specific integrated circuit (ASIC), a system on chip (SoC), a central processing unit (CPU), a network processor (NP), a digital signal processing circuit (DSP), a micro controller (MCU), a programmable logic device (PLD), or another integrated chip.

In an implementation process, the steps in the foregoing methods may be completed by using an integrated logic circuit of hardware in the processor 1102 or an instruction in a form of software. Steps of the methods disclosed with reference to embodiments of this application may be directly executed and accomplished by using a hardware processor, or may be executed and accomplished by using a combination of hardware and software modules in the processor 1102. A software module may be located in a mature storage medium in the art, such as a random access memory, a flash memory, a read-only memory, a programmable read-only memory, an electrically erasable programmable memory, or a register. The storage medium is located in the memory

1104, and the processor 1102 reads information in the memory 1104 and completes the steps in the foregoing methods in combination with hardware of the processor 1102.

It should be noted that the processor 1102 in this embodiment of this application may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory 1104 in this embodiment of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

The map generation apparatus may include a processor 1102, a transceiver 1103, and a memory 1104. The memory 1104 is configured to store instructions, and the processor 1102 is configured to execute the instructions stored in the memory 1104, to implement a related solution of the map generation apparatus in any one or more corresponding methods shown in this application, or perform the method performed by the map generation apparatus in the foregoing embodiments.

In some embodiments, the transceiver 1103 may send a map. The processor 1102 may generate a map, where the map includes location information of a first event and location reference information of the first event, the location information is used to indicate a location at which the first event occurs, and the location reference information is used to indicate a location reference manner on which the location information is based.

Figure 12:
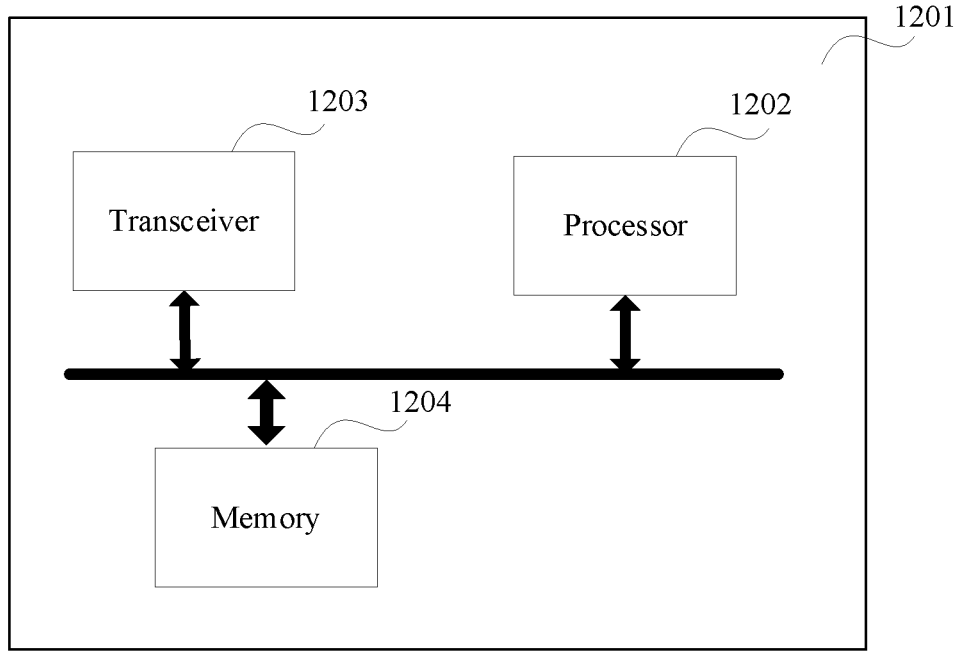
FIG. 12 is a schematic diagram of a structure of a map using apparatus according to an embodiment of this application.

According to the foregoing method, FIG. 12 shows an example of a schematic diagram of a structure of a map using apparatus according to an embodiment of this application. As shown in FIG. 12, the apparatus may be a map server, a collection apparatus, or a vehicle, or may be a chip or a circuit, for example, a chip or a circuit that may be disposed in a map server, a collection apparatus, or a vehicle. For example, the apparatus may be the map server, the collection apparatus, or the vehicle according to any one of this application.

As shown in FIG. 12, the map using apparatus 1201 may include a processor 1202, a memory 1204, and a transceiver 1203, and may further include a bus system. The processor 1202, the memory 1204, and the transceiver 1203 may be connected by using the bus system.

It should be understood that the processor 1202 may be a chip. For example, the processor 1202 may be a field programmable gate array (FPGA), an application-specific integrated circuit (ASIC), a system on chip (SoC), a central processing unit (CPU), a network processor (NP), a digital signal processing circuit (DSP), a micro controller (MCU), a programmable logic device (PLD), or another integrated chip.

In an implementation process, the steps in the foregoing methods may be completed by using an integrated logic circuit of hardware in the processor 1202 or an instruction in a form of software. Steps of the methods disclosed with reference to embodiments of this application may be directly executed and accomplished by using a hardware processor, or may be executed and accomplished by using a combination of hardware and software modules in the processor 1202. A software module may be located in a mature storage medium in the art, such as a random access memory, a flash memory, a read-only memory, a programmable read-only memory, an electrically erasable programmable memory, or a register. The storage medium is located in the memory 1204, and the processor 1202 reads information in the memory 1204 and completes the steps in the foregoing methods in combination with hardware of the processor 1202.

It should be noted that the processor 1202 in this embodiment of this application may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory 1204 in this embodiment of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

The map using apparatus may include a processor 1202, a transceiver 1203, and a memory 1204. The memory 1204 is configured to store instructions, and the processor 1202 is configured to execute the instructions stored in the memory 1204, to implement a related solution of the map generation apparatus in any one or more corresponding methods shown in this application, or perform the method performed by the map generation apparatus in the foregoing embodiments.

In some embodiments, the transceiver 1203 may receive a map. The map includes location information of a first event and location reference information of the first event, the location information is used to indicate a location at which the first event occurs, and the location reference information is used to indicate a location reference manner on which the location information is based. The processor 1202 may perform a map update operation, display the location information, or assist in driving decision-making based on the map.

Figure 13:
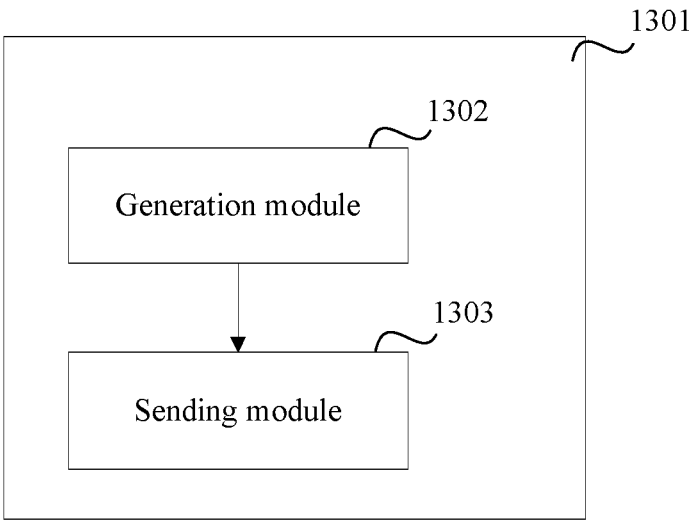
FIG. 13 is a schematic diagram of a structure of a map generation apparatus according to an embodiment of this application.

Based on the foregoing embodiments and a same concept, FIG. 13 shows an example of a schematic diagram of a structure of another map generation apparatus according to an embodiment of this application. As shown in FIG. 13, the map generation apparatus 1301 may be a map generation apparatus, for example, the map generation apparatus according to any one of this application, or may be a chip or a circuit, for example, a chip or a circuit that may be disposed in a map generation apparatus. The map generation apparatus may implement the steps performed by the map generation apparatus in any one or more corresponding methods shown in this application, or perform the method performed by the map generation apparatus in any one of the embodiments shown in Embodiment 1 to Embodiment 3. As shown in FIG. 13, the map generation apparatus 1301 may include a generation module 1302 and a sending module 1303.

The generation module 1302 may generate a map, where the map includes location information of a first event and location reference information of the first event, the location information is used to indicate a location at which the first event occurs, and the location reference information is used to indicate a location reference manner on which the location information is based; and the sending module 1303 may send the map.

In a possible implementation, the map further includes: the location information includes first location information and second location information, and the location reference information includes first location reference information and second location reference information, where the first location reference information is used to indicate a first location reference manner on which the first location information is based, the second location reference information is used to indicate a second location reference manner on which the second location information is based, the second location information is different from the first location information, and the second location reference manner is different from the first location reference manner.

In a possible implementation, the location reference manner includes at least one of a type of a reference coordinate system, a type of a reference point, and a type of a reference line.

In a possible implementation, the reference lines include a lateral reference line and a longitudinal reference line.

In a possible implementation, the type of the reference coordinate system includes at least one of an ENU rectangular coordinate system and a coordinate system along a reference line.

In a possible implementation, the type of the reference point includes at least one of the following plurality of types: a start point of a road central line, a start point of a road edge line, a midpoint of a start line of a lane group, a start point of a lane central line, and a start point of a lane edge line.

In a possible implementation, the type of the reference line includes at least one of the following plurality of types: a central line of a road, an edge line of a road, a central line of a lane, and an edge line of a lane.

In a possible implementation, the map further includes third location information of a second event and event correlation indication information, where the event correlation indication information is used to indicate that the third location information is based on a location reference manner indicated by the location reference information.

It should be understood that division of the units of the map generation apparatus 1301 is merely logical function division. In actual implementation, all or some of the units may be integrated into one physical entity, or may be physically separated. For concepts, explanations, detailed descriptions, and other steps involved by the map generation apparatus 1301 and related to the technical solutions provided in embodiments of this application, refer to descriptions of the content in the foregoing method or other embodiments. Details are not described herein again.

Figure 14:
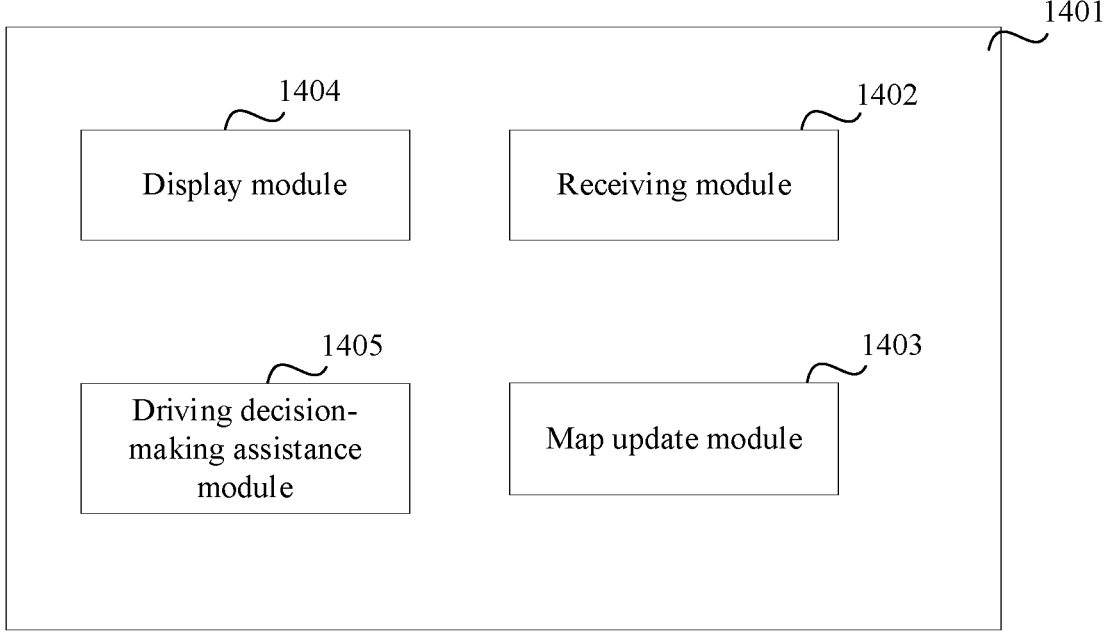
FIG. 14 is a schematic diagram of a structure of a map using apparatus according to an embodiment of this application.

Based on the foregoing embodiments and a same concept, FIG. 14 shows an example of a schematic diagram of a structure of another map using apparatus according to an embodiment of this application. As shown in FIG. 14, the map using apparatus 1401 may be a map generation apparatus, for example, the map generation apparatus according to any one of this application, or may be a chip or a circuit, for example, a chip or a circuit that may be disposed in a map generation apparatus. The map using apparatus may implement the steps performed by the map generation apparatus in any one or more corresponding methods shown in this application, or perform the method performed by the map generation apparatus in any one of the embodiments shown in Embodiment 1 to Embodiment 3. As shown in FIG. 14, the map using apparatus 1401 may include a receiving module 1402, a map update module 1403, a display module 1404, and a driving decision-making assistance module 1405.

The receiving module 1402 is configured to receive a map, where the map includes location information of a first event and location reference information of the first event, the location information is used to indicate a location at which the first event occurs, and the location reference information is used to indicate a location reference manner on which the location information is based; and the map update module 1403 is configured to perform a map update operation based on the map; or the display module 1404 is configured to display the location information based on the map; or the driving decision-making assistance module 1405 is configured to assist in driving decision-making based on the map.

In a possible implementation, the map further includes: the location information includes first location information and second location information, and the location reference information includes first location reference information and second location reference information, where the first location reference information is used to indicate a first location reference manner on which the first location information is based, the second location reference information is used to indicate a second location reference manner on which the second location information is based, the second location information is different from the first location information, and the second location reference manner is different from the first location reference manner.

In a possible implementation, the location reference manner includes at least one of a type of a reference coordinate system, a type of a reference point, and a type of a reference line.

In a possible implementation, the type of the reference coordinate system includes at least one of an ENU rectangular coordinate system and a coordinate system along a reference line.

In a possible implementation, the type of the reference point includes at least one of the following plurality of types: a start point of a road central line, a start point of a road edge line, a midpoint of a start line of a lane group, a start point of a lane central line, and a start point of a lane edge line.

In a possible implementation, the type of the reference line includes at least one of the following plurality of types: a central line of a road, an edge line of a road, a central line of a lane, and an edge line of a lane.

In a possible implementation, the map further includes third location information of a second event and event correlation indication information, where the event correlation indication information is used to indicate that the third location information is based on a location reference manner indicated by the location reference information.

In a possible implementation, the display module 1404 is further configured to: in response to a request message, change displaying the first location information to displaying the second location information; where the displaying the first location information is displaying the first location information based on the first location reference manner indicated by the first location reference information, and the displaying the second location information is displaying the second location information based on the second location reference manner indicated by the second location reference information.

In some embodiments, the request message may be generated after the user performs an operation on a map displayed on a display interface, or may be initiated by the vehicle to the map generation apparatus before the vehicle performs driving decision-making. Correspondingly, after determining the location information of the first event and the location reference information of the first event, the map generation apparatus may send the location information of the first event and the location reference information of the first event to the map using apparatus.

In a possible implementation, the display module 1404 is further configured to: when a distance between the first event and a vehicle meets a preset condition, change displaying the first location information to displaying the second location information;

where the displaying the first location information is displaying the first location information based on the first location reference manner indicated by the first location reference information, and the displaying the second location information is displaying the second location information based on the second location reference manner indicated by the second location reference information.

In a possible implementation, the first event is on a planned driving route of the vehicle.

In a possible implementation, the driving decision-making assistance module 1405 is configured to: when a distance between the first event and a vehicle meets a preset condition, change assisting in driving decision-making based on the first location information to assisting in driving decision-making based on the second location information.

In a possible implementation, the first event is on a planned driving route of the vehicle.

In a possible implementation, the display module 1404 is further configured to select the first location information from the first location information and the second location information for display based on an attribute of the first event, and time or a location at which the first event occurs, where the displaying is based on the first location reference manner indicated by the first location reference information.

In a possible implementation, the display module 1404 is further configured to select the first location information from the first location information and the second location information for display based on a permission of a device performing displaying or a permission of a user who uses the device, where the displaying is based on the first location reference manner indicated by the first location reference information.

In a possible implementation, after the map update module performs the map update operation, the display module 1404 is further configured to: determine, based on the location reference information, that definition of the location information is higher than definition on which currently displaying a location of the first event is based; and display the location of the first event based on the location reference manner indicated by the location reference information.

It should be understood that division of the units of the map using apparatus 1401 is merely logical function division. In actual implementation, all or some of the units may be integrated into one physical entity, or may be physically separated. For concepts, explanations, detailed descriptions, and other steps involved by the map using apparatus 1401 and related to the technical solutions provided in embodiments of this application, refer to descriptions of the content in the foregoing method or other embodiments. Details are not described herein again.

This application further provides a map, including location information of a first event and location reference information of the first event, where the location information is used to indicate a location at which the first event occurs, and the location reference information is used to indicate a location reference manner on which the location information is based.

Certainly, the map may be any possible map implementation provided in embodiments of this application.

This application further provides a computer program product. The computer program product includes computer program code. When the computer program code is run on a computer, the computer is enabled to perform the method in any one of embodiments shown in this application.

This application further provides a computer program product. The computer program product includes computer program code. When the computer program code is run on a computer, the computer is enabled to perform the map in any one of embodiments shown in this application.

This application further provides a computer-readable storage medium, where the computer-readable storage medium stores the map of any one of embodiments shown in this application.

This application further provides a vehicle. The vehicle uses a map according to any possible method in the map using methods in the foregoing embodiments.

This application further provides a system, including the foregoing map generation apparatus and map using apparatus. The map generation apparatus may be a map server, a map collection device, or a vehicle, or a component in a corresponding device, for example, a chip. The map using apparatus may be a vehicle, a map server, a map collection device, or a component in a corresponding device, for example, a chip. The map generation apparatus generates a map according to the map generation method according to any one of the foregoing embodiments, and then sends the map to the map using apparatus. The map using apparatus performs a map update operation, or displays location information, or assists in driving decision-making based on the map according to the map using method according to any one of the foregoing embodiments.

This application provides a chip. The chip may include a processor and an interface. The processor is configured to read instructions by using the interface, to perform the map generation method according to any one of the foregoing embodiments, or perform the map using method according to any one of the foregoing embodiments.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state drive (SSD)), or the like.

It is clearly that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A map generation apparatus, comprising at least one processor and at least one memory, wherein the at least one memory stores program instructions, and the at least one processor is coupled to the at least one memory to execute the program instructions to:

generate a map, wherein the map is an electronic map comprising electronic data, wherein the map comprises location information of a first event and location reference information of the first event, the location information indicates a location at which the first event occurs, and the location reference information indicates a characteristic of location information, wherein the characteristic indicates whether the location information is based on a road central line, a road edge line, a lane central line, or a lane edge line, wherein the map comprises one or more dynamic map layers that are used to express real time dynamic information; and send the map to a second apparatus.

2. The apparatus according to claim 1, wherein the location information comprises first location information and second location information, and the location reference information comprises first location reference information and second location reference information, the second location information is different from the first location information.

3. The apparatus according to claim 1, wherein the location reference information indicates that the location information is based on at least one of an east north up (ENU) rectangular coordinate system or a coordinate system along a reference line.

4. The apparatus according to claim 1, wherein the location reference information indicates that the location information is based on at least one of the following:

a start point of a road central line;

a start point of a road edge line;

a midpoint of a start line of a lane group;

a start point of a lane central line; or a start point of a lane edge line.

5. The apparatus according to claim 1, wherein the location reference information indicates that the location information is based on at least one of the following:

a central line of a road;

an edge line of a road;

a central line of a lane; or an edge line of a lane.

6. The apparatus according to claim 1, wherein the map further comprises:

third location information of a second event and event correlation indication information.

7. A map using apparatus, comprising at least one processor and at least one memory, wherein the at least one memory stores program instructions, and the at least one processor is coupled to the at least one memory to execute the program instructions to:

receive a map from a second apparatus, wherein the map is an electronic map comprising electronic data, wherein the map comprises location information of a first event and location reference information of the first event, the location information indicates a location at which the first event occurs, and the location reference information indicates a characteristic of location information, wherein the characteristic indicates whether the location information is based on a road central line, a road edge line, a lane central line, or a lane edge line, wherein the map comprises one or more dynamic map layers that are used to express real time dynamic information; and perform at least one of the following operations: a map update operation, displaying the location information, or assisting in driving decision-making based on the map.

8. The apparatus according to claim 7, wherein the location information comprises first location information and second location information, and the location reference information comprises first location reference information and second location reference information, the second location information is different from the first location information.

9. The apparatus according to claim 8, wherein the at least one processor is coupled to the at least one memory to execute the program instructions to:

in response to a request message, change displaying the first location information to displaying the second location information;

wherein the displaying the first location information comprises displaying the first location information based on the first location reference information, and the displaying the second location information comprises displaying the second location information based on the second location reference information.

10. The apparatus according to claim 8, wherein the at least one processor is coupled to the at least one memory to execute the program instructions to:

when a distance between the first event and a vehicle meets a preset condition, change displaying the first location information to displaying the second location information;

wherein the displaying the first location information comprises displaying the first location information based on the first location reference information, and the displaying the second location information comprises displaying the second location information based on the second location reference information.

11. The apparatus according to claim 8, wherein the at least one processor is coupled to the at least one memory to execute the program instructions to:

when a distance between the first event and a vehicle meets a preset condition, change assisting in driving decision-making based on the first location information to assisting in driving decision-making based on the second location information.

12. The apparatus according to claim 8, wherein the at least one processor is coupled to the at least one memory to execute the program instructions to:

select the first location information from the first location information and the second location information for display based on an attribute of the first event, and time or a location at which the first event occurs, wherein the displaying is based on the first location reference information.

13. The apparatus according to claim 8, wherein the at least one processor is coupled to the at least one memory to execute the program instructions to:

select the first location information from the first location information and the second location information for display based on a permission of a device performing displaying or a permission of a user who uses the device, wherein the displaying is based on the first location reference information.

14. The apparatus according to claim 7, wherein the location reference information indicates that the location information is based on at least one of an east north up (ENU) rectangular coordinate system or a coordinate system along a reference line.

15. The apparatus according to claim 7, wherein the location reference information indicates that the location information is based on at least one of the following:

a start point of a road central line;

a start point of a road edge line;

a midpoint of a start line of a lane group;

a start point of a lane central line; or a start point of a lane edge line.

16. The apparatus according to claim 7, wherein the location reference information indicates that the location information is based on at least one of the following:

a central line of a road;

an edge line of a road;

a central line of a lane; or an edge line of a lane.

17. The apparatus according to claim 7, wherein the map further comprises:

third location information of a second event and event correlation indication information.

18. The apparatus according to claim 7, wherein the at least one processor is coupled to the at least one memory to execute the program instructions to:

determine, based on the location reference information, that a display definition of the location information is higher than display definition on which currently displaying a location of the first event is based; and display the location of the first event based on the location reference information.

19. A method, comprising:

generating a map, wherein the map is an electronic map comprising electronic data, wherein the map comprises location information of a first event and location reference information of the first event, the location information indicates a location at which the first event occurs, and the location reference information indicates a characteristic of location information, wherein the characteristic indicates whether the location information is based on a road central line, a road edge line, a lane central line, or a lane edge line, wherein the map comprises one or more dynamic map layers that are used to express real time dynamic information; and sending the map to a second apparatus.

20. The method according to claim 19, wherein the location information comprises first location information and second location information, and the location reference information comprises first location reference information and second location reference information, the second location information is different from the first location information.

* * * * *